United States Patent [19]
Liu et al.

[11] Patent Number: 6,115,692
[45] Date of Patent: Sep. 5, 2000

[54] GENERATING GROWTH ALTERNATIVES

[76] Inventors: Jinkui Liu, 2621 Ridge La., St. Paul, Minn. 55112; Fazal Wala, 2 Red Barn Rd., St. Paul, Minn. 55127; Harry E. Meek, 17997 Eidelweiss, Andover, Minn. 55304

[21] Appl. No.: 08/754,999

[22] Filed: Nov. 22, 1996

Related U.S. Application Data

[63] Continuation of application No. 08/442,414, May 16, 1995, Pat. No. 5,668,718, which is a continuation-in-part of application No. 08/289,652, Aug. 12, 1994, abandoned, which is a continuation of application No. 08/125,409, Sep. 22, 1993, abandoned.

[51] Int. Cl.[7] ..................................................... G06F 19/00
[52] U.S. Cl. .............................................................. 705/8
[58] Field of Search ................................ 705/8, 7, 1, 15; 702/1, 19; 119/51.02, 51.01, 51.11, 57.4, 900

[56] References Cited

U.S. PATENT DOCUMENTS

| | | |
|---|---|---|
| Re. 33,600 | 6/1991 | Timmons . |
| 4,082,064 | 4/1978 | Newell, III . |
| 4,405,609 | 9/1983 | Potter . |
| 4,414,206 | 11/1983 | Gordon et al. . |
| 4,457,310 | 7/1984 | Swyer et al. . |
| 4,517,923 | 5/1985 | Palmer . |
| 4,536,494 | 8/1985 | Carter . |
| 4,562,209 | 12/1985 | Chou . |
| 4,618,604 | 10/1986 | DeGreeter et al. . |
| 4,625,728 | 12/1986 | Schonberg . |
| 4,712,511 | 12/1987 | Zamzow et al. . |
| 4,883,817 | 11/1989 | Nissen . |
| 4,920,923 | 5/1990 | Hosoya . |
| 5,355,833 | 10/1994 | Legrain . |
| 5,478,989 | 12/1995 | Shepley . |

FOREIGN PATENT DOCUMENTS

| | | |
|---|---|---|
| 32 18 438 A1 | 11/1983 | Germany . |
| WO 92/03920 | 3/1992 | WIPO . |

*Primary Examiner*—Donald E. McElheny, Jr.

[57] ABSTRACT

The present invention is an apparatus and method for determining when a living animal reaches its optimum rate of growth. This information is then used to calculate the optimal parameters for achieving the maximum Return On Investment. The computer determines the optimal number of birds for a flock, type and amount of feed, length of time between hatching and sale to food processor, etc. The computer consists of a microprocessor, random access memory, a storage device, a keyboard, a computer screen, a printer, a math co-processor.

20 Claims, 65 Drawing Sheets

```
┌─── C A P A B I L I T I E S ───┐
│  SET UP ── 36                     │        SEE NOTES BELOW
│  PRODUCTS ── 38                   │
│  TIME VALUE ─────── 40            │
│  MANAGEMENT SPEC'S. ── 42         │
│  GROW OUT SPEC'S. ── 44           │
│  FIXED/VARIABLE COSTS ── 46       │
│  RAW MATERIALS ──────── 48        │
│  CHOOSE DATA SETS ──── 50         │
│  SOLVE/OPTIMIZE ── 52             │
└───────────────────────────────────┘

╔═══════════════════ NOTES ═══════════════════╗
║  ADD OR DELETE FLOCKS, EDIT THE STATIC VARIABLES  ║
╚═ ENTER TO EXECUTE HILITED CHOICE, ESC=PREVIOUS MENU ═╝

┌─── C A P A B I L I T I E S ───┐
│ ↑ SOLVE/OPTIMIZE ── 52            │
│                                   │
│  MANAGEMENT REPORT ── 54          │
│  REVIEW/PREDICTIONS/DIETS ── 56   │
│  FIELD MEASUREMENTS ── 58         │
│  MODEL CREATION ── 60             │
│  CHANGE DATABASE ── 62            │
│  USE DOS COMMANDS ── 64           │
│  EXIT TO DOS (QUIT) ── 66         │
└───────────────────────────────────┘

╔═══════════════════ NOTES ═══════════════════╗
║                                              ║
╚═ ENTER TO EXECUTE HILITED CHOICE, ESC=PREVIOUS MENU ═╝
```

| Strain/Species | Sex | Feed Form | Nutrition % of NRC | tt | k | B | L | L X tt | B^B |
|---|---|---|---|---|---|---|---|---|---|
| | | | Fitted from data of Waibel et al | | | | | | |
| Turkey | M | Meal, | 110-110-110 | 98.692 | .0176 | 5.6892 | .1002 | 9.8910 | 19751.0 |
| Turkey | M | 1% fat | 110-100-90 | 99.499 | .0174 | 5.6535 | .0984 | 9.7935 | 17917.3 |
| Turkey | M | | 100-100-100 | 100.422 | .0173 | 5.7025 | .0989 | 9.9276 | 20487.8 |
| Turkey | M | | 90-90-90 | 106.004 | .0162 | 5.5604 | .0900 | 9.5398 | 13902.4 |
| Turkey | M | | 90-100-100 | 101.475 | .0171 | 5.6679 | .0969 | 9.8327 | 18633.7 |
| Turkey | M | | 80-100-100 | 106.809 | .0165 | 5.8467 | .0967 | 10.3245 | 30469.1 |
| Turkey | M | Pellet | 110-110-110 | 93.822 | .0183 | 5.5550 | .1015 | 9.5250 | 13698.2 |
| Turkey | M | 1% fat | 110-100-90 | 95.302 | .0178 | 5.4588 | .0972 | 9.2649 | 10560.5 |
| Turkey | M | | 100-100-100 | 97.792 | .0176 | 5.5669 | .0977 | 9.5574 | 14149.3 |
| Turkey | M | | 90-90-90 | 104.569 | .0164 | 5.5290 | .0904 | 9.4548 | 12768.8 |
| Turkey | M | | 90-100-100 | 100.557 | .0172 | 5.6621 | .0976 | 9.8170 | 18343.7 |
| Turkey | M | | 80-100-100 | 105.928 | .0166 | 5.8215 | .0968 | 10.2553 | 28432.5 |
| Turkey | M | Meal, | 110-110-110 | 95.996 | .0182 | 5.7210 | .1039 | 9.9784 | 21554.7 |
| Turkey | M | 3-8% fat | 110-100-90 | 95.792 | .0182 | 5.7239 | .1043 | 9.9863 | 21727.5 |
| Turkey | M | | 100-100-100 | 96.781 | .0181 | 5.7585 | .1042 | 10.0812 | 23888.9 |
| Turkey | M | | 90-90-90 | 101.152 | .0172 | 5.6681 | .0972 | 9.8334 | 18645.7 |
| Turkey | M | | 90-100-100 | 98.967 | .0175 | 5.6258 | .0982 | 9.7179 | 16612.1 |
| Turkey | M | | 80-100-100 | 101.447 | .0175 | 5.8771 | .1026 | 10.4087 | 33145.7 |
| Turkey | M | Pellet | 110-110-110 | 92.607 | .0188 | 5.7026 | .1072 | 9.9277 | 20490.5 |
| Turkey | M | 3-8% fat | 110-100-90 | 96.128 | .0180 | 5.6294 | .1012 | 9.7275 | 16772.7 |
| Turkey | M | | 100-100-100 | 96.787 | .0178 | 5.6165 | .1001 | 9.6925 | 16195.3 |
| Turkey | M | | 90-90-90 | 102.718 | .0168 | 5.6133 | .0943 | 9.6839 | 16056.3 |
| Turkey | M | | 90-100-100 | 97.999 | .0178 | 5.7482 | .1026 | 10.0530 | 23225.0 |
| Turkey | M | | 80-100-100 | 103.913 | .0170 | 5.8517 | .0995 | 10.3383 | 30893.9 |
| Turkey | F | Meal, | 110-110-110 | 71.807 | .0228 | 5.1243 | .1166 | 8.3727 | 4327.4 |
| Turkey | F | 1% fat | 110-100-90 | 72.739 | .0224 | 5.0937 | .1140 | 8.2931 | 3996.1 |
| Turkey | F | | 100-100-100 | 74.233 | .0218 | 5.0609 | .1106 | 8.2065 | 3664.6 |
| Turkey | F | | 90-90-90 | 76.135 | .0214 | 5.1096 | .1095 | 8.3343 | 4164.3 |
| Turkey | F | | 90-100-100 | 74.819 | .0220 | 5.1964 | .1145 | 8.5634 | 5236.7 |
| Turkey | F | | 80-100-100 | 78.564 | .0211 | 5.2584 | .1111 | 8.7280 | 6173.0 |
| Turkey | F | Pellet | 110-110-110 | 71.006 | .0226 | 4.9932 | .1131 | 8.0294 | 3069.8 |
| Turkey | F | 1% fat | 110-100-90 | 71.543 | .0224 | 4.9736 | .1115 | 7.9783 | 2916.9 |
| Turkey | F | | 100-100-100 | 71.218 | .0228 | 5.0870 | .1162 | 8.2750 | 3924.4 |
| Turkey | F | | 90-90-90 | 75.672 | .0213 | 5.0286 | .1073 | 8.1219 | 3367.4 |
| Turkey | F | | 90-100-100 | 73.365 | .0223 | 5.1254 | .1142 | 8.3759 | 4341.2 |
| Turkey | F | | 80-100-100 | 79.485 | .0209 | 5.2763 | .1104 | 8.7756 | 6474.6 |
| Turkey | F | Meal, | 110-110-110 | 71.936 | .0227 | 5.1370 | .1169 | 8.4066 | 4476.4 |
| Turkey | F | 3-8% fat | 110-100-90 | 77.180 | .0206 | 4.8855 | .1004 | 7.7498 | 2321.2 |
| Turkey | F | | 100-100-100 | 75.660 | .0209 | 4.8616 | .1016 | 7.6880 | 2182.0 |
| Turkey | F | | 90-90-90 | 75.159 | .0219 | 5.1876 | .1137 | 8.5455 | 5143.6 |
| Turkey | F | | 90-100-100 | 78.320 | .0203 | 4.8910 | .0991 | 7.7639 | 2354.0 |
| Turkey | F | | 80-100-100 | 82.134 | .0197 | 5.0602 | .0999 | 8.2046 | 3657.9 |
| Turkey | F | Pellet | 110-110-110 | 68.488 | .0240 | 5.1843 | .1246 | 8.5314 | 5071.4 |
| Turkey | F | 3-8% fat | 110-100-90 | 69.151 | .0234 | 5.0583 | .1186 | 8.1977 | 3640.0 |
| Turkey | F | | 100-100-100 | 71.137 | .0229 | 5.0856 | .1163 | 8.2712 | 3909.5 |
| Turkey | F | | 90-90-90 | 75.254 | .0214 | 5.0001 | .1069 | 8.0474 | 3125.7 |
| Turkey | F | | 90-100-100 | 72.786 | .0225 | 5.1459 | .1158 | 8.4299 | 4582.1 |
| Turkey | F | | 90-100-100 | 75.827 | .0220 | 5.3000 | .1166 | 8.8368 | 6897.0 |

FIG. 2A

Emmans, 1991

| | | | | | | | |
|---|---|---|---|---|---|---|---|
| Turkey | M | | 108.500 | .0153 | 5.2576 | .0805 | 8.7311 | 6192.8 |
| Turkey | F | | 87.500 | .0178 | 4.7469 | .0845 | 7.3933 | 1625.1 |
| Turkey | M | | 117.800 | .0145 | 5.5185 | .0800 | 9.4261 | 12407.7 |
| Turkey | F | | 103.100 | .0153 | 4.8425 | .0741 | 7.6387 | 2077.0 |
| Turkey | F | | 72.700 | .0215 | 4.7734 | .1026 | 7.4610 | 1738.9 |
| Turkey | M | | 80.300 | .0216 | 5.6660 | .1224 | 9.8275 | 18536.8 |
| Turkey | F | | 64.500 | .0248 | 4.9510 | .1228 | 7.9197 | 2750.9 |
| Turkey | M | | 77.400 | .0229 | 5.8853 | .1348 | 10.4315 | 33909.9 |
| Turkey | F | | 69.500 | .0242 | 5.3758 | .1301 | 9.0415 | 8446.2 |
| Turkey | M | | 81.000 | .0218 | 5.8462 | .1274 | 10.3233 | 30433.1 |
| Turkey | F | | 64.290 | .0258 | 5.2402 | .1352 | 8.6797 | 5882.0 |
| Turkey | M | | 76.100 | .0233 | 5.8893 | .1372 | 10.4424 | 34282.8 |
| Turkey | M | | 74.200 | .0229 | 5.4695 | .1253 | 9.2936 | 10868.0 |

Hurwiz et al 1991

| | | | | | | |
|---|---|---|---|---|---|---|
| Broiler | | 39.125 | .0397 | 4.7269 | .1877 | 7.3421 | 1543.9 |

Talpaz et al 1991

| | | | | | | |
|---|---|---|---|---|---|---|
| Broiler | | 35.810 | .0422 | 4.5321 | .1713 | 6.8488 | 942.7 |
| Broiler | | 33.510 | .0459 | 4.6558 | .2137 | 7.1611 | 1288.3 |
| Broiler | | 29.771 | .0490 | 4.3049 | .2109 | 6.2841 | 536.0 |
| Broiler | | 30.585 | .0479 | 4.2101 | .1979 | 6.0520 | 425.0 |

Talpaz et al, 1986

| | | | | | | |
|---|---|---|---|---|---|---|
| Broiler | | 40.630 | .0376 | 4.6075 | .1732 | 7.0388 | 1140.1 |

Gous et al., 1992

| | | | | | | | |
|---|---|---|---|---|---|---|---|
| Broiler Ross 708 | F | | 51.000 | .0271 | 3.9833 | .1079 | 5.5029 | 246.0 |
| Broiler Ross 708 | M | | 50.100 | .0303 | 4.5632 | .1383 | 6.9288 | 1019.5 |
| Broiler Ross 788 | F | | 48.000 | .0287 | 3.9654 | .1138 | 5.4624 | 235.7 |
| Broiler Ross 788 | M | | 49.700 | .0304 | 4.5307 | .1377 | 6.8437 | 939.5 |
| Broiler Ross 608 | F | | 52.900 | .0257 | 3.8944 | .1001 | 5.2953 | 199.3 |
| Broiler Ross 608 | M | | 46.400 | .0336 | 4.7542 | .1597 | 7.4101 | 1655.6 |
| Broiler Ross 688 | F | | 44.500 | .0343 | 4.6013 | .1578 | 7.0221 | 1122.3 |
| Broiler Ross 688 | M | | 47.300 | .0312 | 4.3744 | .1365 | 6.4565 | 636.3 |
| Broiler Hubbard | F | | 53.100 | .0273 | 4.2615 | .1163 | 6.1755 | 481.8 |
| Broiler Hubbard | M | | 44.600 | .0368 | 5.1618 | .1900 | 8.4740 | 4779.0 |
| Broiler Hybro | F | | 47.200 | .0293 | 3.9867 | .1168 | 5.5130 | 248.0 |
| Broiler Hybro | M | | 46.800 | .0310 | 4.2665 | .1323 | 6.1916 | 487.8 |

Anthony et al., 1991

| | | | | | | |
|---|---|---|---|---|---|---|
| Turkey | | 73.300 | .0210 | 4.6613 | .0979 | 7.1761 | 1306.5 |
| turkey | | 78.400 | .0180 | 4.1009 | .0738 | 5.7859 | 326.1 |
| Quail | | 16.100 | .0880 | 4.1239 | .3629 | 5.8427 | 344.7 |
| Quail | | 17.000 | .0720 | 3.4008 | .2449 | 4.1633 | 64.2 |
| Quail | | 26.590 | .0440 | 3.2091 | .1412 | 3.7418 | 42.2 |
| Broiler | | 70.400 | .0170 | 3.3095 | .0563 | 3.9635 | 52.5 |
| Broiler | | 92.200 | .0140 | 3.6357 | .0509 | 4.6930 | 109.2 |
| Broiler | | 135.900 | .0100 | 3.8923 | .0389 | 5.2865 | 198.3 |

FIG.2B

```
┌──── C A P A B I L I T I E S ────┐
│ SET UP ── 36                    │
│ PRODUCTS ── 38                  │      SEE NOTES BELOW
│ TIME VALUE ──── 40              │
│ MANAGEMENT SPEC'S. ── 42        │
│ GROW OUT SPEC'S. ── 44          │
│ FIXED/VARIABLE COSTS ── 46      │
│ RAW MATERIALS ──────── 48       │
│ CHOOSE DATA SETS ───── 50       │
│ SOLVE/OPTIMIZE ── 52            │
└─────────────────────────────────┘
```

```
╔═══════════════════ NOTES ═══════════════════╗
║   ADD OR DELETE FLOCKS, EDIT THE STATIC VARIABLES   ║
║                                                      ║
╚═ ENTER TO EXECUTE HILITED CHOICE, ESC=PREVIOUS MENU ═╝
```

```
┌──── C A P A B I L I T I E S ────┐
│ SOLVE/OPTIMIZE ── 52            │
│                                 │
│ MANAGEMENT REPORT ── 54         │
│ REVIEW/PREDICTIONS/DIETS ── 56  │
│ FIELD MEASUREMENTS ── 58        │
│                                 │
│ MODEL CREATION ── 60            │
│ CHANGE DATABASE ── 62           │
│ USE DOS COMMANDS ── 64          │
│ EXIT TO DOS (QUIT) ── 66        │
└─────────────────────────────────┘
```

```
╔═══════════════════ NOTES ═══════════════════╗
║                                                      ║
╚═ ENTER TO EXECUTE HILITED CHOICE, ESC=PREVIOUS MENU ═╝
```

FLOCK DATA

| CODE | NAME | GROUP MODEL | FARM NAME |
|------|------|-------------|-----------|
| T2   | T2   | *BROIL_NL   | T2        |
| TEST | TEST | *BROIL_NL   | TEST      |

INS / ENTER / DEL / ESC

CHOOSE AND USE F9 KEY TO MAINTAIN STATIC VARIABLES FOR MODEL •FL1•

FIG. 7

FLOCK DATA 70

| CODE | NAME | GRO |
|------|------|-----|
| T2   | T2   |     |
| TEST | TEST |     |

FLOCK DATA MAINTENANCE

THIS RECORD WILL BE CHANGED

FARM NAME: T2 —— 74
72
FLOCK NAME: T2

PURCHASED —— 76
FROM: T2    78

REFERENCE CODE: T2

FORMULATION GROUP: ——— 80

SELECTOR TABLE: *BROIL_NL
                    82
AUTOMATIC AGE CALCULATION: NO YES NO

• FL2

INS /
CHOOSE AND USE F9 KEY T

F1=HELP
ESC TO EXIT

TABLE: PRODUCTS.T
PROD_CONSTRAINT

| PRODUCTS | | 1.000<br>-- $/LB -- | 2.000<br>MIN @ MKT | 3.000<br>MAX @ MKT |
|---|---|---|---|---|
| SHRK_WT | LB 2.000 | 0.3800 | 3.8000 | 3.9000 |
| WOG_WT | LB 4.000 | 0.5000 | 0.0000 | 100.0000 |
| WOG_WST | LB 5.000 | 0.0500− | 0.0000 | 100.0000 |
| BREAST | LB 7.000 | 1.7000 | 0.0000 | 100.0000 |
| THIGH | LB 8.000 | 0.0500 | 0.0000 | 100.0000 |
| WING | LB 9.000 | 0.3200 | 0.0000 | 100.0000 |
| NECK | LB 10.000 | 0.1500 | 0.0000 | 100.0000 |
| DRUM | LB 11.000 | 0.2500 | 0.0000 | 100.0000 |
| BACK | LB 12.000 | 0.1500 | 0.0000 | 100.0000 |
| PTS_WST | LB 13.000 | 0.1000− | 0.0000 | 100.0000 |

FIG. 8

F1=HELP
ESC TO EXIT

TABLE: TIME.T

| TIME_ROW | TIME_COL | | |
|---|---|---|---|
| | 1.000 | 2.000 | 3.000 |
| | LOCK | MINIMUM | MAXIMUM |
| MKT/AGE,DY  0.000 | 0.0000 | 43.0000 | 44.0000 |
| IDLE TIME  1.000 | 14.0000 | 0.0000 | 0.0000 |
| BROOD.PERD  2.000 | 0.0000 | 0.0000 | 0.0000 |
| SQFT/BIRD  3.000 | 0.0000 | 0.3000 | 0.9000 |

FIG. 9

F1=HELP
ESC TO EXIT

TABLE: INFORMTN.T
CONDITION

| SERIES | 1.000<br>AGE, DAYS | 2.000<br>TEMP (F) | 3.000<br>HUMIDITY, % |
|---|---|---|---|
| 1.0000 | 0.0000 | 88.0000 | 70.0000 |
| 2.0000 | 21.0000 | 90.0000 | 55.0000 |
| 3.0000 | 35.0000 | 90.0000 | 55.0000 |
| 4.0000 | 56.0000 | 90.0000 | 55.0000 |
| 5.0000 | 28.0000 | 65.0000 | 65.0000 |
| 6.0000 | 35.0000 | 65.0000 | 65.0000 |
| 7.0000 | 42.0000 | 65.0000 | 65.0000 |
| 8.0000 | 56.0000 | 65.0000 | 65.0000 |
| 9.0000 | 56.0000 | 65.0000 | 65.0000 |
| 10.0000 | 63.0000 | 65.0000 | 65.0000 |

FIG. 10

F1=HELP
ESC TO EXIT

TABLE: RECOMMEND.T
—— RECOMMEND

| FORMULATING_AGE | 1.000<br>AIR,M/SEC | 2.000<br>AIR,AM PPM | 3.000<br>AIR,OXY % | 4.000<br>LITTER, % | 5.000<br>FDR "/1000 | 6.000<br>WTR "/1000 |
|---|---|---|---|---|---|---|
| 0.0000 | 0.0000 | 20.0000 | 0.0000 | 10.0000 | 0.0000 | 0.0000 |
| 21.0000 | 0.0000 | 30.0000 | 0.0000 | 20.0000 | 0.0000 | 0.0000 |
| 42.0000 | 0.0000 | 40.0000 | 0.0000 | 30.0000 | 0.0000 | 0.0000 |
| 63.0000 | 0.0000 | 50.0000 | 0.0000 | 40.0000 | 0.0000 | 0.0000 |
| 999.0000 | 0.0000 | 60.0000 | 0.0000 | 50.0000 | | |

112 (brace on FORMULATING_AGE values)
110, 114, 116, 118, 120, 122, 124

FIG. 11

TABLE: COST.T
NO COLUMNS 0.0000

0.0000
0.0000
0.0000
0.0000
0.0000
0.0000
0.0600

126

F1=HELP
ESC TO EXIT

COST_SOURCES

FIX, $/YR —— 128         1.000
PRCSS, $/YR —— 130       2.000
CHICK, $$/BD —— 132      3.000
MARKT, $/YR —— 134       4.000
PRPNE, $/YR —— 136       5.000
BROOD, $/FL —— 138       6.000
GRWER, $/LB —— 140       7.000

INGREDIENT UPDATE

| AVAIL | GROUP | SHORT NAME | MIN | MAX | CTRL | COST/CWT | NU | HA |
|-------|-------|------------|-----|-----|------|----------|----|----|
| AVAIL | A-GRN | CORN | 0.00 | 0.00 | | 3.890 | Y | Y |
| AVAIL | B-VPR | SOYMEAL (47.5) | 0.00 | 0.00 | | 9.100 | Y | N |
| AVAIL | C-APR | FEATHER MEAL | 0.00 | 0.00 | | 10.000 | N | N |
| AVAIL | C-APR | MEAT/BONE MEAL | 0.00 | 0.00 | | 10.400 | N | N |
| AVAIL | C-APR | POURLTRY B/P | 0.00 | 0.00 | | 12.000 | N | N |
| AVAIL | D-MIN | LIME (FINE) | 0.00 | 0.00 | * | 1.600 | N | N |
| AVAIL | D-MIN | PHOS/MONO-D P21 | 0.00 | 0.00 | * | 15.200 | N | N |
| AVAIL | E-MIC | DL-METHIONINE | 0.00 | 0.00 | * | 136.000 | N | N |
| AVAIL | E-MIC | L-LYSINE (78) | 0.00 | 0.00 | * | 62.000 | N | N |
| AVAIL | E-MIC | SALT | 0.00 | 0.00 | | 6.200 | N | N |
| AVAIL | E-MIC | TOTAL.FT | 0.00 | 0.00 | | 69.000 | N | N |
| AVAIL | E-MIC | TOTAL.ST | 0.00 | 0.00 | | 74.000 | N | N |
| AVAIL | E-CAL | FAT (AN/VEG) | 0.00 | 0.00 | | 13.250 | N | N |
| NO | A-GRN | ADM BARLEY | 0.00 | 0.00 | | 3.260 | N | N |
| NO | A-GRN | ALFALFA | 0.00 | 0.00 | | 5.000 | N | N |
| NO | A-GRN | BARLEY (POOR/Q) | 0.00 | 20.00 | | 4.000 | N | N |
| NO | A-GRN | BARLEY | 0.00 | 10.00 | | 3.850 | N | N |

CHOOSE & ENTER OR ESC

INGREDIENT UPDATE

| AVAIL | GROUP | SHORT NAME | | | |
|---|---|---|---|---|---|
| AVAIL | A-GRN | CORN | | | |
| AVAIL | B-VPR | SOYMEAL (47.5) | | | |
| AVAIL | C-APR | FEATHER MEAL | | | |
| AVAIL | C-APR | MEAT/BONE MEAL | | | |
| AVAIL | C-APR | POURLTRY B/P | | | |
| AVAIL | D-MIN | LIME (FINE) | | | |
| AVAIL | D-MIN | PHOS/MONO-D P21 | | | |
| AVAIL | E-MIC | DL-METHIONINE | | | |
| AVAIL | E-MIC | L-LYSINE (78) | | | |
| AVAIL | E-MIC | SALT | | | |
| AVAIL | E-MIC | TOTAL.FT | | | |
| AVAIL | E-MIC | TOTAL.ST | | | |
| AVAIL | E-CAL | FAT (AN/VEG) | | | |
| AVAIL | A-GRN | ADM BARLEY | | | |
| NO | A-GRN | ALFALFA | | | |
| NO | A-GRN | BARLEY (POOR/Q) | 0.00 20.00 | 4.000 | N N |
| NO | A-GRN | BARLEY | 0.00 10.00 | 3.850 | N N |

CHOOSE & ENTER OR ESC

THIS RECORD WILL BE CHANGED

COST 162

CHOICES 166 168

AVAILABILITY AVAIL    AVAIL MAYBE NO COST

164

| | MINIMUM AMOUNT | 0.00 |
| IT | MAXIMUM AMOUNT | 0.00 |
| AVAIL | | |

COST 8.8900

```
CHANGE RATION DATE

ENTER NEW
RATION DATE
09/19/93
SEP 19, 1993

IS DATE
CORRECT
(Y/N):
```
• EU2 •

FIG. 16B     170

| TO BE FORMULATED | | | USE F7 KEY TO CHANGE RATION DATE |
|---|---|---|---|
| CODE | NAME | MODEL | |
| TEST | TEST | *BROIL_NL | FORMULATE LIST MAINTENANCE |
| | | | INS KEY ADDS A FLOCK TO THE LIST |
| | | | DEL KEY REMOVES A FLOCK FROM THE LIST |
| | | | TO CHANGE PRODUCTION VARIABLES SELECT FLOCK AND ENTER |

• EU1 •

| SEQUENCING MODEL | REPORTING MODEL | SEQUENCING VARIABLE | |
|---|---|---|---|
| 1. OPTIMUM | RESULTS | AGEB | 174 |
| 2. OPTIMUM | PERFORMANCE | AGEB | 176 |
| 3. OPTIMUM | YIELD | AGEB | 178 |
| 4. OPTIMUM | FD/FACTORS | AGEB | 180 |
| 5. OPTIMUM | NUT/ALLNCE | AGEB | 182 |
| 6. RESOURCS | RAW/MATRLS | AGEB | 184 |
| 7. OPTIMUM | INDIV-BIRD | AGEB | 186 |

CHOOSE AND ENTER OR ESC TO EXIT

1. OPTIMUM RESULTS FOR FELT1 SEQUENCED BY AGEB — 174'

| | | DATA SETS USED | | | | |
|---|---|---|---|---|---|---|
| | TOTAL | 1757 | 1756 | 1755 | 1754 | 1753 |
| PER YEAR BASIS: | | | | | | |
| PER HOUSE: | | | | | | |
| End Product Optimized | | BODY PARTS | BODY PARTS | BODY PARTS | BODY PARTS | BODY PARTS |
| House size .............. sqft | | 40,000 | 40,000 | 40,000 | 40,000 | 40,000 |
| Flock cycles per year ...... (optimal) | | 4.17 | 4.17 | 4.17 | 4.17 | 4.17 |
| Net margin .......... (maximal)$ | 217,951 | 217,951 | 0 | 0 | 0 | 0 |
| Sales revenue ............... $ | 799,055 | 799,055 | 0 | 0 | 0 | 0 |
| Fixed cost .................. $ | 100,000 | 100,000 | 0 | 0 | 0 | 0 |
| Cumulative Feed Cost ........ $ | | 218,164 | 166,515 | 107,370 | 57,138 | 22,031 |
| Other cost ................. $ | 481,105 | 481,105 | 0 | 0 | 0 | 0 |
| PER POUND OF LIVE WT: | | | | | | |
| Net Margin ................. $ | | 0.1604 | 0.0000 | 0.0000 | 0.0000 | 0.0000 |
| Sales Revenue .............. $ | | 0.5882 | 0.0000 | 0.0000 | 0.0000 | 0.0000 |
| Fixed Cost ................. $ | | 0.0736 | 0.0000 | 0.0000 | 0.0000 | 0.0000 |
| Feed Cost .................. $ | | 0.1606 | 0.0000 | 0.0000 | 0.0000 | 0.0000 |
| Other Cost ................. $ | | 0.3541 | 0.0000 | 0.0000 | 0.0000 | 0.0000 |
| PER FLOCK BASIS: | | | | | | |
| Strain ..................... | | NICHOL.88 | NICHOL.88 | NICHOL.88 | NICHOL.88 | NICHOL.88 |
| Brd Mktg. Age Dys ....... (optimal) | | 115 | 0 | 0 | 0 | 0 |
| Ending age ............... day | | 115 | 98 | 77 | 56 | 35 |
| Live Wt ................. (optimal) | | 20.03 | 16.40 | 11.45 | 6.55 | 2.76 |
| Bird Size, Shrink Wt ...... (optimal) | | 19.54 | 0.00 | 0.00 | 0.00 | 0.00 |
| Shrink (6 hr. fast) ........... % | | 2.44 | 0.00 | 0.00 | 0.00 | 0.00 |
| FC - Live Wt ........... (optimal) | | 2.23 | 0.00 | 0.00 | 0.00 | 0.00 |
| FC Shrink Wt ........... (optimal) | | 2.27 | 0.00 | 0.00 | 0.00 | 0.00 |
| FC - Post Chill W.O.G. ..... (optimal) | | 2.75 | 0.00 | 0.00 | 0.00 | 0.00 |
| FC - Disassembled Total Parts ..... | | 2.82 | 0.00 | 0.00 | 0.00 | 0.00 |
| Start Bird Number ........ (optimal) | | 18,201 | 18,201 | 18,201 | 18,201 | 18,201 |
| Bird density sqft/bd ...... (optimal) | | 2.40 | 0.00 | 0.00 | 0.00 | 0.00 |
| Bird number at processing ........ | | 16,667 | 0 | 0 | 0 | 0 |
| Projected Live ............... % | | 91.57 | 0.00 | 0.00 | 0.00 | 0.00 |
| YIELD POUNDS/BIRD: | | | | | | |
| Six hour fast weight ...... (optimal) | 19.54 | 19.54 | 0.00 | 0.00 | 0.00 | 0.00 |
| WOG proj. yield ... (optimal) | 16.14 | 16.14 | 0.00 | 0.00 | 0.00 | 0.00 |
| Breast proj. yield ... (optimal) | 6.08 | 6.08 | 0.00 | 0.00 | 0.00 | 0.00 |
| Thighs proj. yield ......... | 2.61 | 2.61 | 0.00 | 0.00 | 0.00 | 0.00 |
| Drums proj. yield ......... | 2.08 | 2.08 | 0.00 | 0.00 | 0.00 | 0.00 |
| Neck proj. yield ......... | 0.97 | 0.97 | 0.00 | 0.00 | 0.00 | 0.00 |
| Wings proj. yield ......... | 1.79 | 1.79 | 0.00 | 0.00 | 0.00 | 0.00 |
| Back proj. yield ......... | 2.22 | 2.22 | 0.00 | 0.00 | 0.00 | 0.00 |

FIG. 18b

2. OPTIMUM RESULTS FOR FELT1 SEQUENCED BY AGE8  — 176'

| | TOTAL | DATA SETS USED 1757 | 1756 | 1755 | 1754 | 1753 |
|---|---|---|---|---|---|---|
| End Product Optimized | | BODY PARTS | BODY PARTS | BODY PARTS | BODY PARTS | BODY PARTS |
| Strain | | NICHOL.88 | NICHOL.88 | NICHOL.88 | NICHOL.88 | NICHOL.88 |
| Feeding period, day | | 17 | 21 | 21 | 21 | 21 |
| Date Weighed | | 12/17/93 | 12/10/93 | 11/19/93 | 10/29/93 | 10/08/93 |
| Age Weighed | | 115 | 98 | 77 | 56 | 35 |
| Field Weight | | 20.03 | 16.40 | 11.45 | 6.55 | 2.76 |
| Predicted Weight | | 20.03 | 16.40 | 11.45 | 6.55 | 2.76 |
| Weight Variance | | 0.0015 | -2.6455 | 3.0864 | 7.7161 | 6.1729 |
| Feed intake ........ lb/bird_day | | 0.6643 | 0.5774 | 0.4515 | 0.2941 | 0.1513 |
| Feed Intake/Period ...... (optimal) | | 97.30 | 102.73 | 81.71 | 53.57 | 27.78 |
| Actual Feed use/Period ....... tons | | 97.30 | 102.73 | 81.71 | 53.57 | 27.78 |
| FC - Live WT .......... (optimal) | | 2.23 | 1.98 | 1.74 | 1.58 | 1.50 |
| FC - Field Weight | | 2.23 | 1.98 | 1.74 | 1.58 | 1.50 |
| Std. Litter Moisture/Period ...... % | | 0.00 | 0.00 | 0.00 | 0.00 | 0.00 |
| Field Litter Moisture/Period ..... % | | 0.00 | 0.00 | 0.00 | 0.00 | 0.00 |
| Field Coccidiostat | | COBAN | COBAN | COBAN | COBAN | COBAN |
| Std Ammonia ............. % | | 0.00 | 0.00 | 0.00 | 0.00 | 0.00 |
| Field Ammonia ............ ppm | | 0.00 | 0.00 | 0.00 | 0.00 | 0.00 |
| Temperature Degrees, F | | 75.00 | 85.00 | 82.00 | 87.00 | 90.00 |
| Field Temperature ...... degrees F | | 75.00 | 85.00 | 82.00 | 87.00 | 90.00 |

FIG. 18c

3. OPTIMUM RESULTS FOR FELT1 SEQUENCED BY AGEB — 178'

|  |  | TOTAL | DATA SETS USED 1757 | 1756 | 1755 | 1754 | 1753 |
|---|---|---|---|---|---|---|---|
| INPUT PRICES: | | | | | | | |
| Price of whole bird | $/lb | | 0.3000 | 0.0000 | 0.0000 | 0.0000 | 0.0000 |
| Price of Yield | $/lb | | 0.5000 | 0.0000 | 0.0000 | 0.0000 | 0.0000 |
| Price of breast | $/lb | | 1.5000 | 0.0000 | 0.0000 | 0.0000 | 0.0000 |
| Price of thighs | $/lb | | 0.5000 | 0.0000 | 0.0000 | 0.0000 | 0.0000 |
| Price of drums | $/lb | | 0.2000 | 0.0000 | 0.0000 | 0.0000 | 0.0000 |
| Price of neck | $/lb | | 0.1000 | 0.0000 | 0.0000 | 0.0000 | 0.0000 |
| Price of wings | $/lb | | 0.4000 | 0.0000 | 0.0000 | 0.0000 | 0.0000 |
| Price of back | $/lb | | 0.1000 | 0.0000 | 0.0000 | 0.0000 | 0.0000 |
| Price of waste | $/lb | | -0.1000 | 0.0000 | 0.0000 | 0.0000 | 0.0000 |
| SETTLEMENT: | | | | | | | |
| PRICES: | | | | | | | |
| Settlement Price, whole bird | | | 0.0000 | 0.0000 | 0.0000 | 0.0000 | 0.0000 |
| Settlement Price | WOG | | 0.0000 | 0.0000 | 0.0000 | 0.0000 | 0.0000 |
| Settlement Price | Breast | | 0.0000 | 0.0000 | 0.0000 | 0.0000 | 0.0000 |
| Settlement Price | Thighs | | 0.0000 | 0.0000 | 0.0000 | 0.0000 | 0.0000 |
| Settlement Price | Drums | | 0.0000 | 0.0000 | 0.0000 | 0.0000 | 0.0000 |
| Settlement Price | Neck | | 0.0000 | 0.0000 | 0.0000 | 0.0000 | 0.0000 |
| Settlement Price | Wings | | 0.0000 | 0.0000 | 0.0000 | 0.0000 | 0.0000 |
| Settlement Price | Back | | 0.0000 | 0.0000 | 0.0000 | 0.0000 | 0.0000 |
| Settlement Price | Waste | | 0.0000 | 0.0000 | 0.0000 | 0.0000 | 0.0000 |
| TOTAL POUNDS: | | | | | | | |
| Whole brd proj. yield | | 325,654.51 | 325,654.51 | 0.00 | 0.00 | 0.00 | 0.00 |
| Whl brd actual yield | | 0.00 | 0.00 | 0.00 | 0.00 | 0.00 | 0.00 |
| WOG proj. yield (optima) | | 268,976.05 | 268,976.05 | 0.00 | 0.00 | 0.00 | 0.00 |
| WOG actual yield | | 0.00 | 0.00 | 0.00 | 0.00 | 0.00 | 0.00 |
| Breast proj. yield (optima) | | 101,279.29 | 101,279.29 | 0.00 | 0.00 | 0.00 | 0.00 |
| Breast actual yield | | 0.00 | 0.00 | 0.00 | 0.00 | 0.00 | 0.00 |
| Thighs proj. yield | | 43,459.24 | 43,459.24 | 0.00 | 0.00 | 0.00 | 0.00 |
| Thighs actual yield | | 0.00 | 0.00 | 0.00 | 0.00 | 0.00 | 0.00 |
| Drums proj. yield | | 34,677.22 | 34,677.22 | 0.00 | 0.00 | 0.00 | 0.00 |
| Drums actual yield | | 0.00 | 0.00 | 0.00 | 0.00 | 0.00 | 0.00 |
| Neck proj. yield | | 16,187.53 | 16,187.53 | 0.00 | 0.00 | 0.00 | 0.00 |
| Neck actual yield | | 0.00 | 0.00 | 0.00 | 0.00 | 0.00 | 0.00 |
| Wings proj. yield | | 29,888.98 | 29,888.98 | 0.00 | 0.00 | 0.00 | 0.00 |
| Wings actual yield | | 0.00 | 0.00 | 0.00 | 0.00 | 0.00 | 0.00 |
| Back proj. yield | | 36,984.44 | 36,984.44 | 0.00 | 0.00 | 0.00 | 0.00 |
| Back actual yield | | 0.00 | 0.00 | 0.00 | 0.00 | 0.00 | 0.00 |
| Waste of carcass | | 63,177.81 | 63,177.81 | 0.00 | 0.00 | 0.00 | 0.00 |
| Waste actual yield | | 0.00 | 0.00 | 0.00 | 0.00 | 0.00 | 0.00 |

FIG. 18d

4. OPTIMUM RESULTS FOR FELT1 SEQUENCED BY AGEB — 180'

| | TOTAL | DATA SETS USED 1757 | 1756 | 1755 | 1754 | 1753 |
|---|---|---|---|---|---|---|
| PER FLCK BASIS: | | | | | | |
| Beginning age, day | | 98 | 77 | 56 | 35 | 14 |
| Feeding period, day | | 17 | 21 | 21 | 21 | 21 |
| Ending age .......... day | | 115 | 98 | 77 | 56 | 35 |
| Live Wt .............. (optima) | | 20.03 | 16.40 | 11.45 | 8.55 | 2.76 |
| Bird Size, Shrink Wt ...... (optima) | | 19.54 | 0.00 | 0.00 | 0.00 | 0.00 |
| Shrink (6 hr. fast) ............ % | | 2.44 | 0.00 | 0.00 | 0.00 | 0.00 |
| | | | | | | |
| FC - Live Wt ........... (optima) | | 2.23 | 1.98 | 1.74 | 1.58 | 1.50 |
| FC Shrink Wt ........... (optima) | | 2.28 | 0.00 | 0.00 | 0.00 | 0.00 |
| FC - Post Chill W.O.G. ..... (optima) | | 2.75 | 0.00 | 0.00 | 0.00 | 0.00 |
| FC - Disassembled Total Parts ..... | | 2.82 | 0.00 | 0.00 | 0.00 | 0.00 |
| | | | | | | |
| Predicted Fd use/period ...... tons | 369.72 | 97.30 | 102.73 | 81.71 | 53.57 | 27.78 |
| Actual Feed use/Period ....... tons | 369.72 | 97.30 | 102.73 | 81.71 | 53.57 | 27.78 |
| Feed Cost/Ton Ave ...... (optima) | | 141.45 | 146.52 | 151.67 | 155.69 | 153.50 |
| Feed Cost/Period ....... (optima)$ | | 12,380.60 | 14,177.38 | 12,040.94 | 8,415.28 | 4,242.99 |
| Total feed needed .......... tons | | 369.72 | 272.42 | 169.69 | 87.97 | 34.40 |
| Ration cost .............. $/ton | | 127.24 | 138.01 | 147.35 | 157.09 | 152.73 |
| Cumulative Feed Cost ......... $ | | 52,295 | 39,915 | 25,737 | 13,696 | 5,281 |
| Total feed cost .............. $ | 52,295.27 | 12,380.60 | 14,177.38 | 12,040.94 | 8,415.28 | 4,242.99 |
| Feed Cost/LB Live Wt ..... (optima) | | 0.1567 | 0.1441 | 0.1309 | 0.1208 | 0.1099 |

FIG. 18e

5. OPTIMUM RESULTS FOR FELT1 SEQUENCED BY AGEB — 182'

| | | DATA SETS USED | | | | |
|---|---|---|---|---|---|---|
| | TOTAL | 1757 | 1756 | 1755 | 1754 | 1753 |
| Feed intake .......... lb/bird_day | | 0.6643 | 0.5774 | 0.4515 | 0.2941 | 0.1513 |
| DAILY INTAKE: | | | | | | |
| ME intake .............. kcal/day | | 1,068.49 | 902.52 | 671.85 | 420.26 | 210.25 |
| Calcium intake ........... gm/day | | 2.4839 | 2.5850 | 2.2870 | 1.7047 | 0.9847 |
| Inorg Phos intake ......... gm/day | | 1.2420 | 1.2925 | 1.1435 | 0.8523 | 0.4924 |
| Meth and cys intake ....... gm/day | | 2.1339 | 2.3137 | 2.1967 | 1.6344 | 0.8266 |
| Lysine ................ gm/day | | 2.3287 | 2.6232 | 2.5824 | 2.0388 | 1.0021 |
| PERCENT: | | | | | | |
| Metabolizable Energy ...... kcal/kg | | 3,546.02 | 3,445.73 | 3,280.52 | 3,149.98 | 3,062.89 |
| Calcium ............ % of intake | | 0.8244 | 0.9869 | 1.1167 | 1.2777 | 1.4345 |
| Inorg Phos ........... % of intake | | 0.4122 | 0.4935 | 0.5584 | 0.6389 | 0.7173 |
| Methionine + cys ..... % of intake | | 0.7082 | 0.8834 | 1.0726 | 1.2250 | 1.2041 |
| Lysine ............... % of intake | | 0.7728 | 1.0015 | 1.2610 | 1.5282 | 1.4599 |

FIG.18f

6.RESOURCS RESULTS FOR FELT1 SEQUENCED BY AGEB — 184'

|  | TOTAL | DATA SETS USED | | | | |
|---|---|---|---|---|---|---|
|  |  | 1757 | 1756 | 1755 | 1754 | 1753 |
| Blood meal (ton) | 4.9468 | 0.9331 | 1.0899 | 1.0003 | 1.1607 | 0.5973 |
| Corn, ground yellow (ton) | 235.0334 | 72.2632 | 67.9659 | 47.8742 | 27.8688 | 15.5250 |
| DL_methionine 99% (ton) | 1.0371 | 0.1625 | 0.2575 | 0.2742 | 0.2133 | 0.1035 |
| Animal/vegetable fat (ton) | 17.4974 | 6.0777 | 6.0195 | 3.5110 | 1.6205 | 0.2352 |
| Feather meal (ton) | 7.7409 | 1.6622 | 2.0117 | 1.8045 | 1.3169 | 0.7524 |
| L_lysine 78.4% (ton) | 0.0277 | 0.0200 | 0.0077 | 0.0000 | 0.0000 | 0.0000 |
| Limestone, grnd (ton) | 1.4526 | 0.3930 | 0.3966 | 0.3061 | 0.1958 | 0.1334 |
| Meat and bone meal (ton) | 29.4810 | 5.8822 | 7.7279 | 7.0536 | 5.3570 | 2.7780 |
| Mono_dibasic phosphate (ton) | 0.0280 | 0.0000 | 0.0000 | 0.0000 | 0.0000 | 0.0280 |
| Poultry by_products (ton) | 1.6298 | 0.0000 | 0.0000 | 0.0000 | 0.1873 | 1.1269 |
| Salt (ton) | 0.5044 | 0.1544 | 0.1376 | 0.0862 | 0.0819 | 0.0368 |
| Soybean meal 47.5% (ton) | 70.3590 | 9.7543 | 17.1129 | 19.8045 | 15.5680 | 6.4637 |

FIG. 18g

7. OPTIMUM RESULTS FOR FELT1 SEQUENCED BY AGEB — 186'

| | TOTAL | DATA SETS USED 1757 | 1756 | 1755 | 1754 | 1753 |
|---|---|---|---|---|---|---|
| End Product Optimized | | BODY PARTS | BODY PARTS | BODY PARTS | BODY PARTS | BODY PARTS |
| Strain | | NICHOL.88 | NICHOL.88 | NICHOL.88 | NICHOL.88 | NICHOL.88 |
| Number of diets to be fed | 6 | 1 | 1 | 1 | 1 | 1 |
| Flock sex (hens or toms) | | HEN | HEN | HEN | HEN | HEN |
| Beginning age, day | | 98 | 77 | 56 | 35 | 14 |
| Feeding period, day | | 17 | 21 | 21 | 21 | 21 |
| Ending age ............ day | | 115 | 98 | 77 | 56 | 35 |
| Temperature Degrees, F | | 75.00 | 85.00 | 82.00 | 87.00 | 90.00 |
| Humidity, % | | 65.00 | 65.00 | 65.00 | 65.00 | 65.00 |
| Brd Mktg. Age Dys ....... (optima) | | 115 | 0 | 0 | 0 | 0 |
| Bird density sqft/bd ...... (optima) | | 2.40 | 0.00 | 0.00 | 0.00 | 0.00 |
| Start Bird Number ....... (optima) | | 18,201 | 18,201 | 18,201 | 18,201 | 18,201 |
| Bird number at processing | | 16,667 | 0 | 0 | 0 | 0 |
| Projected mortality ........... % | | 8.44 | 7.21 | 5.60 | 5.00 | 4.40 |
| Bird Size, Shrink Wt ...... (optima) | | 19.54 | 0.00 | 0.00 | 0.00 | 0.00 |
| Feed intake .......... lb/bird_day | | 0.6643 | 0.5774 | 0.4515 | 0.2941 | 0.1513 |
| FC - Live WT ........... (optima) | | 2.23 | 1.98 | 1.74 | 1.58 | 1.50 |
| IN LB BASIS: | | | | | | |
| Six hour fast weight ...... (optima) | 19.54 | 19.54 | 0.00 | 0.00 | 0.00 | 0.00 |
| WOG proj. yield ... (optima) | 16.14 | 16.14 | 0.00 | 0.00 | 0.00 | 0.00 |
| Breast proj. yield ... (optima) | 6.08 | 6.08 | 0.00 | 0.00 | 0.00 | 0.00 |
| Thighs proj. yield ......... | 2.61 | 2.61 | 0.00 | 0.00 | 0.00 | 0.00 |
| Drums proj. yield ......... | 2.08 | 2.08 | 0.00 | 0.00 | 0.00 | 0.00 |
| Neck proj. yield ......... | 0.97 | 0.97 | 0.00 | 0.00 | 0.00 | 0.00 |
| Wings proj. yield ......... | 1.79 | 1.79 | 0.00 | 0.00 | 0.00 | 0.00 |
| Back proj. yield ......... | 2.22 | 2.22 | 0.00 | 0.00 | 0.00 | 0.00 |
| Waste of carcass .............. | 3.79 | 3.79 | 0.00 | 0.00 | 0.00 | 0.00 |

FIG. 19a

PERFORMANCE/PRODUCTION VARIABLES

| DESCRIPTION | VALUE | DESCRIPTION | VALUE |
|---|---|---|---|
| Diet............................................. | FINISHER | Age weighed, days................... | 0 |
| Placement Date............................. | | Bird number in B.P.U................ | 0 |
| Male..........................................% | 50.00 | Average field body weight, lb...... | 0.0000 |
| Female.......................................% | 50.00 | Number of birds being weighed..... | 0 |
| Strain........................................ | AA*PETSM | Stndrd devition of bird weight.... | 0.0000 |
| End Product Optimized.................... | LIVE BIRD | .............................FLOCK CONDITION | ........ |
| B.P.U. floor space................sqft | 100,000 | Number of diets being fed.......... | 3 |
| Time period between cycle, day....... | 14 | Temperature.................degrees F | 80.00 |
| Using nutrient digestibility.......... | A) NO | Humidity, %........................... | 65.00 |
| Feed form.................................... | B) PELLETS | Periods.............................(dys) | 14 |
| Feed milling cost, $/ton............... | 0.0000 | No. of Birds placed...(optima) | 156,813 |
| Feed delivery cost, $/ton.............. | 0.0000 | Ave bird number in period.......... | 149,592 |
| Feed/Period............................tons | 258.91 | Bird Density sqft/bd..(optima) | 0.0000 |
| Breast blister price redurtn,%....... | 0.00 | Bird Mktg. Age Dys....(optima) | 0 |
| Hours of fast prior to process....... | 10.00 | .............................PERIOD PERFORMANCE | ........ |
| Age at Feed Delivery....(dys) | 21 | Live Wt..................(optima) | 3.35 |
| ........Field Flock checks | ........ | Feed intake, lb/bird_day........... | 0.2473 |
| Diet no. to start for optimztn........ | 1 | | |

FIG. 19b

RATION DATA

| INGREDIENT SHORT NAME | AMOUNT OF INGREDIENT | COST PER CWT | COST IN RATION | % OF RATION | | NUTRIENT NAME | | AMOUNT OF NUTRIENT | UNITS | NIPO | UNITS |
|---|---|---|---|---|---|---|---|---|---|---|---|
| *CORN........ | 1284.4016 | 5.6600 | 72.6971 | 64.22 | | METABOLIZABLE ENERGY..... | 2 | 3260.959 | KC/KG | 355.081 | |
| SOYMEAL (47.5). | 390.2688 | 10.7600 | 41.9929 | 19.51 | | PROTEIN (CRUDE)........ | 1 | 20.531 | -PCT- | 22356.166 | |
| POULTRY B/P... | 180.0000 | 13.1700 | 23.7060 | 9.00 | | CALCIUM................ | 14 | 0.963 | -PCT- | 1049.075 | MG/KG |
| LIME (FINE).... | 6.9616 | 1.1600 | 0.0808 | 0.35 | | PHOSPHORUS (INORGANIC)... | 16 | 0.482 | -PCT- | 524.537 | |
| PHOS/DEFLOR P18 | 22.6039 | 12.0000 | 2.7125 | 1.13 | | SODIUM................. | 21 | 0.199 | -PCT- | 216.657 | |
| CHOLINE (70%).. | 2.2680 | 44.0000 | 0.9979 | 0.11 | | METHIONINE............. | 51 | 0.642 | -PCT- | 699.282 | |
| L-LYSINE (78).. | 1.3843 | 118.0000 | 1.6334 | 0.07 | | METHIONINE + CYSTINE.... | 53 | 0.955 | -PCT- | 1039.903 | |
| RHODIMET-88 % | 6.1830 | 120.0000 | 7.4196 | 0.31 | | LYSINE................. | 54 | 1.086 | -PCT- | 1182.082 | |
| SALT........ | 3.9289 | 2.0000 | 0.0786 | 0.20 | | ARGININE............... | 55 | 1.415 | -PCT- | 1541.241 | -PCT- |
| FAT (AN/VEG)... | 100.0000 | 13.8500 | 13.8500 | 5.00 | | TRYPTOPHAN............. | 56 | 0.221 | -PCT- | 240.829 | |
| GROWER VIT PM | 1.0000 | 311.0000 | 3.1100 | 0.05 | | THREONINE.............. | 63 | 0.813 | -PCT- | 884.840 | |
| TRACE MINERAL | 1.0000 | 23.7700 | 0.2377 | 0.05 | | LINOLEIC ACID (18-2).... | 83 | 1.664 | -PCT- | 1811.845 | |
| | | | | | | XANTHOPHYLL............ | 91 | 13.573 | MG/KG | 1.478 | |
| TOTAL | 2000.0000 | | 168.5164 | 100.00 | | | | | | | |

* by name means Nutrilab(tm) values used for ration

| UNUSED INGREDIENT | COST PER CWT ACTUAL | REQUIRED |
|---|---|---|
| PROPAK-NEW | 16.4500 | 9.3297 |

WG Index = 0.0000055

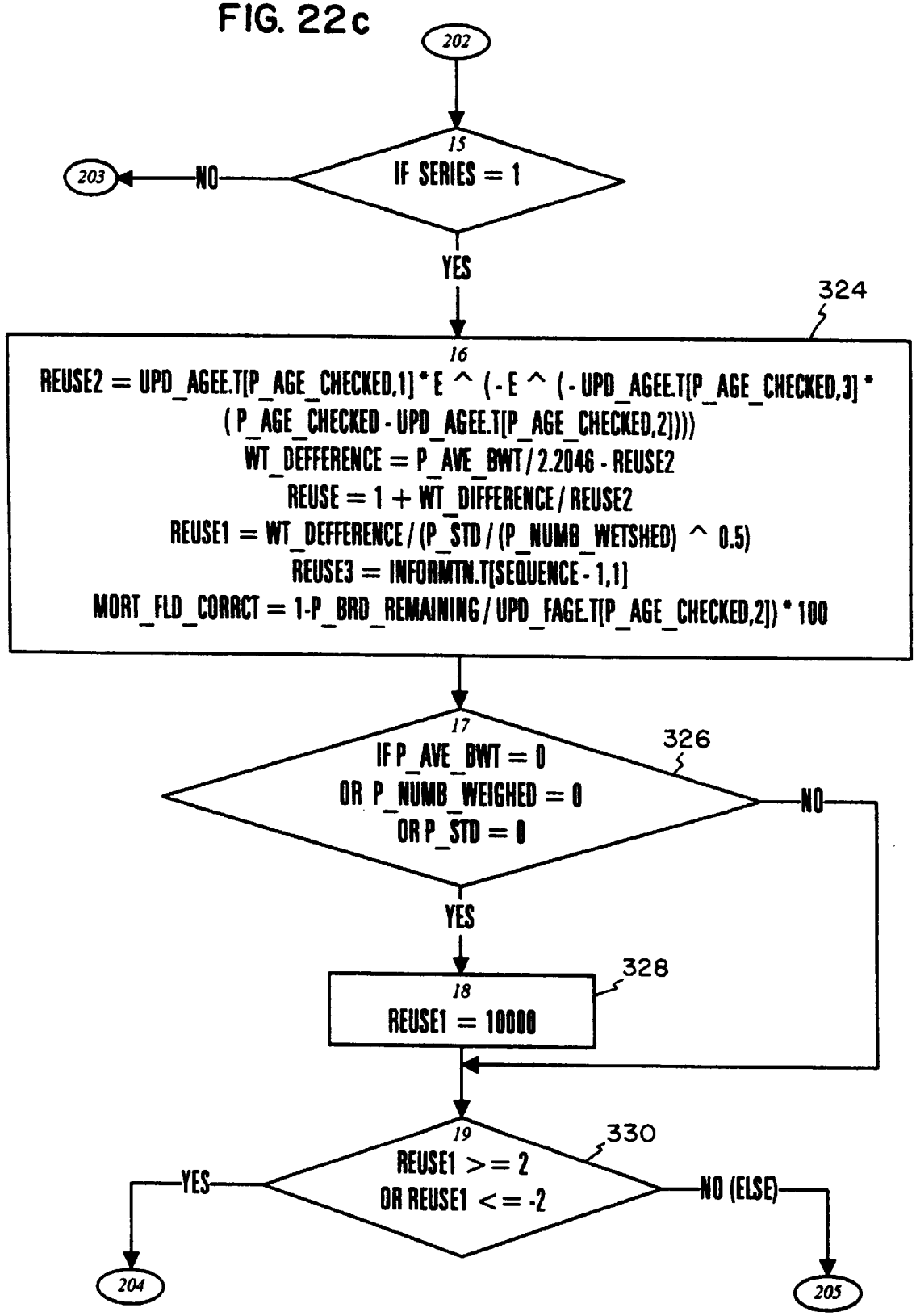

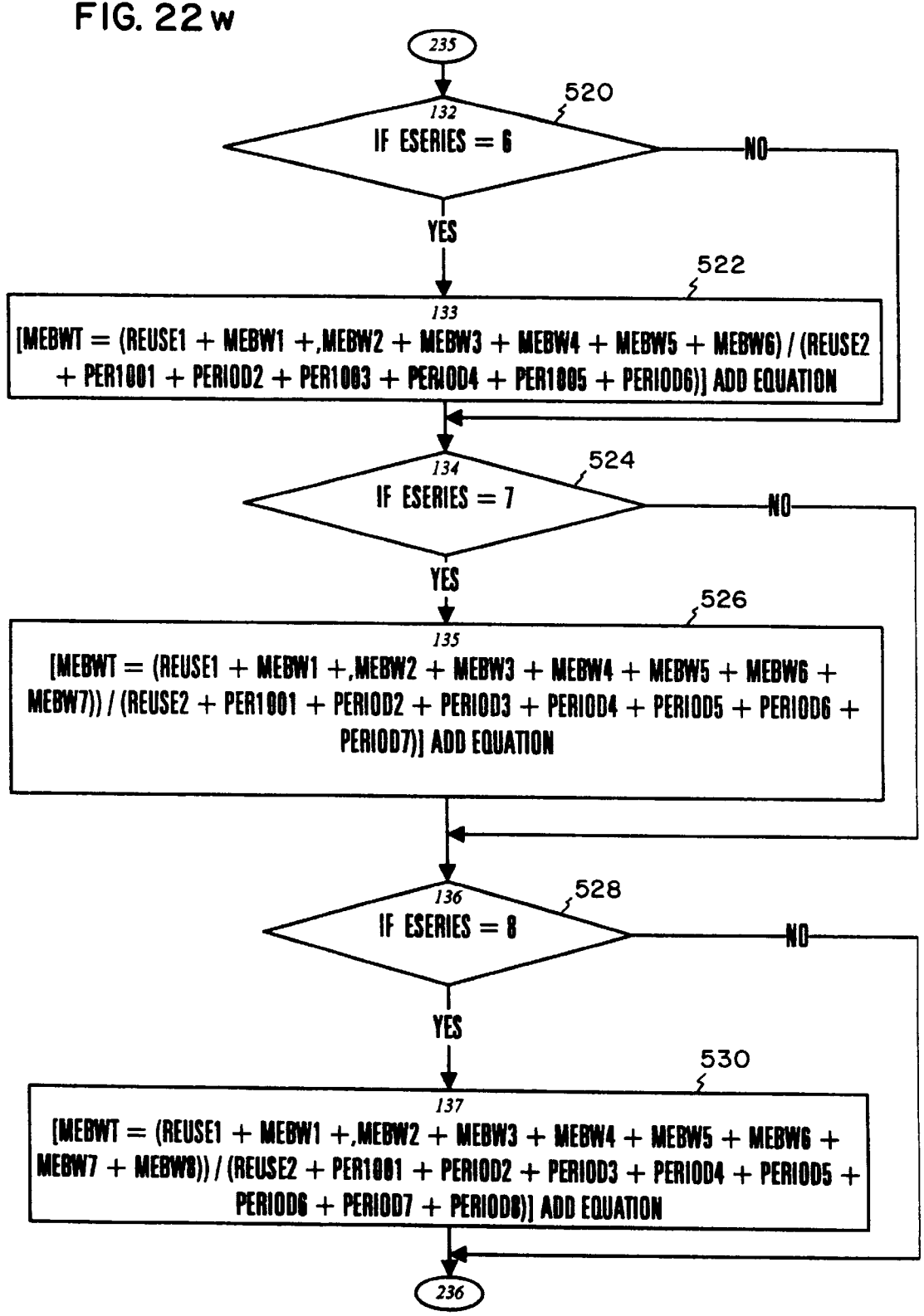

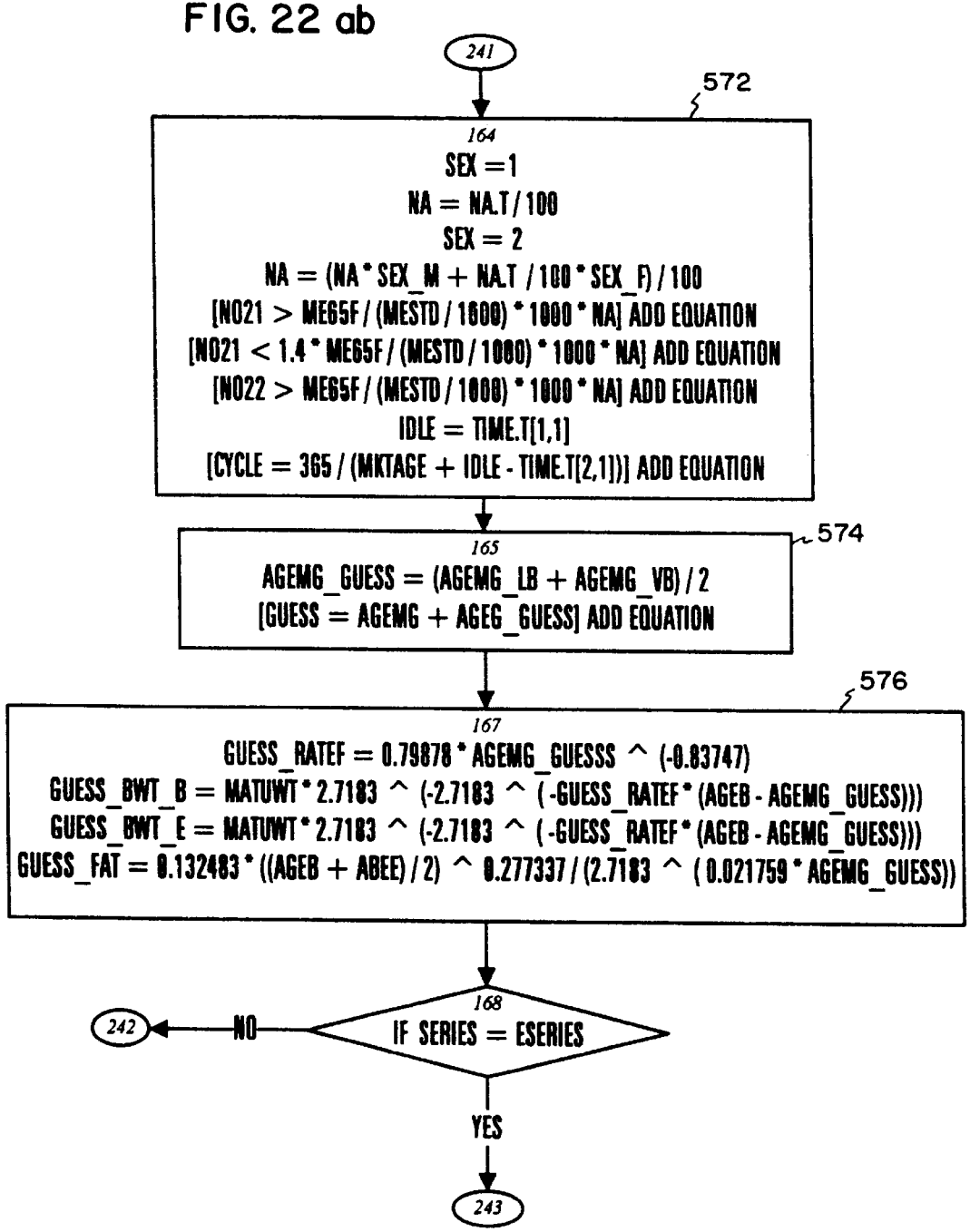

GENERATING GROWTH ALTERNATIVES

REFERENCE TO CO-PENDING APPLICATIONS

This application is a continuation of application Ser. No. 08/442,414, filed May 16, 1995, U.S. Pat. No. 5,668,718 the disclosure of which is incorporated herein by reference, which is a continuation-in-part of U.S. application Ser. No. 08/289,652, filed Aug. 12, 1994, abandoned, which is a file wrapper continuation of U.S. application Ser. No. 08/125,409, filed on Sep. 22, 1993, abandoned.

TECHNICAL FIELD

The present invention relates to generating optimized living entity and edible tissue growth alternatives and amounts, and more specifically to a method and apparatus for generating an inter-variable and temporal relationships between tissue growth factors of an animal in order to optimize edible tissue output production given inherent enterprise finance, resources, processing, and marketing constraints.

BACKGROUND

The economic optimization and viability of an enterprise depends on the ability to accurately analyze the relationship between the cost of materials, services, and labor that are input into the enterprise and the return that is achieved on the product that is output by the enterprise. In agribusiness industries that raise animals such as livestock, poultry, marine animals, etc., the inputs include the animal itself, food, shelter, and services. The output, of course, is the marketable tissue components of the processed animal. One of the most critical relationships in optimizing the economic margins of an enterprise is the relationship between the controllable and uncontrollable factors that affect the rate at which the animal and its tissue components grow and the final size of the animal at marketing age. Thus, it is important to have a value-based food chain model that describes the relationship between each of these factors and the rate of growth of a population of animals.

Variables affecting the growth and yield of edible tissue of animals can be divided into genetic and non-genetic categories. Genetic variables are fixed and are reflected by the growth potential of the individual type of animal of interest. It will be appreciated by those skilled in the art that the growth rate of a animal is never higher and only lower than the maximum potential. During its life, a animal seeks to achieve its genetic potential, but fails due to the impediment of non-genetic variables.

Non-genetic variables that are partially controllable by the commercial operator can be divided further into living factors and food factors. Living factors encompass environmental conditions such as temperature, humidity, animal density, ventilation, disease conditions, air quality, etc. Food factors encompass the types and digested amounts of material that are ingested by a animal. One skilled in the art will appreciate that food factors can be controlled in a commercial environment through nutrition. The food factor reflects a major portion of the cost during the growth period.

To maximize an enterprise's before tax net margin, many scientists have used models to simulate the growth of various types of animals. (see G. C. Emmans, "The Growth of Turkeys," 21 Recent Advances in Turkey Science, 135–166 (C. Nixey and T. C. Grey eds. 1989); H. Talpaz et al., "Dynamic Optimization Model for Feeding of Broilers," Agric. Sys, 121–132 (1986); H. Talpaz et al., "Economic Optimization of a Growth Trajectory for Broilers," 70 Amer. J. Ag. Econ., 382–390 (1988); P. E. Waibel et al., TURKS Program Agricultural Extension Service (University of Minnesota 1985)). It will be appreciated that the various models represent efforts to take into account the incredibly complex and diverse structure of living entities, as well as the innumerable variables that affect the living entities in their environment.

One model that is used to describe animal growth is the Gompertz curve (B. Gompertz, "On the Nature of the Function Expressive of the Law of Human Mortality, and on a New Mode of Determining the Value of Life Contingencies," Philos. Trans. Roy. Soc., 513–585 (1825)), which shows the current mass weight as a function of age with known constant parameters. Gompertz curves have been used to describe the growth of poultry only in terms of a singular factor or characteristic such as a genetic characteristic, a living condition, or a food factor (G. C. Emmans, "The Growth of Turkeys," 21 Recent Advances in Turkey Science, 135–166 (C. Nixey and T. C. Grey eds. 1989); R. M. Gous et al., "A Characterization of the Potential Growth Rate of Six Breeds of Commercial Broiler," 2 Proceedings of XIX World's Poultry Congress, 20–24 (Amsterdam, The Netherlands, September 1992); N. B. Anthony et al., "Comparison of Growth Curves of Weight Selected Populations of Turkeys, Quail and Chickens," 70 Poultry Sci., 13–19 (1991)). However, because all the parameters are independent from one to another among all the curves, each Gompertz curve can describe growth in terms of only one set of conditions.

Because of the complexity of a life form, there is a need for a model that describes growth alternatives in terms of a plurality of different conditions. Such a model would permit an accurate economic analysis that allows a commercial operator to simultaneously (non-repetitive) optimize the relationship between the conditions and growth. In turn, the production of living animals would be more easily controlled in order to optimize production and hence maximize economic return.

SUMMARY

One advantage of the present invention is that it is based on the correlation between constant parameters among a multitude of Gompertz curves, each describing the growth of an animal given a predetermined characteristic. Thus, a commercial poultry operator can use the apparatus and method to simultaneously optimize growth and yield in a plurality of living and food conditions in order to maximize economic return.

The present invention generally relates to a modeling method and operating a computer that computes the time trajectory that a bird can reach its optimum rate of growth with age. Using this information, the computer can simultaneously determine an appropriate size for a flock of birds, the type and amount of feed that should be fed to the flock, and the age at which a flock should be sold to a food processor, in order to maximize the profits realized by a commercial integrator who raises or subcontracts meat production.

More specifically, the present invention is an apparatus for optimizing the ratio between expenditures and rate of growth for living animals. This apparatus includes processing means for optimizing the ratio between expenditures and the rate of growth for animals, wherein the processing optimum rate of growth according to the equation $W = Ae^{(-e^{(-k(t-t^*))})}$, where W is the current body weight of the animal, A is the weight of the animal at physical maturity, k is a growth rate factor, t is the current age of the animal, and t* is the age at which the animal has its maximum rate of growth, t* and k being statistically related.

The apparatus also includes memory means for storing data corresponding to information about feed, information about the characteristics of the animals, and information generated by the processing means. The memory means is operationally coupled to the means calculates the optimum rate of growth with age at which the animals can experience their processing means.

The present invention is also in the form of a method for operating the apparatus. The method steps include calculating the time trajectory at which the animal can experience its optimum rate of growth with age according to the equation $W = Ae^{(-e(-k(t-t^*)))}$ where W is the current body weight of the animal, A is the weight of the animal at physical maturity, k is a growth rate factor, t is the current age of the animal, and t* is the age at which the animal has its maximum rate of growth, t* and k being statistically related. The method includes the additional step of storing data corresponding to information about feed, information about the characteristics of the animals, and information generated by the processing means.

These and other advantages and capabilities, which characterize the present invention, are pointed out with particularity in the claims annexed hereof and forming a further part hereof. However, for a better understanding of the invention, its advantages, and objects obtained by its use, reference should be made to the drawings, which form a further part hereto, and to the accompanying descriptive matter, which illustrates and describes a preferred embodiment of the present invention.

DESCRIPTION OF THE DRAWINGS

FIGS. 2A, 2B is a chart showing the values of and relationship between the rate factor, k, and the inflection point, t*, for a variety of strains of birds.

FIGS. 5–19 are menus, screen displays, and a sample report of a preferred embodiment computer program which implements the present invention.

DETAILED DESCRIPTION

Figure 1:
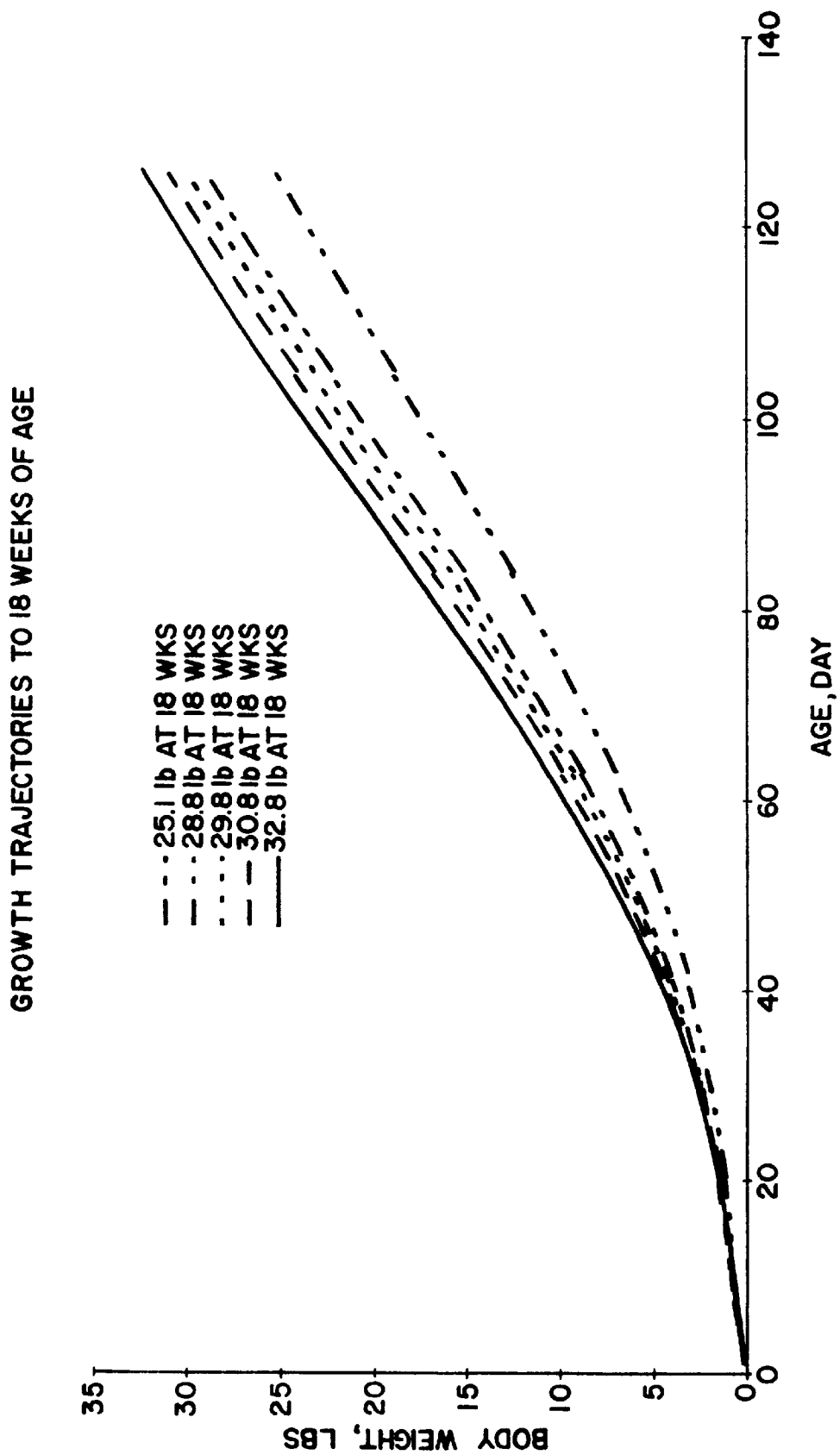
FIG. 1 is a graph showing the growth alternatives described by a Gompertz curve.

A preferred embodiment of the invention will be described in detail with reference to the Drawings, wherein like reference numerals represent like parts and assemblies throughout the several views. Reference to the preferred embodiment does not limit the scope of the invention which is limited only by the scope of the claims attached hereto.

The present invention correlates equations that describe the multitude of Gompertz curves for various variables that describe the growth of living animals. The results of the correlation allow an animal processor to simultaneously optimize the ratio between expenditures and growth and thus optimize profit margins. In other words, the growth rate of the animal is substantially optimized when the market value of the animal and the cost incurred from raising the animal maximizes the before tax net margin associated with raising the animal or population of animals.

Additionally, the variable can describe both genetic and non-genetic characteristics or factors involved with modeling the growth of the animals or the population of animals. The non-genetic variables are substantially at their optimal values when the net margin is maximized. Some examples of non-genetic characteristics that are described by the non-genetic variable include body weight, population density, nutrient composition of the feed, temperature, and humidity.

One skilled in the art will realize that the present invention may be used for any type of animal whose growth can be described by a Gompertz curve. However, for purposes of description, the present invention is described in the context of poultry.

A. Theory

As shown in FIG. 1, a Gompertz curve represents mass as a function of time, and is commonly used to represent the growth of poultry. The Gompertz curve that describes a growth pattern in Laird form is as follows:

$$W = W_0 e^{(L/k)(1-e^{(-kt)})} \tag{1}$$

where W is the current body weight, $W_0$ is the initial body weight, L is a constant, k is a constant, t is the current age of the bird, and ^ represents an exponent. (Laird, A. K. 1966. Postnatal growth of birds and mammals. Growth 30:349–363) Equation (1) can be rearranged as follows:

$$W = f(t) = W_0 e^{((L/k)e^{((-L/k)e^{(-kt)})})}. \tag{2}$$

The limit of equation (2) as $t \to \infty$ is defined as:

$$\lim f(t) = A = W_0 e^{(L/k)} \tag{3}$$

where A is the bird's mature body weight. Combining equation (2) and equation (3) results in the following equation:

$$W = Ae^{((-L/k)e^{(-kt)})}, \tag{4}$$

which can be written as follows:

$$W = Au \tag{5}$$

$$\text{where } u = e^{((-L/k)e^{(-kt)})}. \tag{6}$$

Equation (4) can be rewritten as:

$$W = Ae^{(-Be^{(-kt)})} \tag{7}$$

where B=L/k.
From equation (7), the average daily gain is:

$$f'(t) = WkBe^{(-kt)}. \tag{8}$$

The rate at which the average daily gain changes is defined as:

$$f''(t) = k^{(2)}BWe^{(-kt)}(Be^{(-kt)}-1) \tag{9}$$

If f"(t)=0 at the age of maximum gain, then:

$$0=k^{\wedge}(2)BWe^{\wedge}(-kt^*)(Be^{\wedge}(-kt^*)-1)$$

$$Be^{\wedge}(-kt^*)=1$$

$$B=e^{\wedge}(kt^*) \tag{10}$$

where t* is defined as the inflection point, which represents the age at which the maximum daily weight gain is achieved.

The constants t* and k govern the form of growth curve. If equation (10) is substituted into equation (7), then $$W=Au \tag{11}$$

Where $u=e^{\wedge}(-e^{\wedge}(-k(t-t^*)))$. Equation (11) shows that current body weight depends on mature weight A and u. Mature weight A is a genetically inherited value. Given fixed genetic conditions, the form of growth trajectory depends on u, i.e., the growth rate factor k and inflection point t*. Therefore, living conditions affect the form of growth trajectory through the parameters t* and k. The growth trajectory represents body weight over age.

Rate factor k and inflection point t* are independent of each other among multiple growth curves even though they are constrained by equation (10) within one curve. Due to the simultaneous impact of living conditions, the two parameters of equation (11) can not be used to optimize growth by optimizing parameter k and t* independently. Independent optimization of parameter k and/or t* may result in faulty combinations of the two parameters in terms of describing animal growth. Their inter-relationship among different curves has to be established in order to make equation (11) cover multiple curves so that it can be used in an automated computer optimization process, i.e., either make constant k a function of the inflection point t* so that k=f(t*) or make t* a function of k so that t*=f(k).

The equations that are utilized in the program of the present invention are:

$$W=Ae^{\wedge}(-e^{\wedge}(-k(t-f(k))) \tag{12}$$

which can be rewritten as:

$$W=Ae^{\wedge}(-e^{\wedge}(-f(t^*)(t-t^*)). \tag{13}$$

For simplicity, Equation (13) will be used for explanation.

When mature weight A and age t is known, only one variable t* is left to predict body weight W in equation (13). The difference between equation (11) and equation (13) is that equation (11) represents only one growth curve and t* is a constant. However, equation (13) represents multiple curves wherein t* is a variable that can be optimized in an optimization process. Therefore, the relationship between k and t* must be defined. This relationship will be in the form of a function k=f(t*).

Experimental growth data for broilers, quails, and turkeys with different genetic and environmental conditions have been obtained from public domain sources and summarized. This information is contained within the program of the present invention and can be used to define the relationship between k and t*.

Figure 3:
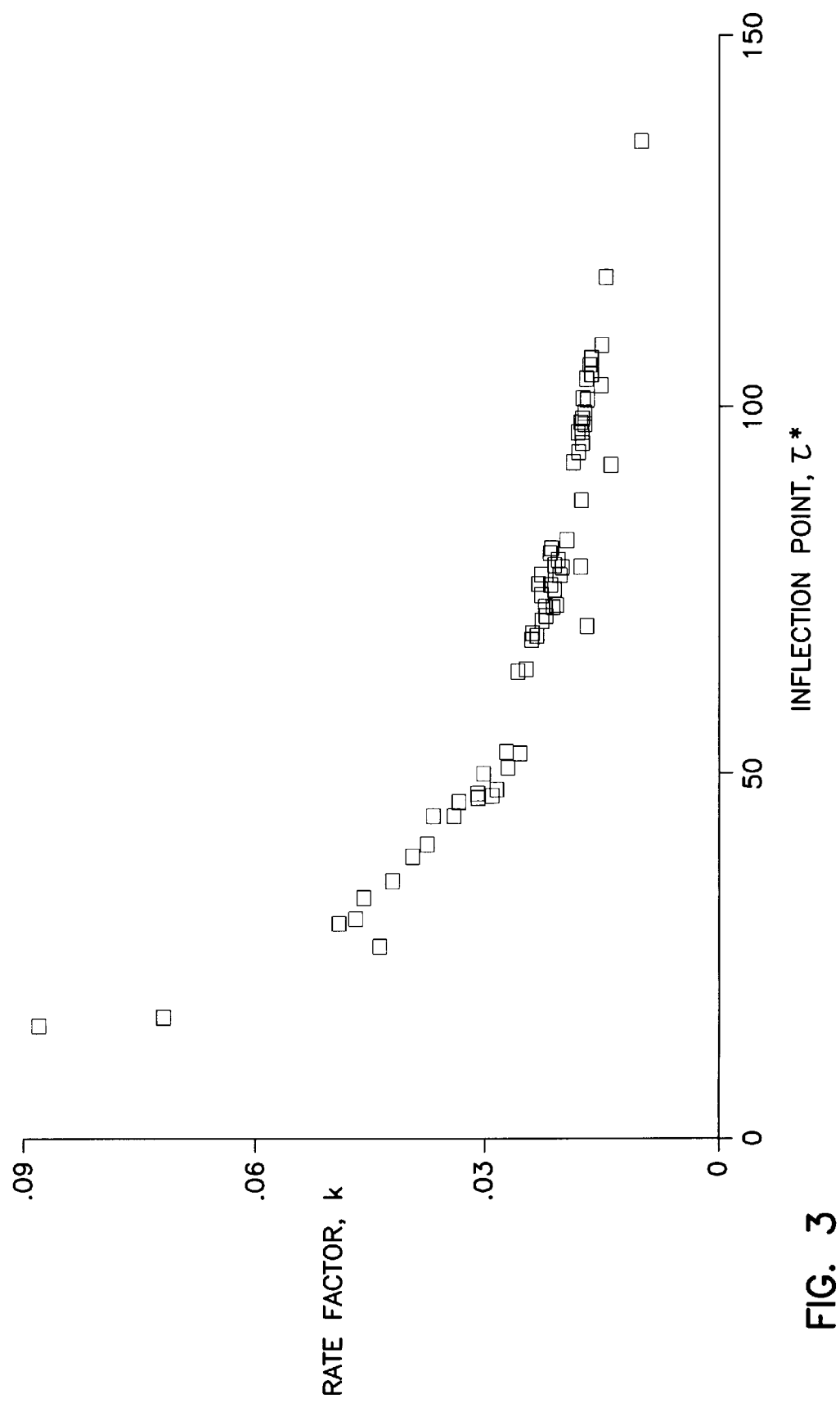
FIG. 3 is a graph showing the relationship between the rate factor, k, and the inflection point, t*, using the data that is included in the chart of FIG. 2.

The body weight for male turkeys of age 0 to 18 weeks (Waibel, P. E., "Pelleting, fat, and protein levels in turkey diets." 67 Proc. of Maryland Nutrition Conference for Feed Manufactures, March 16–17, (1989)) and female turkeys of age 0 to 18 weeks (Waibel, P. E. et al., "Factorial Study of Protein Level Sequence and Diet Energy/Pelleting on Performance of Large White Hen Turkeys," 68 reported in Poultry science Association Annual Meeting, University of Wisconsin, Madison. July 24–28 (1989)) are each comprised of 24 different protein sequence treatments. The body weights of each treatment at different ages was independently fitted into equation (11) and the corresponding value for k and t* was calculated. These values are shown in FIG. 2. More specifically, constant k and t* were experimentally determined by (See Hurwitz, S. et al., "Estimation of the Energy Needs of Young Broiler Chicks," Proceedings of the Meeting, Arkansas Nutrition Conference 16–21 (Riverfront Hilton, North Little Rock, Ark., Sep. 10–12, 1991); Talpaz, H. et al., "Dynamic Optimization Model for Feeding of Broilers," Agaric. Says, 121–132 (1986); Talpaz, H. et al., "Modeling of Dynamics of Accelerated Growth Following Feed Restriction in Chicks," 36 Agric. Sys., 125–135 (1991); Gous, R. M. et al., "A Characterization of the Potential Growth Rate of Six Breeds of Commercial Broiler," 2 Proceedings of XIX World's Poultry Congress, 20–24 (Amsterdam, The Netherlands, September 1992); Emmans, G. C., "The Growth of Turkeys," 21 Recent Advances in Turkey Science, 135–166 (C. Nixey and T. C. Grey eds. 1989); Anthony, N. B. et al., "Comparison of Growth Curves of Weight Selected Populations of Turkeys, Quail and Chickens," 70 Poultry Sci., 13–19 (1991)) and fitted into equation (11) by mathematical methods that are commonly known in the art. FIG. 2 also includes the values of B and L, which were calculated using equation (10). FIG. 3 is a graph in which k is plotted against t*. The graph of FIG. 3 demonstrates the relationship of k=f(t*) and that the relationship between k and t* is non-linear. Examining the graph of FIG. 3, one skilled in the art will realize that statistical methods demonstrate that k=0.79878t*(−0.83747), where adjusted correlation coefficient r=0.9746.

Equation (13) can be rewritten as $$W=Ae^{\wedge}(-e^{\wedge}(-(0.79878t^*(-0.83747)(t-t^*)))). \tag{14}$$

This equation covers a multitude of growth curve possibilities and can be used for different types of poultry including turkey, broiler, duck, quail, etc. Given equation (13), constant t* is the only variable to be affected by various living conditions.

Equations (12) and (13) reveal that the rate at which a bird grows depends on only one variable—t* or k. As discussed above, t* is the age at which a bird has its maximum rate of gain and k is a growth rate factor. The earlier the age, the quicker the bird will grow to the weight at which it may be marketed. The commercial applications of equation (12) or (13) will be very important tools in selecting the most efficiently growing genotype of bird and in genetic breeding. One skilled in the art will appreciate that the present invention may also have applications related to the production of other types of animals as well as vegetation.

Equation (13) can be utilized in optimizing poultry production because it correlates multiple growth curves, which include a genetic potential growth curve of the type shown in FIG. 1. A curve of this type is required in order to implement a computer optimization process. As discussed above, the genetic potential growth curve of FIG. 1 defines the minimum age at which a bird's maximum growth rate is reached. Given the curve of FIG. 3, a computer can calculate optimum weight gain and average body weight for each feeding period of a flock of birds. The weight gain and average body weight is then used to determine the optimal living and food environments. The following example shows how the potential weight gain can be modified by changing the density of turkeys within a certain living space.

Change of weight gain=0.71556+7.9902 MDNSITY−57.765 MDNSITY2 where r (correlation coefficient)=

0.8846; overall p-value (possibility value)=0.0006; and MDNSITY-body weight density ranged 0.03 to 0.06 meter2/kg 0.67. Similar predictions can be derived by establishing the effect of temperature, humidity, ventilation, etc. on weight gain.

In addition to predicting physical mass of the entire bird, the inflection point t* can be used to predict the growth of each component part of a bird's body. The following is an example for turkeys:

Breast (% of Eviscerated carcass)=67.121−2.2824 Sex+ 0.37094 Age−0.00093294 Age2−93116 ln(Age)−0.14238 t* where r=0.843; and p−value of coefficient t*=0.0000.

Thigh (% of Eviscerated carcass)=14.6+0.056919 Age−0.00022113 Age2−0.026625 t* where r=0.875; and p−value of coefficient t*=0.0000.

Wing (% of Eviscerated carcass)=26.399−2.3552 Sex+ 0.10141 Age−0.0018162 Age2+0.0000064398 Age3−0.10284 t* where r=0.90; p−value of coefficient t*=0.0000.

Neck (% of Eviscerated carcass)=18.056−2.1653 Sex−0.0095747 Age−0.085037 t* where r=0.6367; and p−value of coefficient t*=0.0000 where Sex−1 for male, 2 for female; age=age in days; t*=inflection point (days); r=correlation coefficient; and p-value=possibility value.

All the above regression equations show that the inflection point t* has a significant effect on dependent variables as indicated by the small number of p-values.

B. Commercial Embodiment

Figure 4:
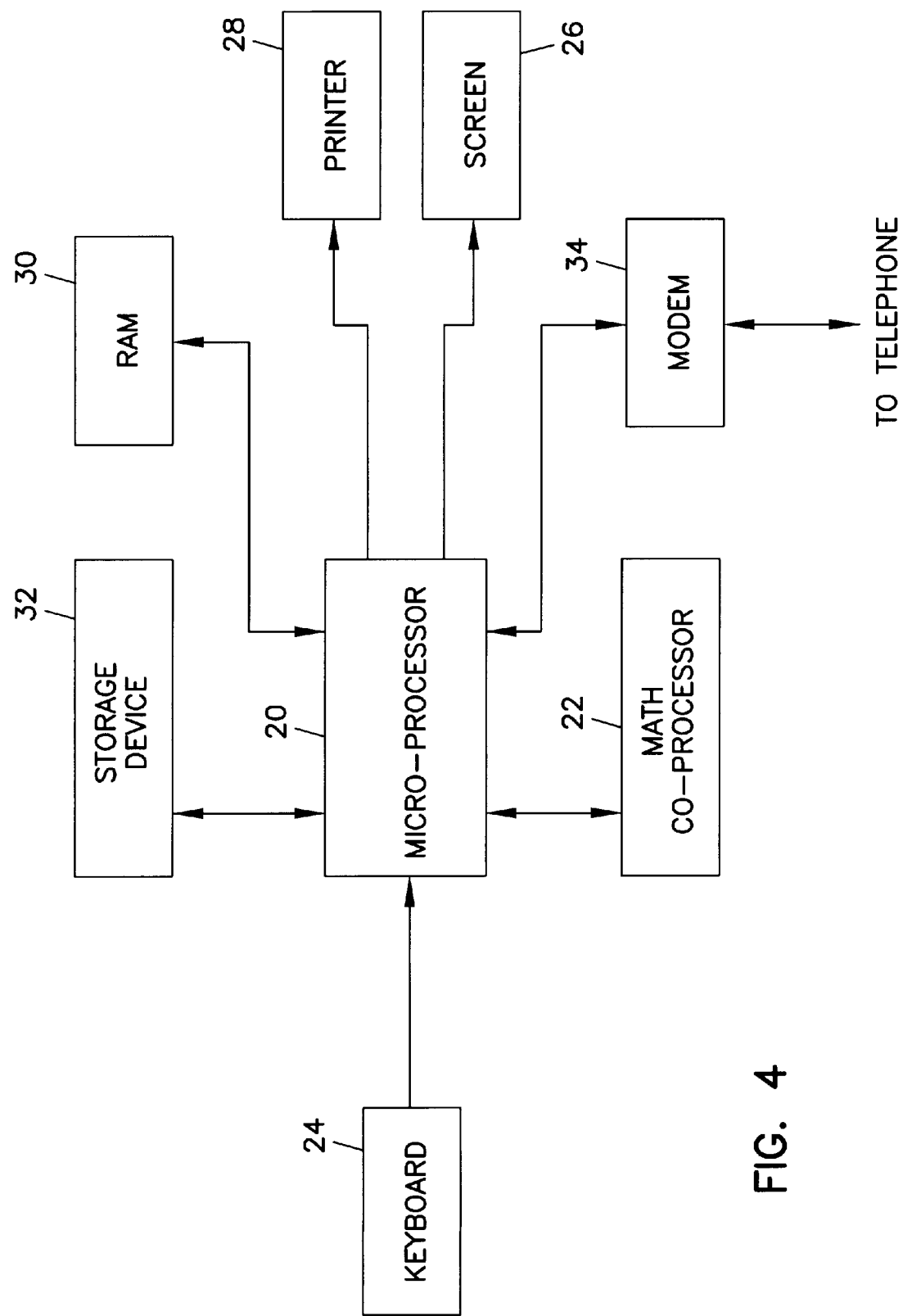
FIG. 4 is a functional block diagram of a multipurpose computer useful for practicing the method of the present invention.

As one skilled in the art will realize and as shown in FIG. 4, the present invention is preferably utilized with a personal or work station computer (hereinafter PC) that is based on Intel's 80486 microprocessor 20 with a 66 MHz clock, Intel's PENTIUM™ microprocessor, a high speed RISC processor, or any other similar microprocessor. The computer also preferably has a math co-processor 22 for completing mathematical computations. The computer also includes a keyboard 24, screen 26, printer 28, random access memory 30, and a storage device 32. The storage device 32 may include magnetic means (i.e., floppy disk drive, hard drive, or tape drive), optical disk means, firm ware, or any other appropriate storage means. The storage device 32 is used to store the execution program and data generated by the execution program. The computer may also include means such as a modem 34 and communications software for loading input data or the execution program from a remote location. As one skilled in the art will further appreciate, other types of computers might be used such as a main frame, portable computer, note-book computer, or mini-computer.

C. In Operation

In operation, the user loads the execution program from the program memory storage location into the random access memory 30. Those skilled in the art will appreciate that the program might be stored on magnetic media, (i.e., floppy disk drive, hard drive, or tape), read only memory (i.e., optical disk), firm ware, or any other appropriate storage medium 32. The program might also be transmitted from a remote location such as from a file server, a main frame, or other PC that has a communication link with the user's terminal. Referring to FIG. 5, a menu is displayed on the computer screen after the program is loaded. The menu has the following options: Setup 36, Products 38, Time Value 40, Management Spec's 42, Grow Out Spec's 44, Fixed/Variable Costs 46, Raw Materials 48, Choose Data Sets 50, Solve/Optimize 52, Management Report 54, Review/Predictions/Diets 56, Field Measurements 58, Model Creation 60, Change Database 62, Use DOS Commands 64, and Exit to DOS (Quit) 66.

The first menu option is Setup 36. On invoking this option, a user with basic industry knowledge can define a new flock of birds or edit information concerning an existing flock. As shown in FIG. 6, the Flock Data computer screen 68 is displayed when the Setup menu item is chosen. From this screen, the user has four options. The user can highlight an existing flock and press enter at which time the Flock Data Maintenance screen 70, FIG. 7, will appear on the display. At this time the user can edit the displayed information, which includes the name of the farm 72 where the flock is kept; the name of the particular flock 74; the entity from which the flock was purchased 76; a reference code 78 that identifies the flock; the strain of bird that comprises the flock, model selector 80; and whether the user wishes to have automatic age calculation 82. Automatic age calculation calculates the age based on the hatch date. The user can also choose to delete the listing of a particular flock, or enter escape in order to return to the main menu.

The second item on the main menu is Products 38. Upon choosing this menu item, the Electronic Data table (EDT) entitled "TABLE: PRODUCT.T" 84 is displayed. See FIG. 8. The information entered into this EDT includes the price per pound for a whole bird, a gutted carcass, and each of the individual body parts. The information entered also includes the amount of poultry product that the user wants to have available for market. More specifically, the user enters the range of acceptable product amount that he/she plans to market. If the user plans to market the poultry in parts, an acceptable range of product parts for each type of part is entered. The price is entered into column 86, the minimum acceptable product amount is entered into column 88, and the maximum acceptable tonnage is entered into column 90.

The third item on the main menu is Time Value 40. Upon choosing this menu item, a screen entitled "TABLE: TIME.T" 92 is displayed on the computer screen. See FIG. 9. The data that is entered into the EDT displayed in this screen includes, the age that the poultry will be sold 94, the amount of time that a barn will be empty between flocks 96, the length of the brooding period if the particular strain of birds has a brooding period 98, and the square foot the user wants to provide for each bird within the barn 100. The unit of measurement for all time periods is days. The desired values are entered into the first column 102 of the table if the user knows the precise time period or allowable square foot per bird. Otherwise the user can enter an acceptable range of time or square footage in the second and third columns 104 and 106. If the user enters a range, the program will calculate the optimum value in order to maximize the user's return on investment.

The fourth item on the main menu is Management Spec's 42. Upon choosing this menu item, the EDT entitled "INFORMTN.T" 108 is displayed on the screen. See FIG. 10. Information in this EDT is broken down into a plurality of time intervals during the life of the poultry. Each interval is called a series 110 and corresponds to a production period. In the column entitled "Age, Days" 112 the user can enter the age of the flock at the end of each interval. In the column entitled "TEMP (F)" 114 the user can enter the ambient temperature of the flocks environment. In the column entitled "HUMIDITY, %" 116 the user can enter the humidity of the flock's environment. One skilled in the art will realize that data concerning other environmental factors also may be included in the INFORMTN.T. table 108.

The fifth item on the main menu is Grow Out Spec's 44. Upon choosing this item, an EDT entitled "RECOMEND.T"

110 is displayed. See FIG. 11. Information in this table is broken down into a plurality of time intervals 112 during the life of the poultry. Each interval is called a series and corresponds to a production period.

The sixth item on the main menu is Fixed/Variable Cost 46. Upon choosing this item, the EDT entitled "COST.T" 126 is displayed. See FIG. 12. Data listed in this table includes "FIX, $/YR" 128, which is fixed costs per year; "PRCSS, $/YR" 130, which is the cost of processing per year; "CHICK, $/BD" 132, which is the cost of purchasing each chick; "MARKT, $/YR" 134, which is the cost of marketing per year; "PRPNE, $/YR" 136, which is the cost of building heat per year; "BROOD, $/FL" 138, which is the cost of brooding each flock of birds if the flock is of the type that requires brooding; and "GRWER, $/LB" 140, which is the cost of live weight per pound for contract grower.

Figure 13:
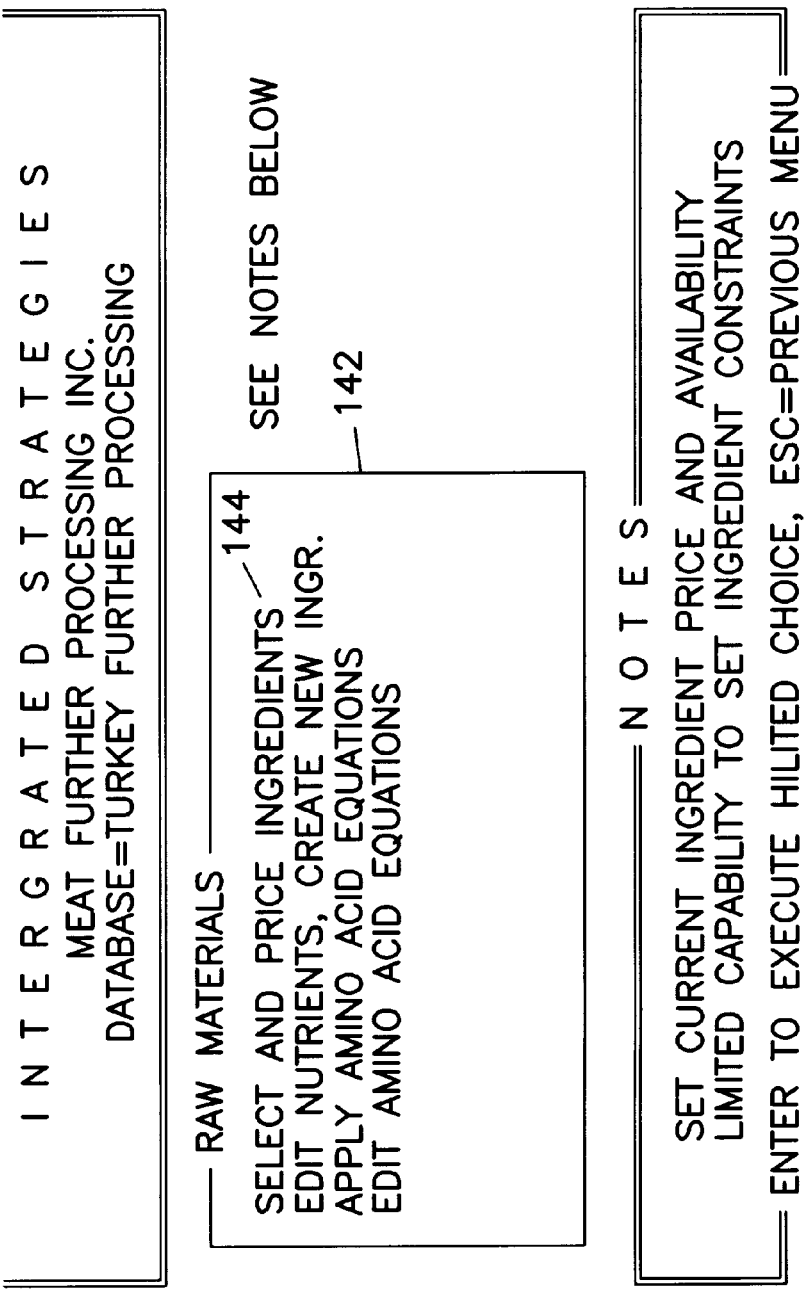

The seventh item on the main menu is Raw Materials 48. Upon selection of this item, a sub-menu entitled "Raw Materials" 142 is displayed. See FIG. 13. The first item on the sub-menu is Select and Price Ingredients 144. Upon selecting this first sub-menu item, the EDT entitled "INGREDIENT UPDATE" 146 is displayed. See FIG. 14.

The table includes columns entitled AVAIL. 147, GROUP 148, SHORT NAME 150, MIN 152, MAX 154, CTRL 156, COST 157/CWT, NO 158, and HA 160. The AVAIL. 140 column lists whether that particular ingredient is available to be included in the feed. As shown in FIG. 15, the possible listings in this column include Avail 162, which means that the ingredient is available to the user; Maybe 164, which means that the ingredient has a high price and the computer will try to use an alternative ingredient; No 166, which means that the ingredient is not available to the user; and Cost 168, which means ingredient will not be used in formulation but the computer will give a price at which the ingredient could be used. The GROUP column 148 lists the classification of ingredients. The SHORT NAME 150 column lists the common name of the ingredient. The MIN column 152 lists the minimum amount of that ingredient that the user wants to include in the feed. The units of measurement for this data is percentage. The MAX column 154 lists the maximum amount of the ingredient that the user wants to include in the feed. The CTRL column 156 marks those settings that cannot be changed by user in this screen. The COST/CWT column 157 lists the cost of each ingredient per 100 pounds. The NU column 158 lists the choice of predicting nutrient level. The HA column 160 lists hand add value. As will be discussed in more detail below, an ingredients database lists the types and amounts of the nutrients that are included in each ingredient. The amount of each ingredient listed in the database corresponds to the amount of ingredient that is found in a typical crop that has a standard weight per bushel. One skilled in the art will further realize that the amount of each nutrient can vary with the weight of the crop per bushel. Thus, the program of the present invention has the capability of recalculating the amount of nutrients in each ingredient if the weight per bushel is entered into the computer.

The eighth item on the main menu is Choose Data Sets 50. When this item is chosen, the "TO BE FORMULATED" 170 screen is displayed. See FIG. 16. This menu option allows a user to select the particular flock that is to be optimized.

The ninth item on the main menu is Solve/Optimize 52. When this item is chosen, the computer of the present invention will calculate the optimum rate of growth. The computer will make these calculations for each designated time interval during the life of the flock. The computer will simultaneously calculate the optimal diet, living environment, and age at which the flock should be sold. The diet consists of the amount of ingredients that should be included in the feed. The living environment includes the number of birds that are included in each flock and the density of the birds (e.g., the square feet per bird within the barn). The age of the bird is the number of days between the birth of the birds and the date at which the bird should be sold to a processing plant. One skilled in the art will realize that the computer also calculates data concerning the volume of poultry that each flock will generate and financial data concerning the amount of revenue, costs, and return on investment. One skilled in the art will further realize that other financial data may be calculated by the computer The tenth item of the main menu is Management Report 54. Upon selection of this menu item, a list of the possible reports 172 is displayed on the screen. See FIG. 17. There are seven reports that the user can choose. The first report is entitled OPTIMUM RESULTS 174 and lists the optimal performance and environmental constraint to which the user must conform in order to realize the maximum possible Return On Investment. One skilled in the art will realize that such data includes the optimal flock size, the optimal age at which the flock should be sold, the optimal bird density in units of bird per square foot, the weight of the bird at sale, etc. The second report is entitled OPTIMUM PERFORMANCE 176 and includes data that relates to the length of each feeding period, the amount of feed given to the flock, the amount of feed that is consumed by the flock, etc. The third report is entitled OPTIMUM YIELD 178 and includes data that relates to the total weight of the flock that is available for sale, the costs of raising the flock, and the price received for the flock. The fourth report is entitled OPTIMUM FD/FACTORS 180 and includes information that relates to the amount and cost of the feed that a flock will consume. The fifth report is entitled OPTIMUM NUT/ALLNCE 182 and includes information that relates to the optimal nutrient amounts that need to be consumed and that can be metered to a flock. The sixth report is entitle RESOURCES RAW/MATRLS 184 and includes information related to the amount of ingredients that are consumed and inventoried for use by a flock. The seventh report is entitled OPTIMUM INDIV-BIRD 186 and includes information related to the characteristics of the birds in each flock, its yield characteristics, the environmental conditions in which the flock will live, the average size of each bird within the flock, and the average amount of feed consumed by each bird within the flock. Samples of the reports that are generated are shown in FIGS. 18a–18g and labeled 174', 176', 178', 180', 182', 184', and 186', respectively.

The eleventh item on the main menu is Review/Predictions/Diets 56. When this item is selected, the computer of the present invention will display the predicted value of data concerning the weight of the flock, the amount of feed consumed, the weight of the various part of a bird, and other miscellaneous data concerning the environment of the flock. See FIG. 19. This information may also be updated to reflect actual data during the life of a flock. Upon entering the actual values, the SOLVE/OPTIMIZE 52 menu item may be re-selected in order to update the optimal diet, living environment, and age at which the flock should be sold.

Preferably, the computer of the present invention is programmed using the Clarion database software. Clarion is published by Clarion Software Corporation, which is located in Pompano Beach, Fla. One skilled in the art will realize that other database software packages such as Paradox, DB2, Access, etc., may be used. One skilled in the art will further realize that the computer may also be programmed using the C, Fortran, Pascal or other programming languages. During execution of the program, the microprocessor sequentially executes each individual instruction. However, as described herein, the operation of the microprocessor implementing the program will be defined in terms of major functional steps.

Figure 20:
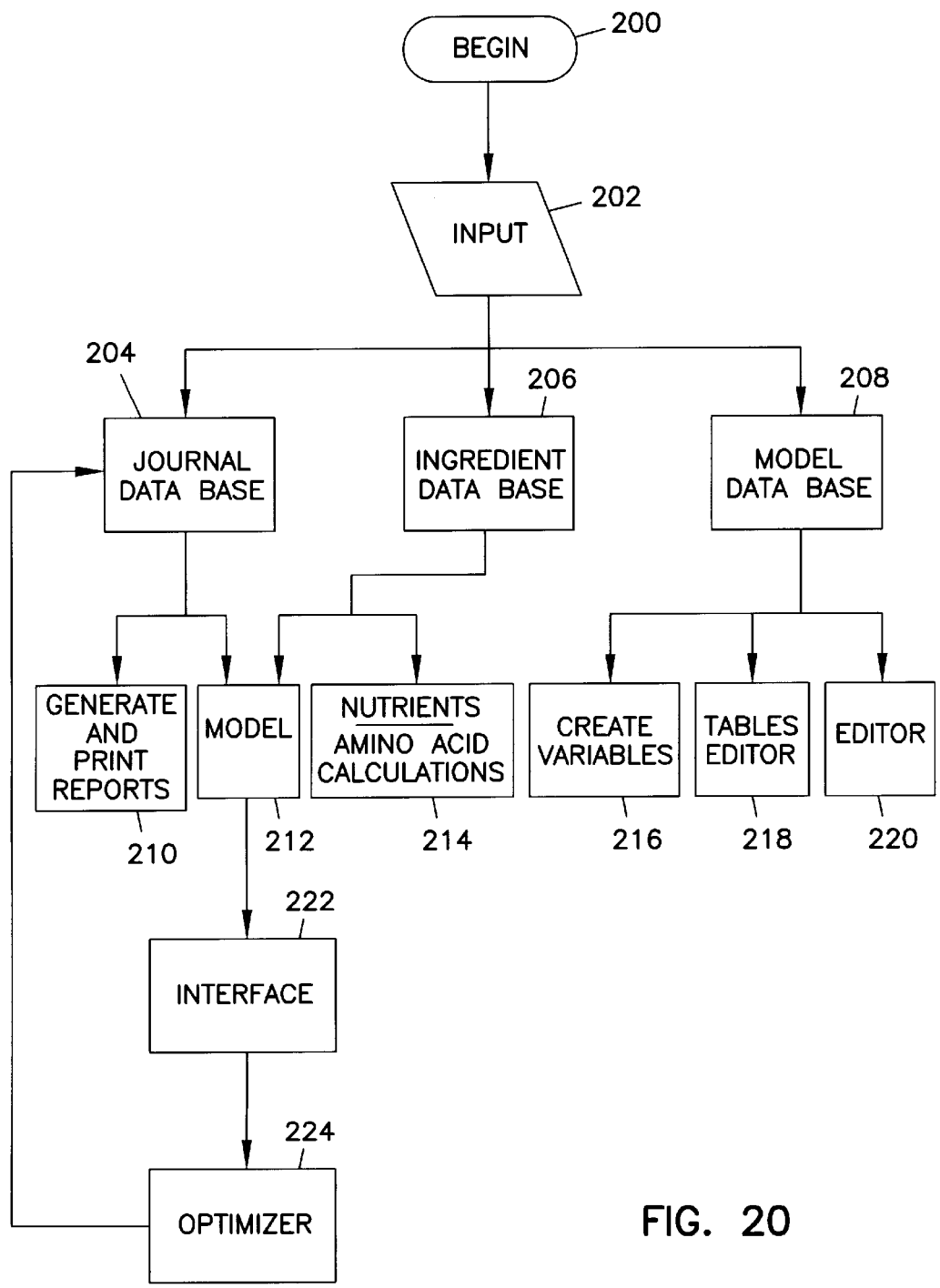
FIG. 20 is a functional block diagram of program logic used to implement the principles of the invention.

Referring to FIG. 20, the program that controls the computer of the present invention begins at block 200. The user may input information into the databases at Block 202. The information inputted may enter either the Journal database 204, Ingredient database 206, or Model database 208. The Journal database, block 204, stores information that relates to the characteristics of the flock such as sex, weight, number, strain, etc. This database also stores the information that is generated by the model and the optimizer. Such information relates to the optimal diet, environmental conditions, flock size, predicted mortality rate, predicted yield, financial figures, etc. The Ingredient database, block 206, stores information that relates to the potential ingredients that may be included within the feed and the nutritional values of the various ingredients. One skilled in the art will realize that the Ingredient database also includes equations that the user can execute to recalculate the value of the amino acid nutrients and metabolizable energy. These equations are based on the weight per bushel and the protein content of the ingredients. The model database, block 208, includes information that relates to the actual code of the execution files. The model database also includes information that relates to the variables that are used within the execution files.

One skilled in the art will realize that the blocks 210, 212, 214, 216, 218, and 220 represent the various execution programs that are required to control the computer of the present invention. One skilled in the art will further realize that any one of these block may contain a plurality of execution files in order to fulfill its function. As described above, the execution files and the databases are preferably written utilizing the Clarion database software.

At block 212, the user may execute the model that forms the equations that are described in the section above titled A. Theory. This section also forms equations that calculate the predicted mortality rate and other effects of living conditions, predicted yield for various economic body parts, and nutrient calculations. More specifically, the model will create a plurality of simultaneous equations that it will pass through the interface, block 222, to the Optimizer, block 224.

The interface, Block 222, reconfigures the information generated by the Model, Block 212, into a form that is acceptable by the Optimizer. The interface is preferably written in C. The optimizer should be a non-linear optimizer, which are well known in the art.

The Optimizer, Block 224, will solve the simultaneous equations in order to create the optimal values for each of the variables that describe the predicted mortality rate and other effects of living conditions, predicted yield for various economic body parts, and nutrient calculations. This information is then passed to the Journal database, Block 204, where it is stored.

At block 210, the user may execute the files that generate and print reports. These reports are described in detail above. At block 214, the user may edit the tables that store information about the various ingredients that may be included in feed. More specifically, the user may delete or add ingredients, and edit the nutritional values associated with each ingredient. Additionally, the user may execute amino acid and energy equations that recalculates the values of the amino acid and metabolizable energy nutrients based on the weight per bushel and protein content of each ingredient. The information manipulated by block 214, is stored in the Ingredient database, block 206.

At block 216, the user may create variables that are used in the various execution files. One skilled in the art will realize that at block 218 the user may create and edit the various EDT tables that are used to organize and store information within the databases. Finally, the user may create and edit the execution files and databases at block 220.

Figure 21A:
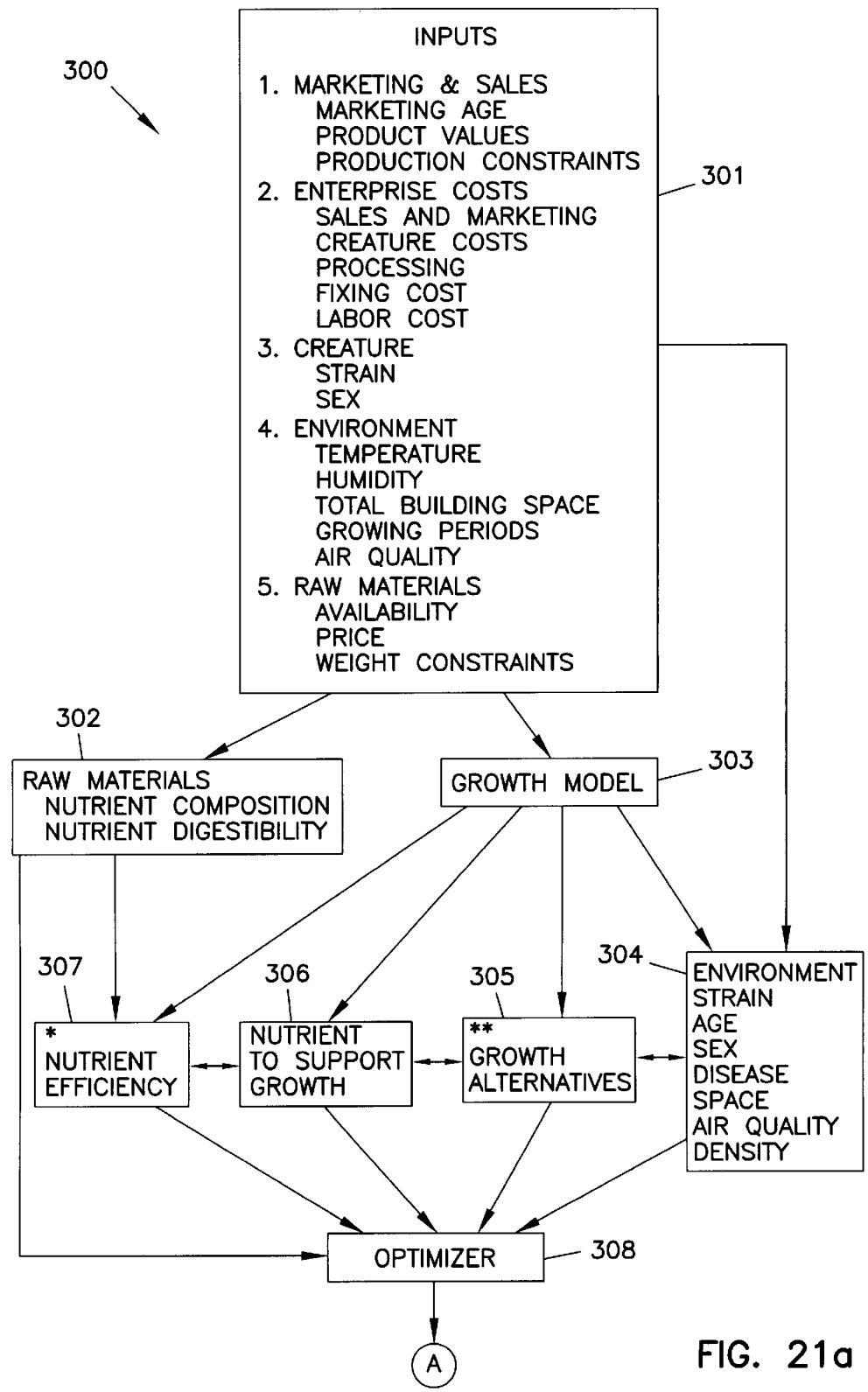
FIGS. 21a and 21b set forth an information flow diagram for the program logic of FIG. 20.
Figure 21B:
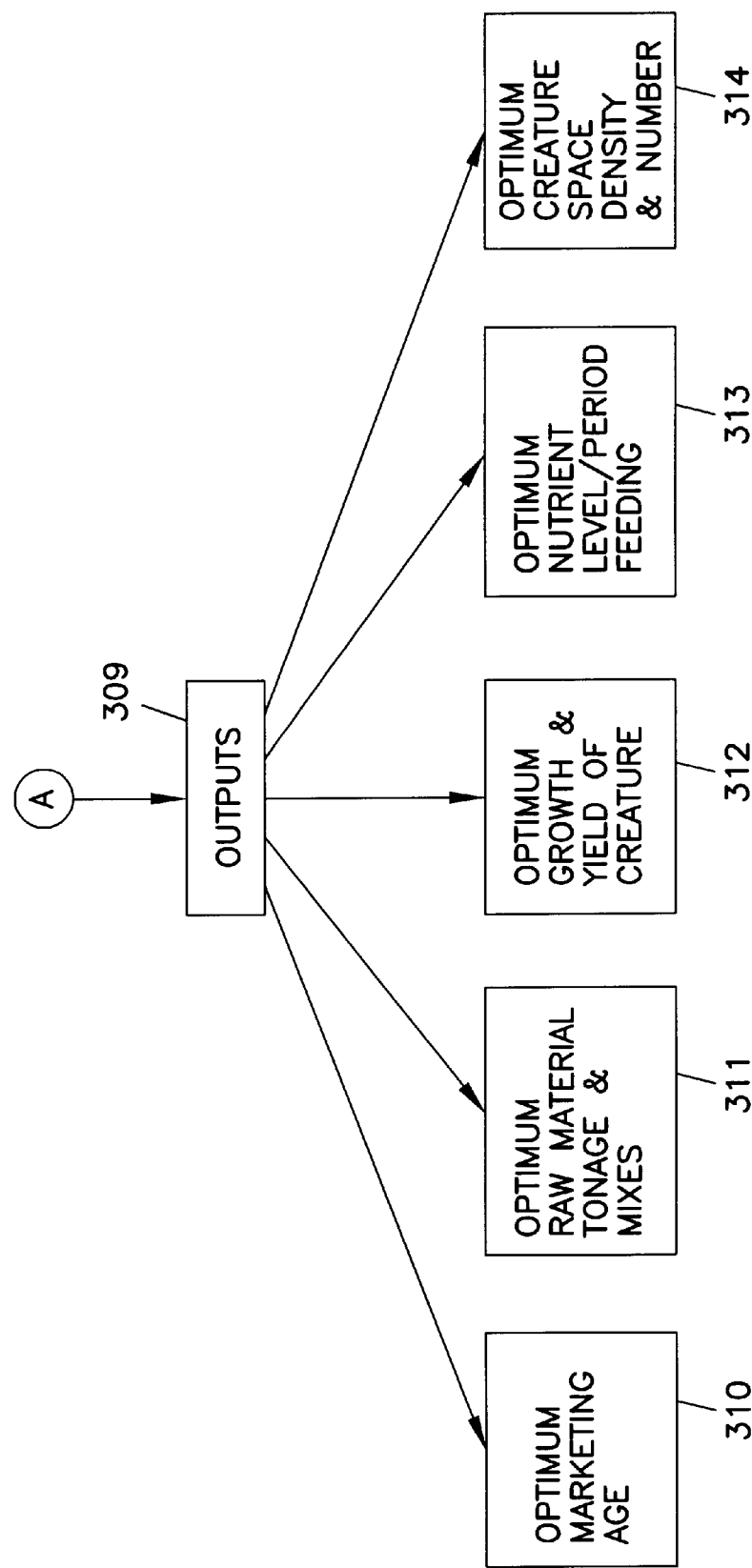

FIGS. 21a and 21b describe the information flow of the program execution. The information flow is shown generally at 300. Block 301 illustrates the various inputs into the logical program flow in order to calculate and solve the various equations. Block 302 includes information on nutrient composition and digestibility which may be stored in the form of a look-up table or some other known database structure. This data is provided to block 307 where data and/or equations on the nutrient efficiency is stored. Additional information is provided to block 307 from the growth model block 303 and the nutrient to support growth block 306. Each of the various blocks 302, 307, 306, 305, and 304 provide data and equations to optimizer block 308 which solves the equations in an optimized manner. The outputs of optimizer block 308 are provided to output block 309 which provides the results to the journal database 204 (best seen in FIG. 20). This information is illustrated as including: optimum marketing age, block 310; optimum raw material tonnage and mixes, block 311; optimum growth & yield of animals, block 312; optimum nutrient level/period feeding, block 313; and optimum animal space density & number, block 314.

D. Operation of the Model

Figure 22A:
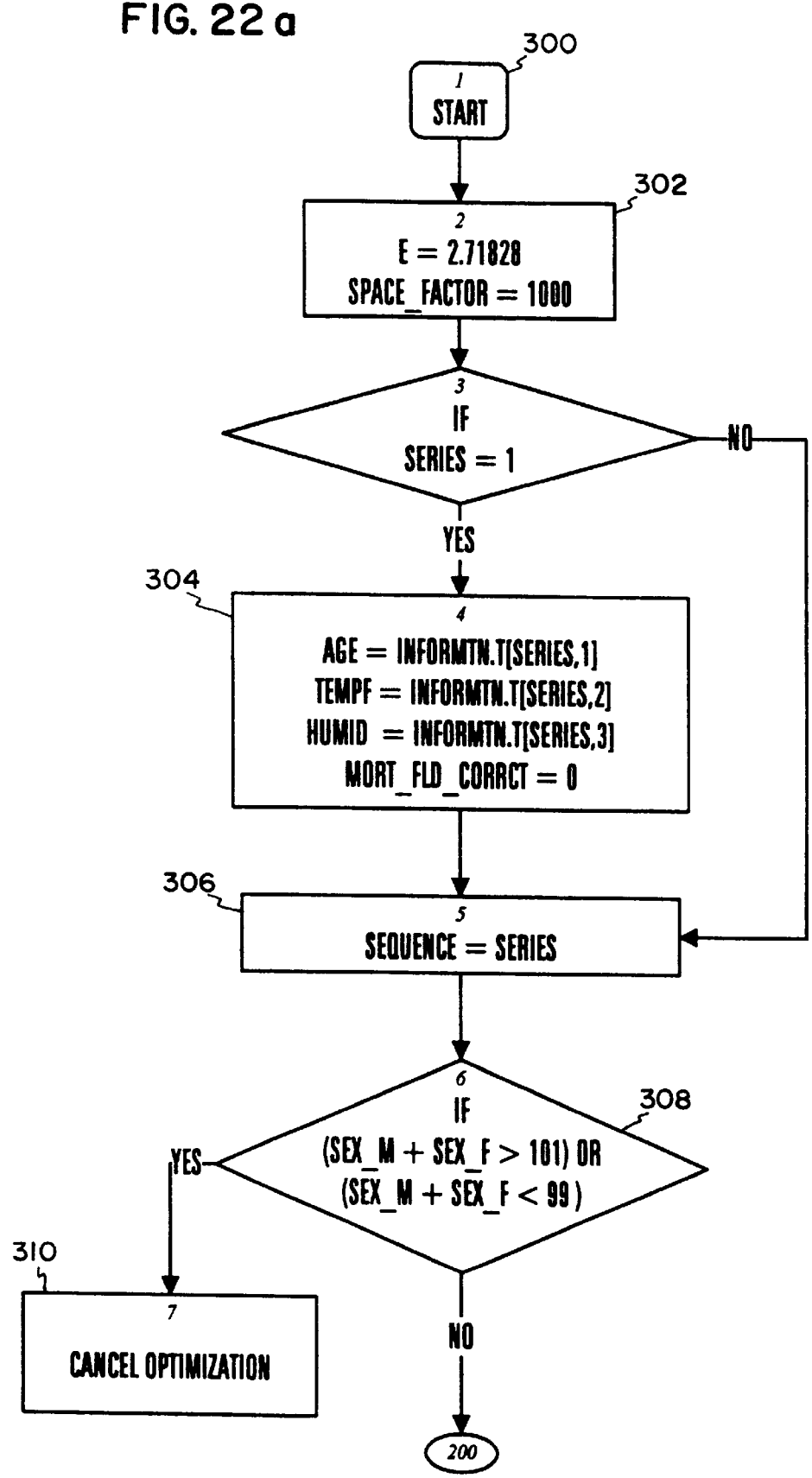
FIGS. 22a–22ai set forth a flow chart showing the detailed operation of the program logic shown in FIGS. 20 and 21.
Figure 22B:
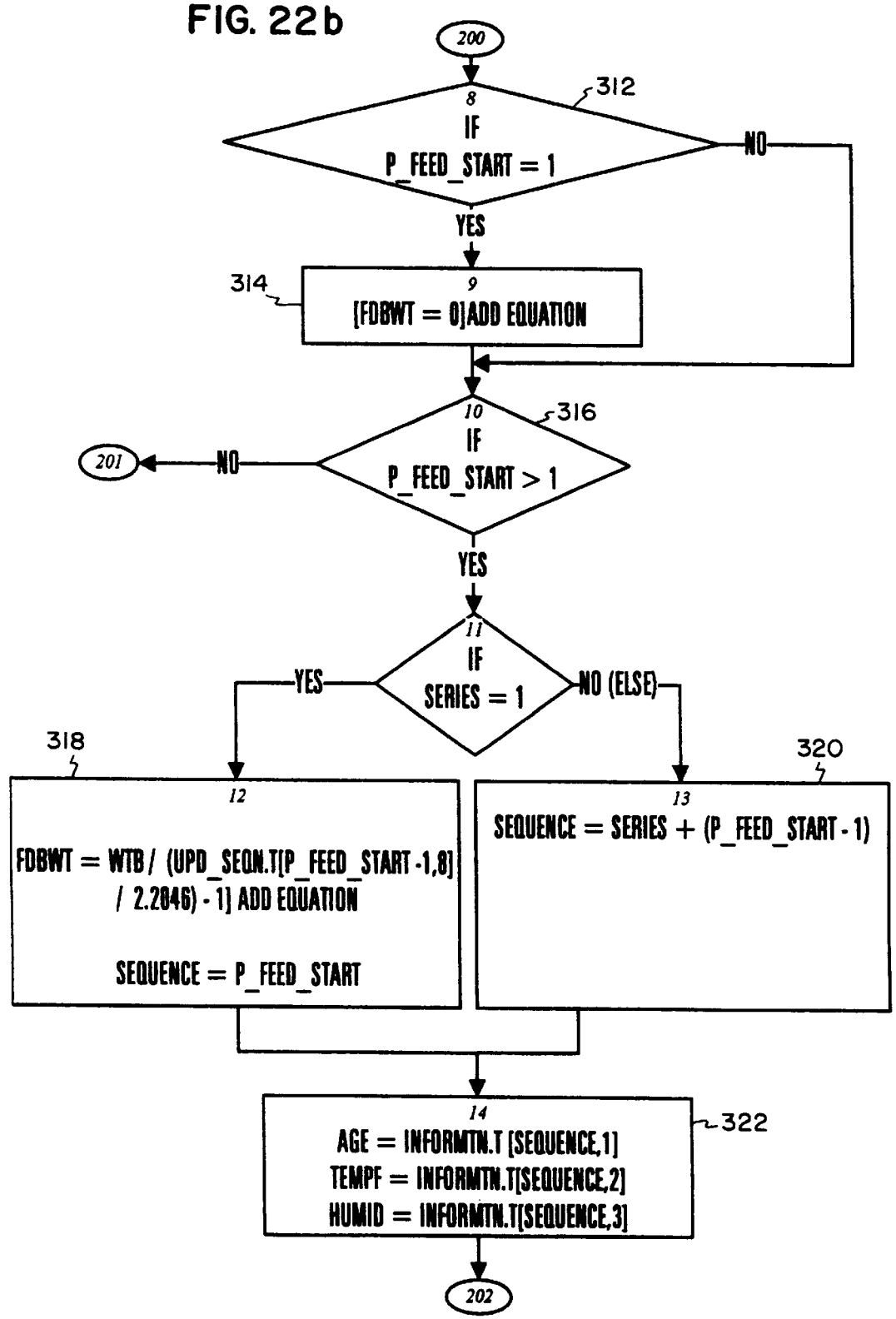
Figure 22D:
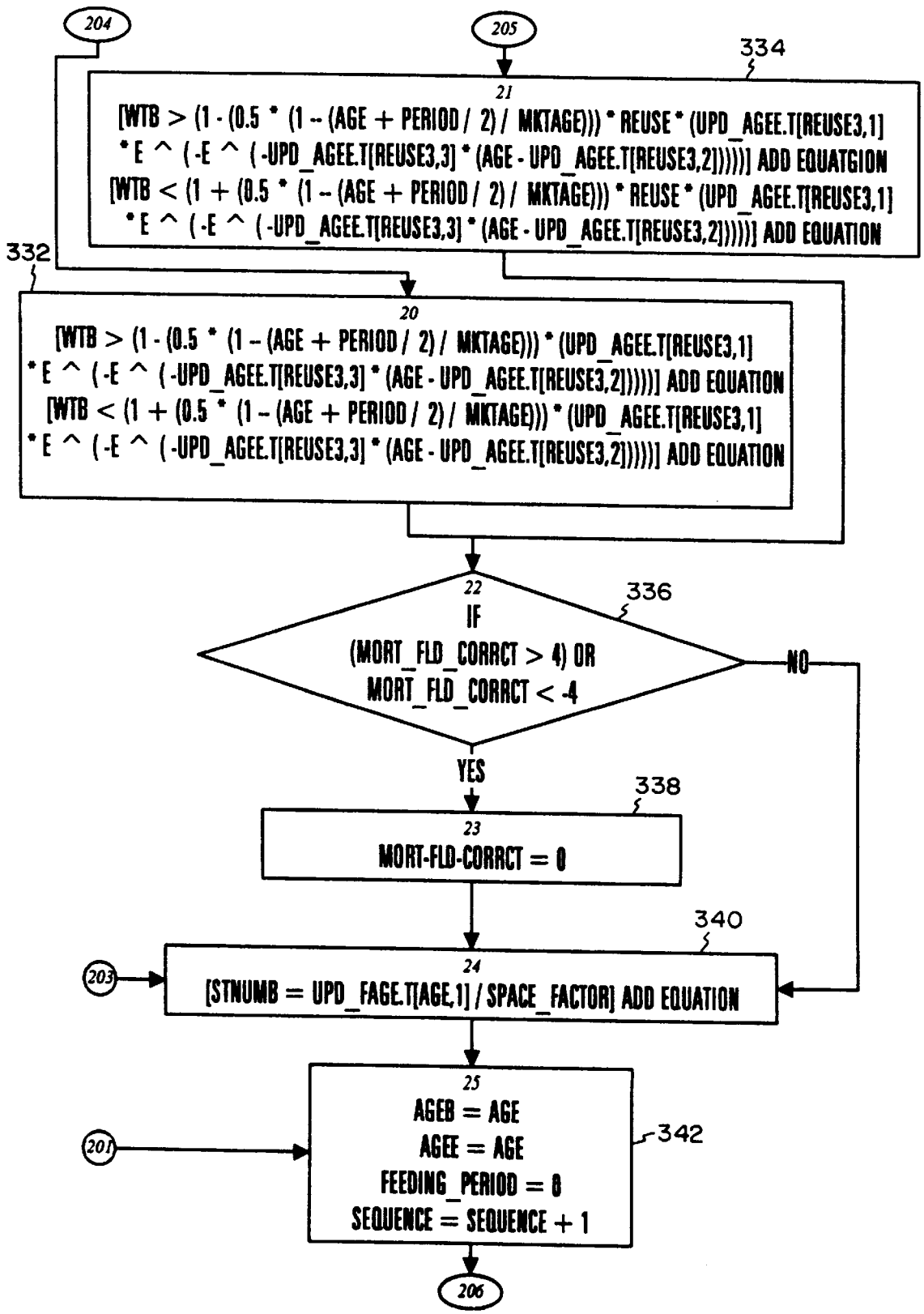
Figure 22E:
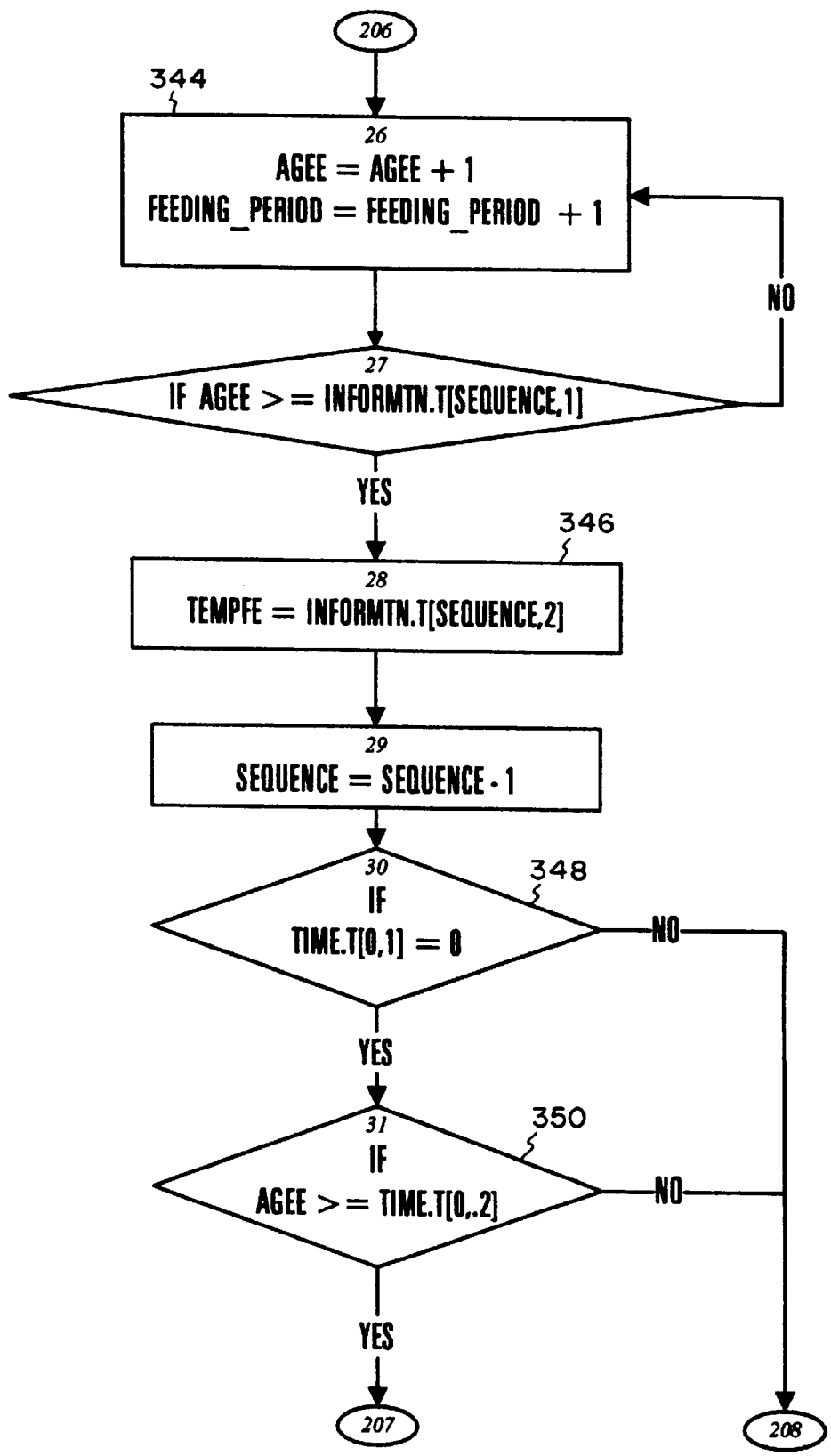
Figure 22F:
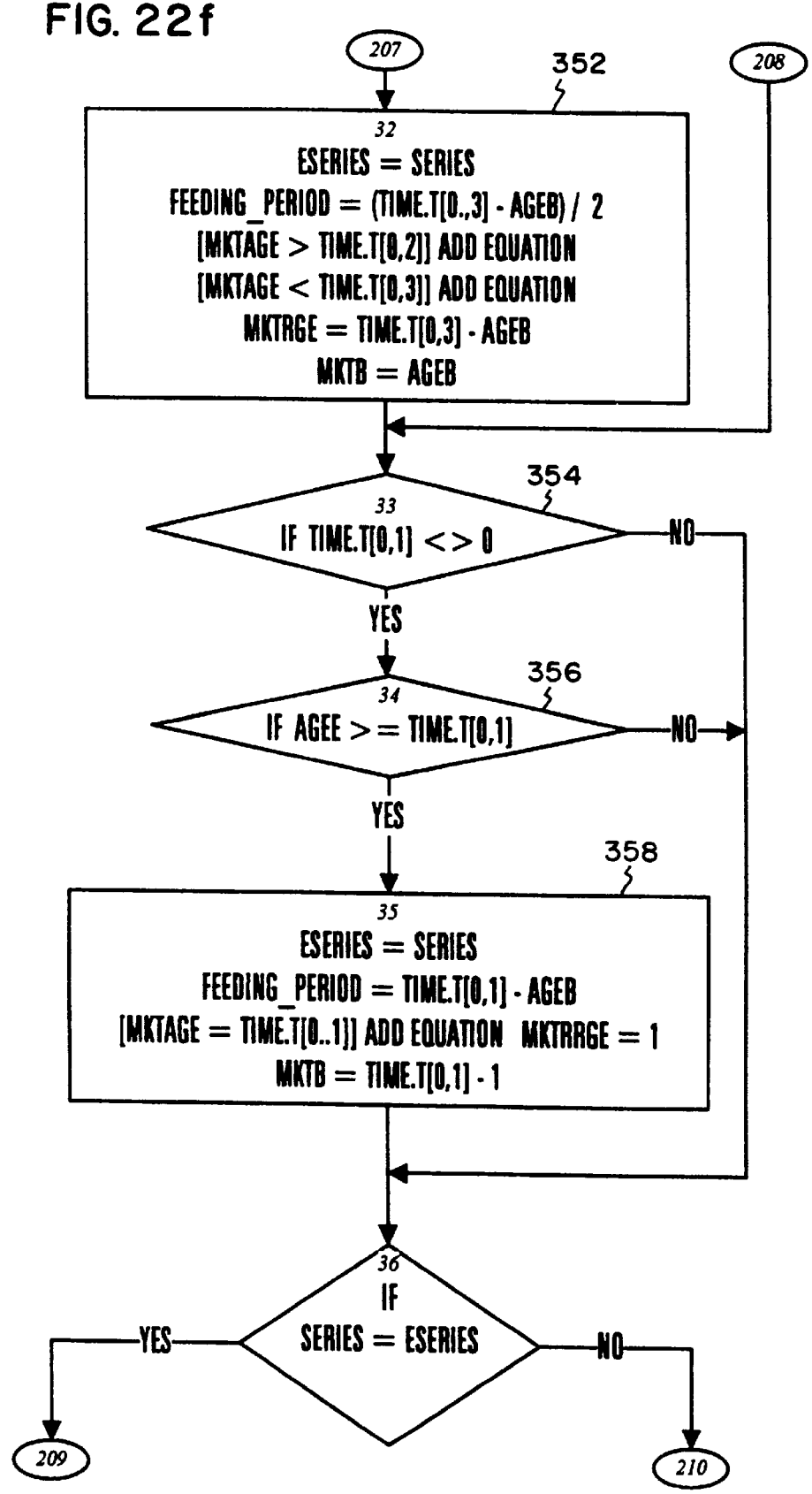
Figure 22G:
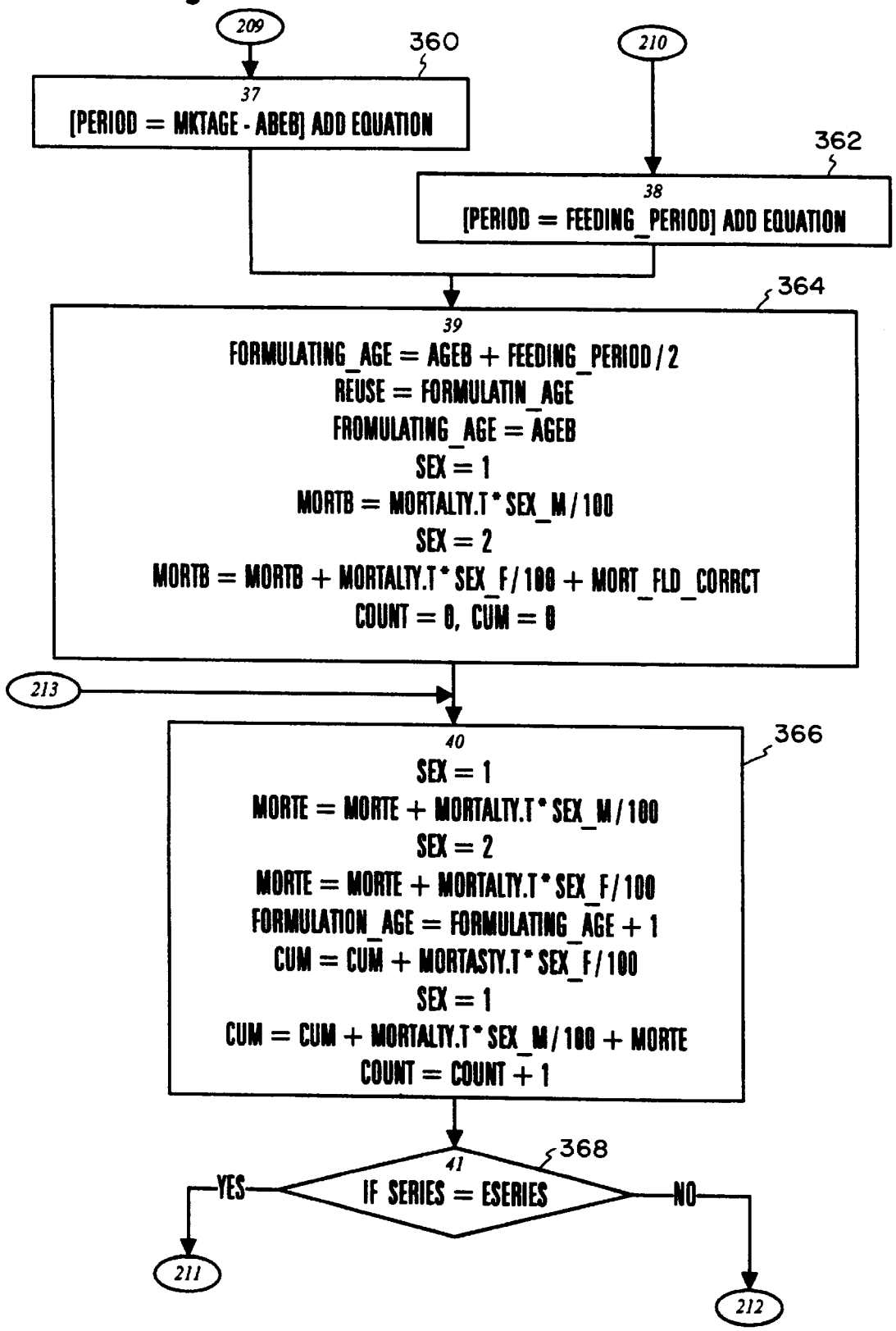
Figure 22H:
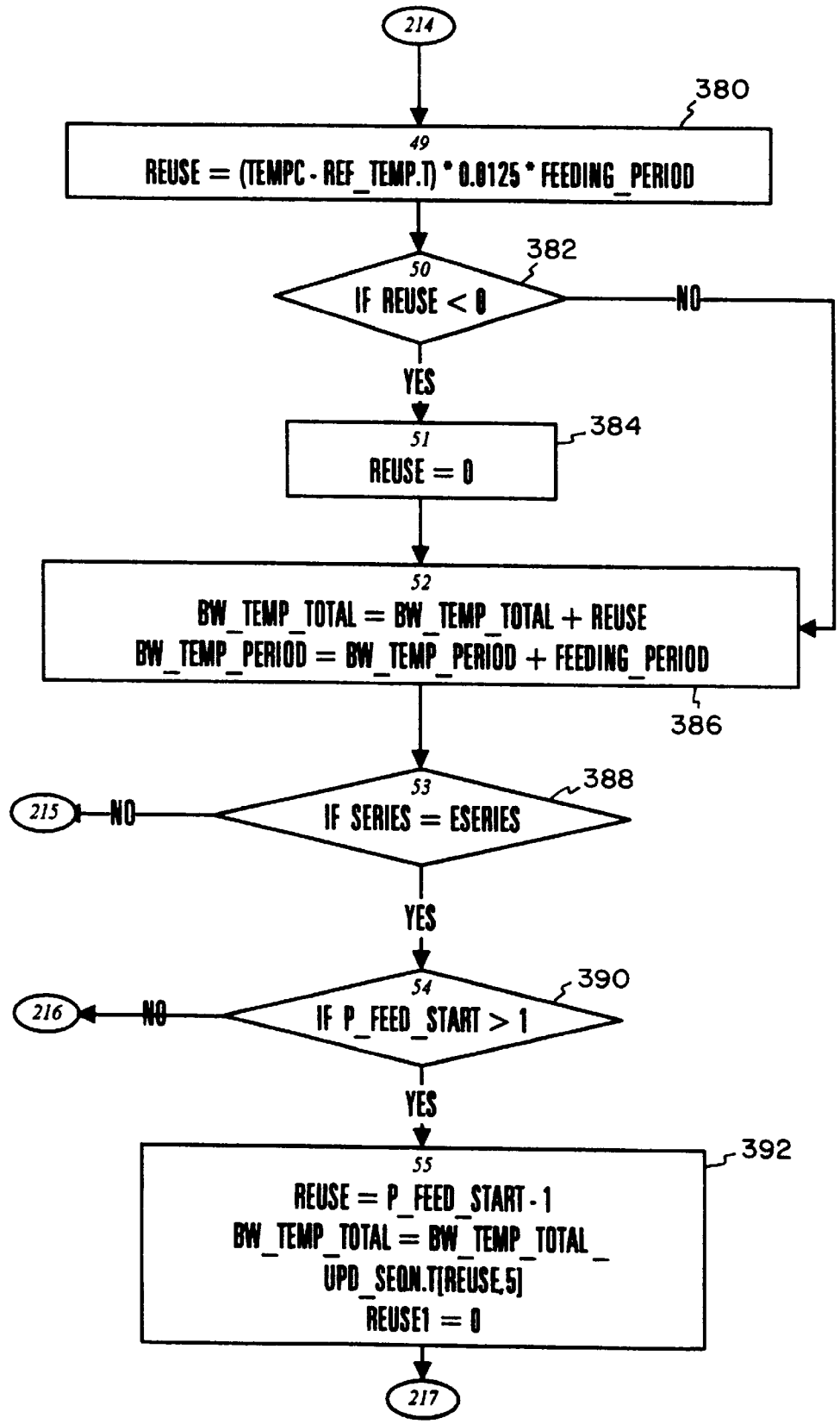
Figure 22I:
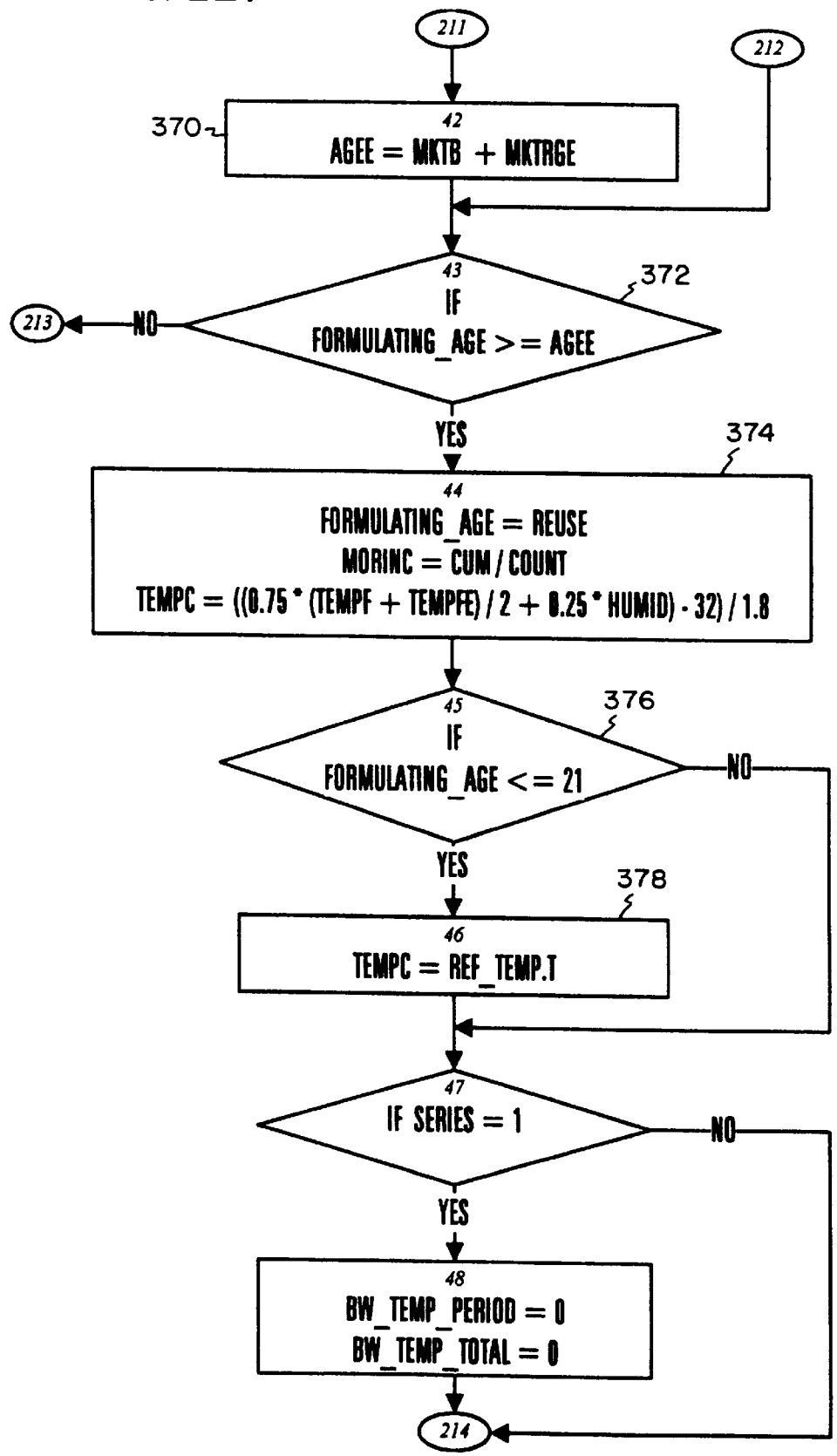
Figure 22:
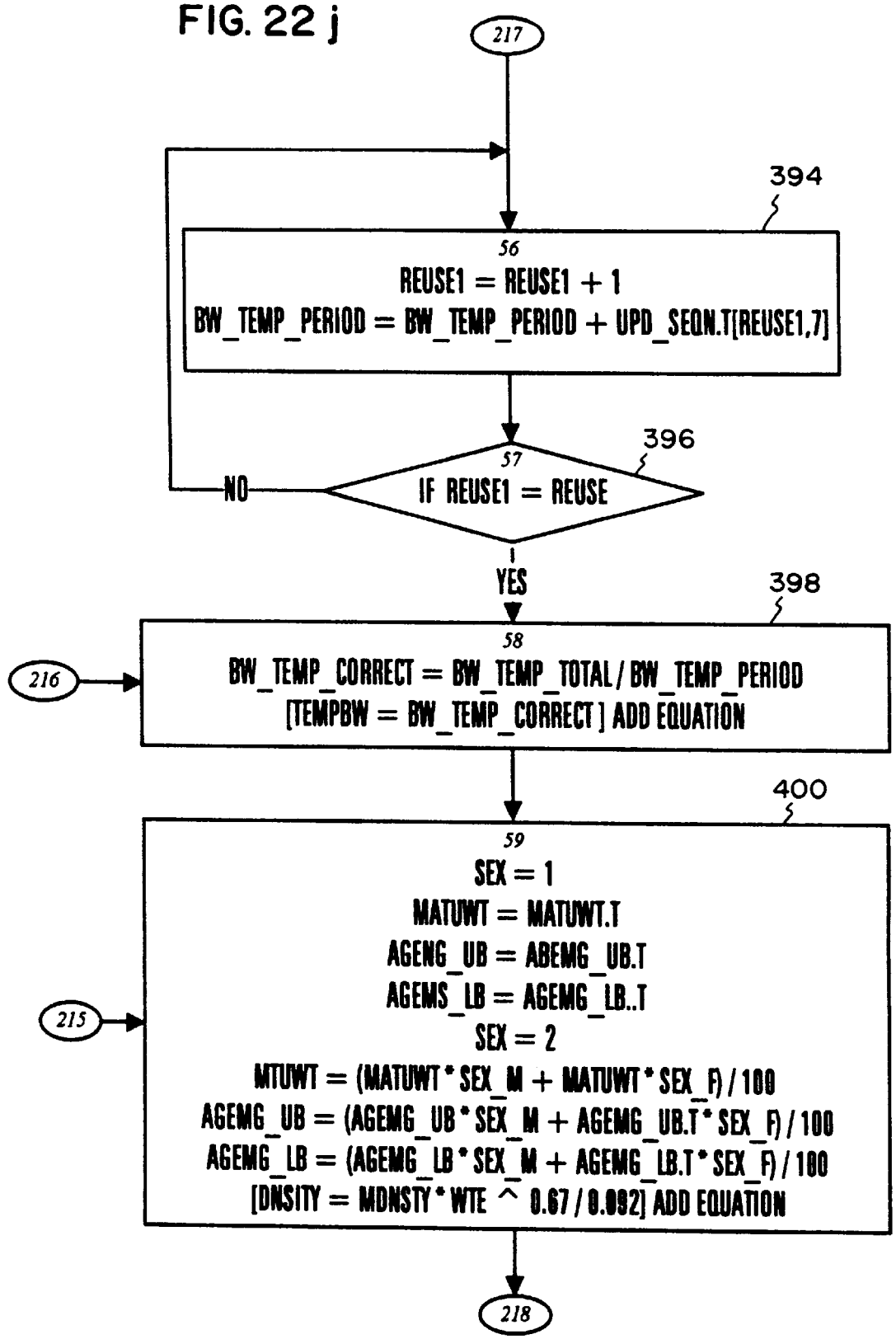
Figure 22K:
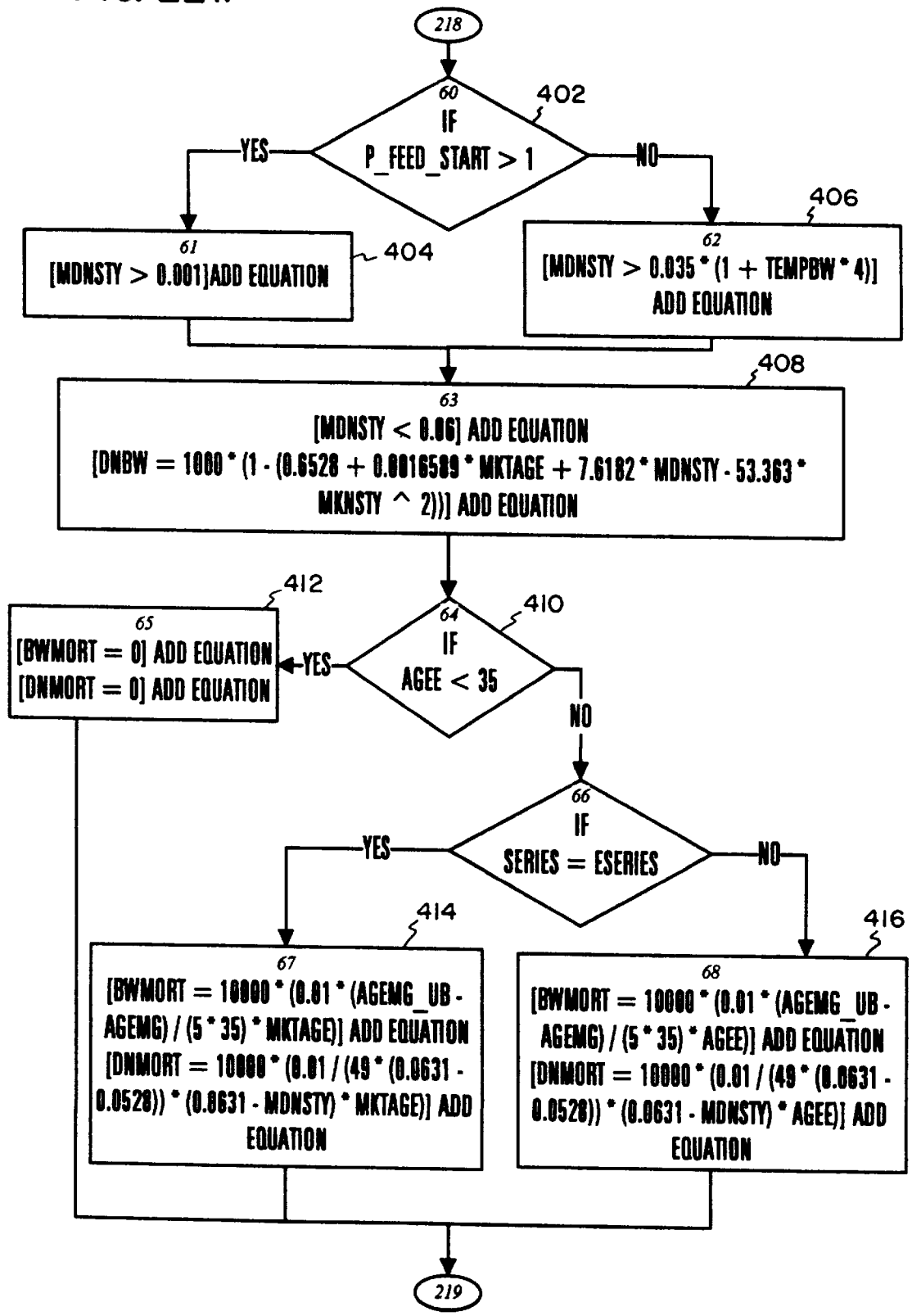
Figure 22:
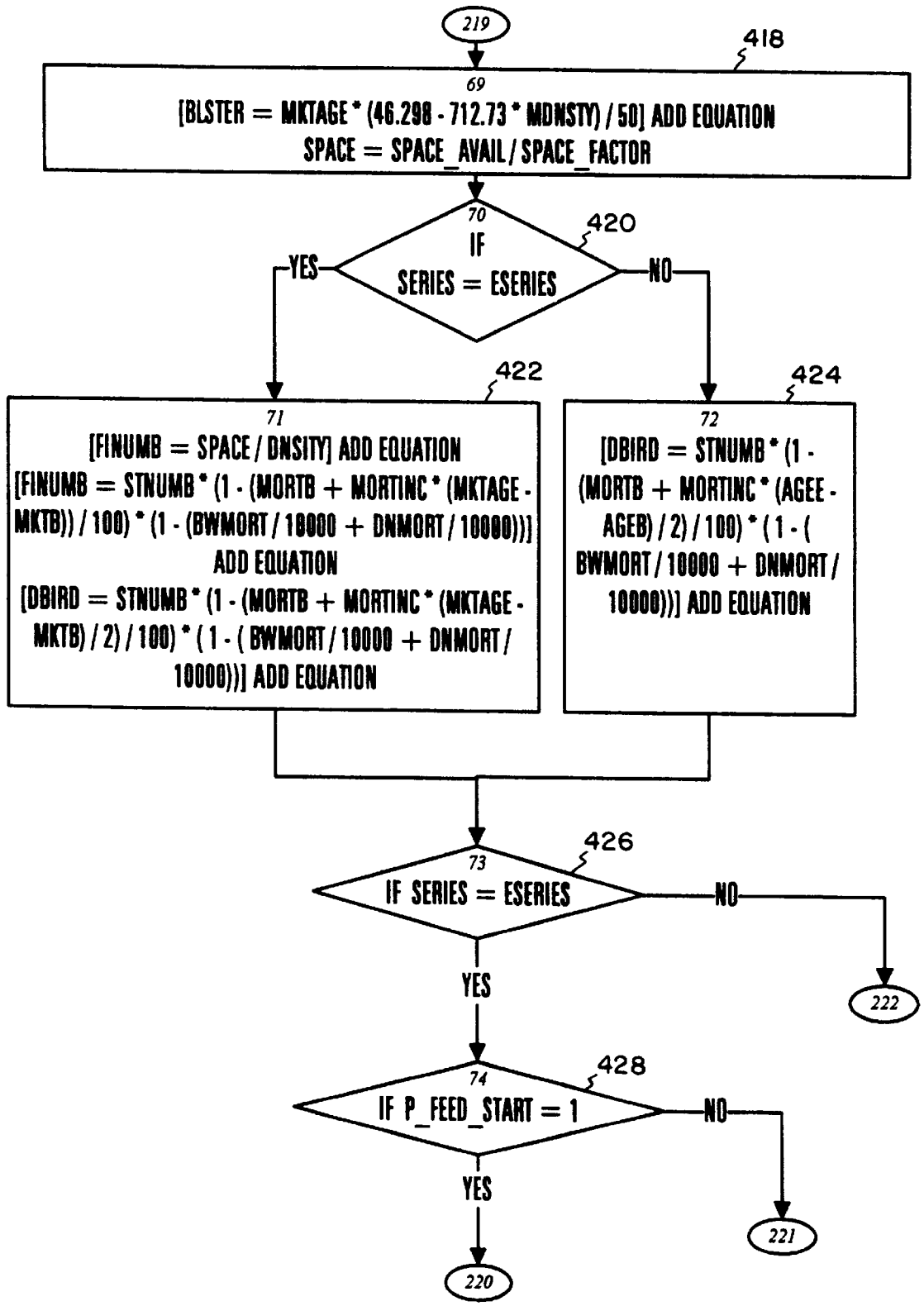
Figure 22:
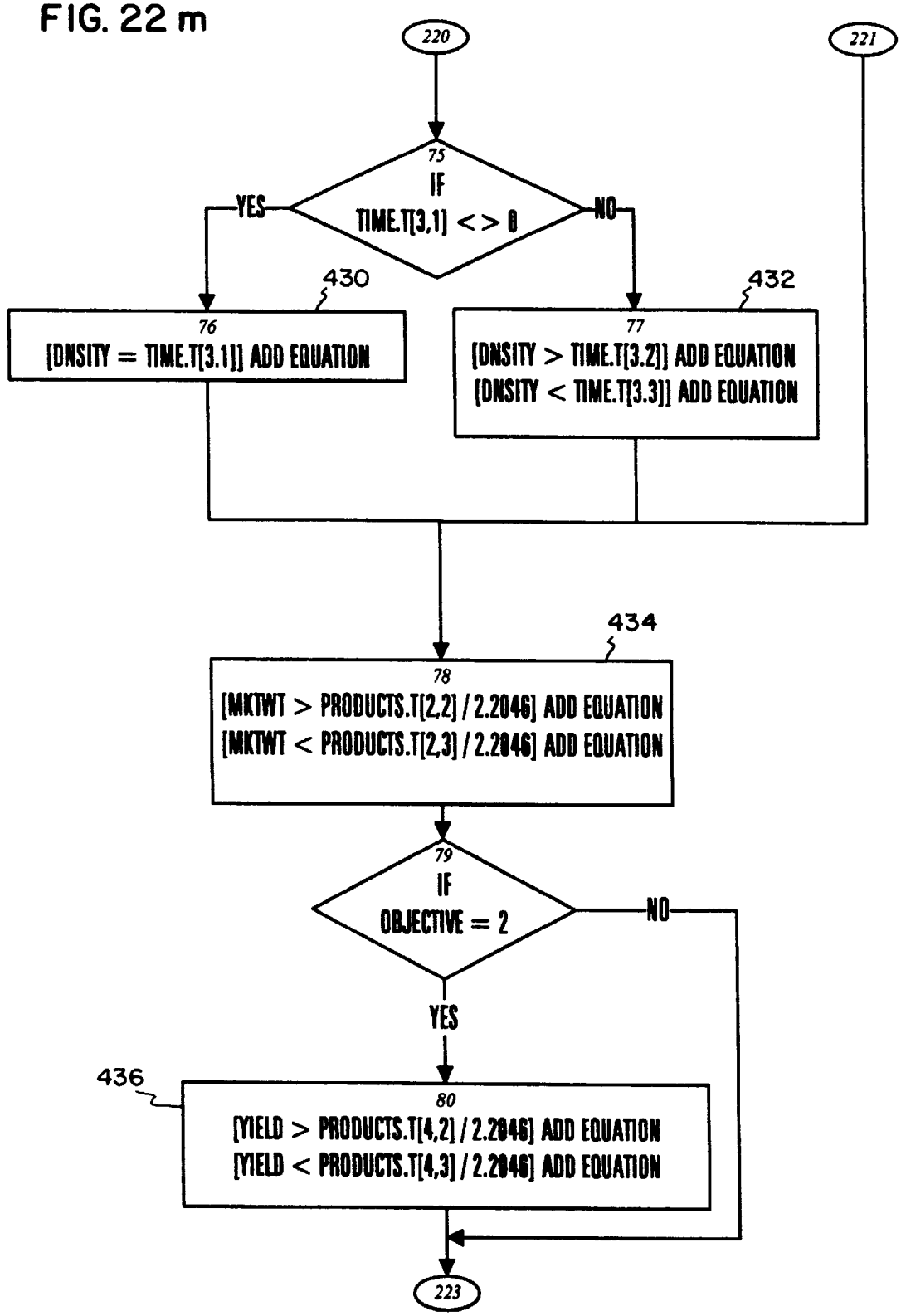
Figure 22:
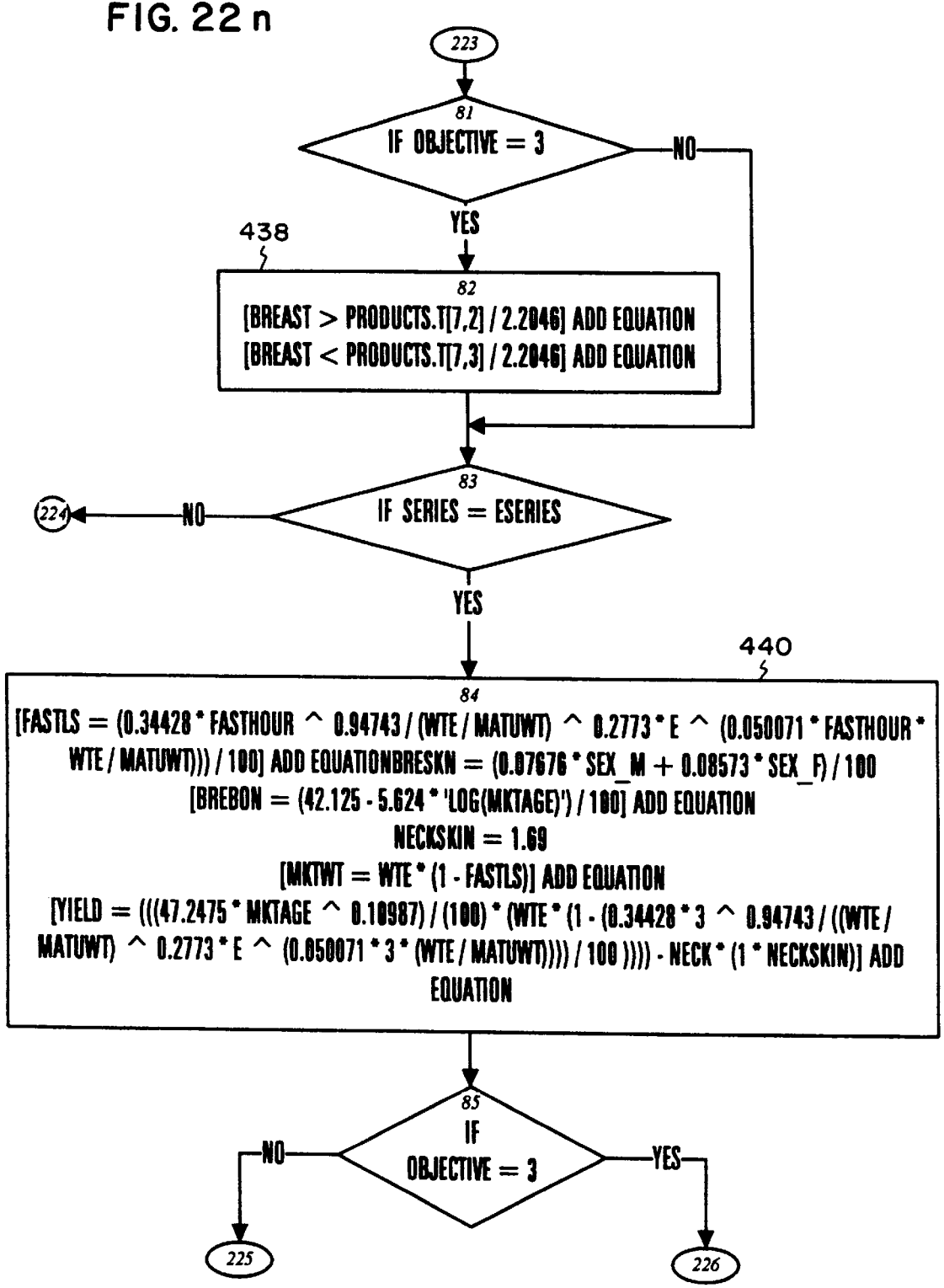
Figure 22:
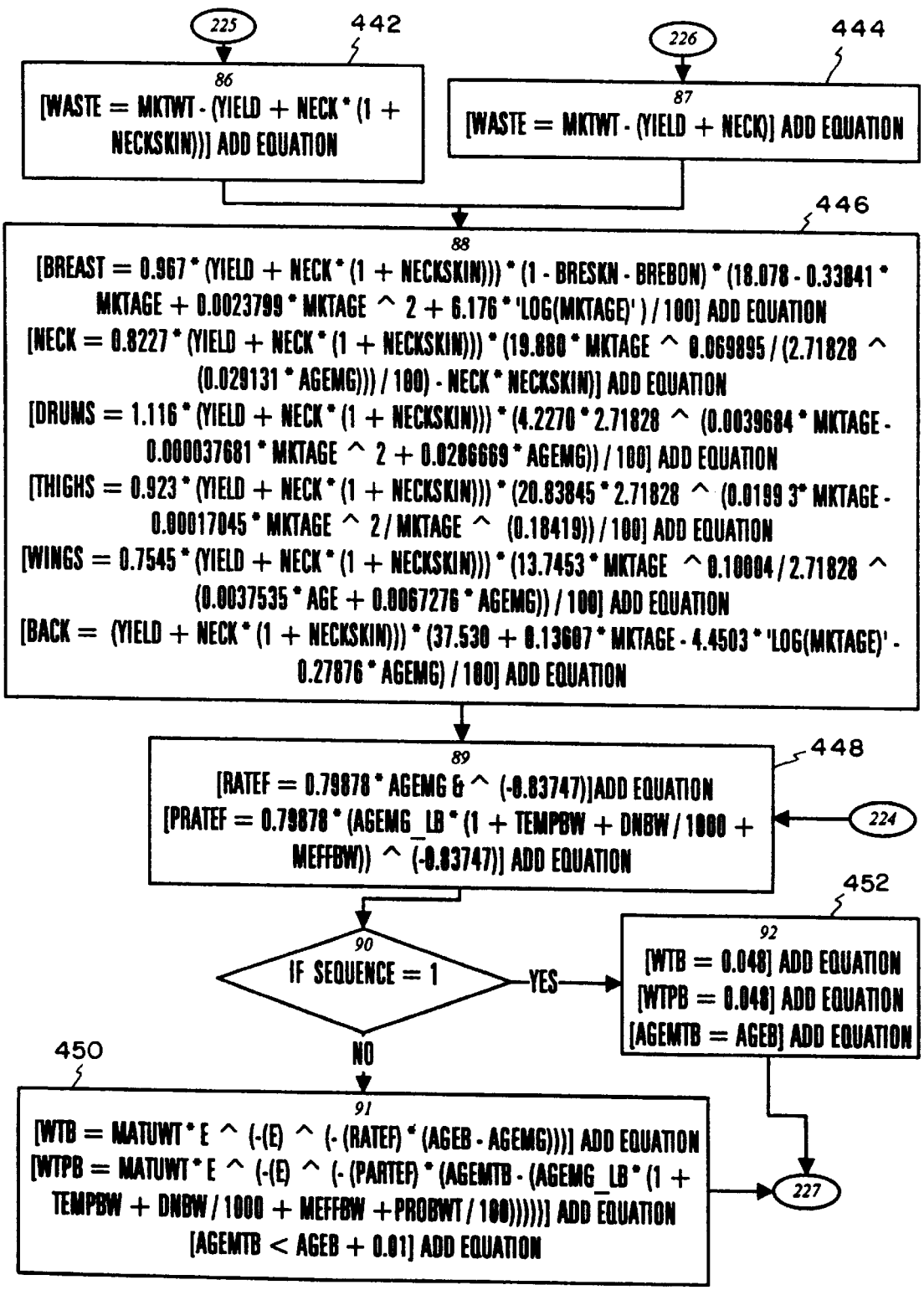
Figure 22P:
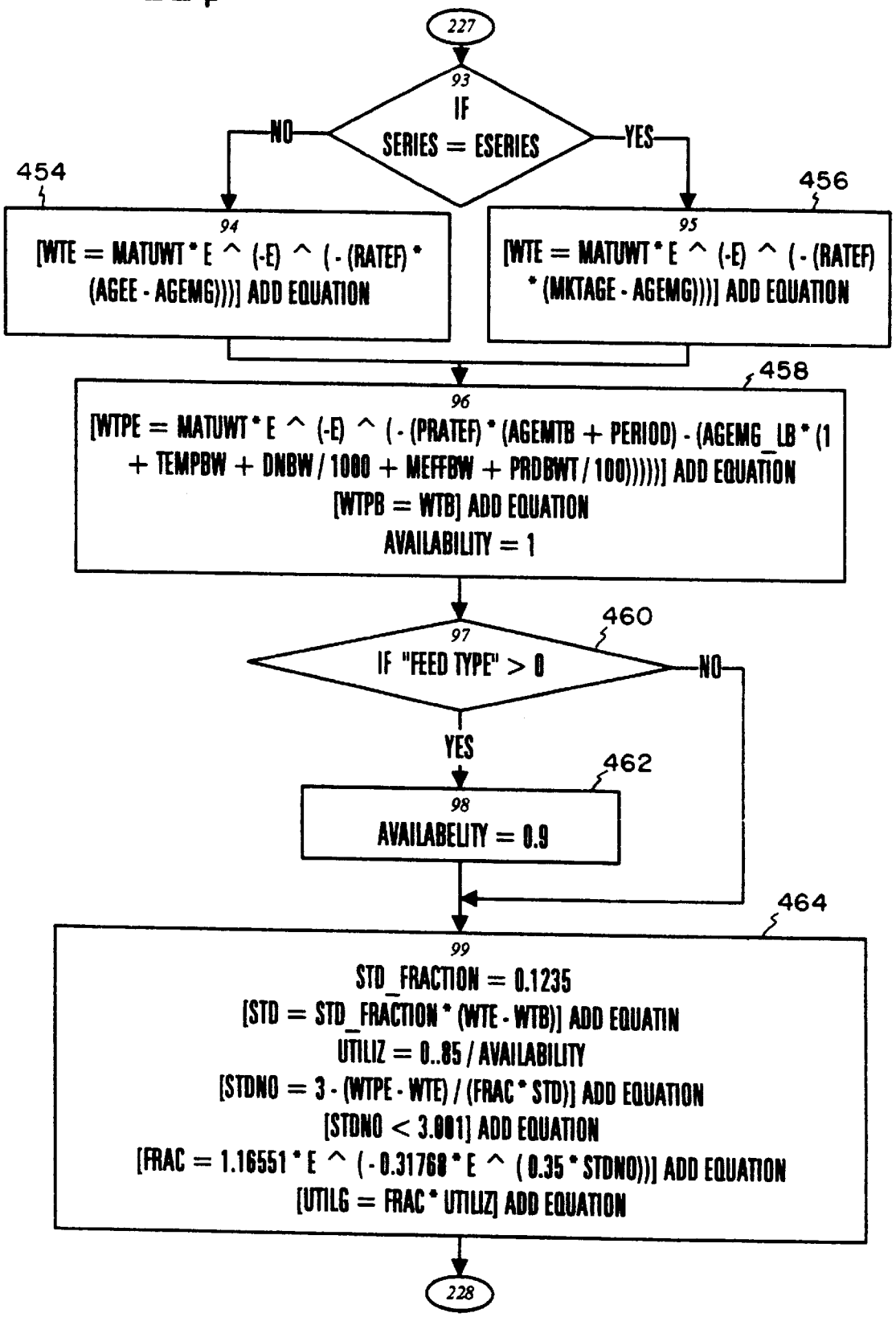
Figure 22Q:
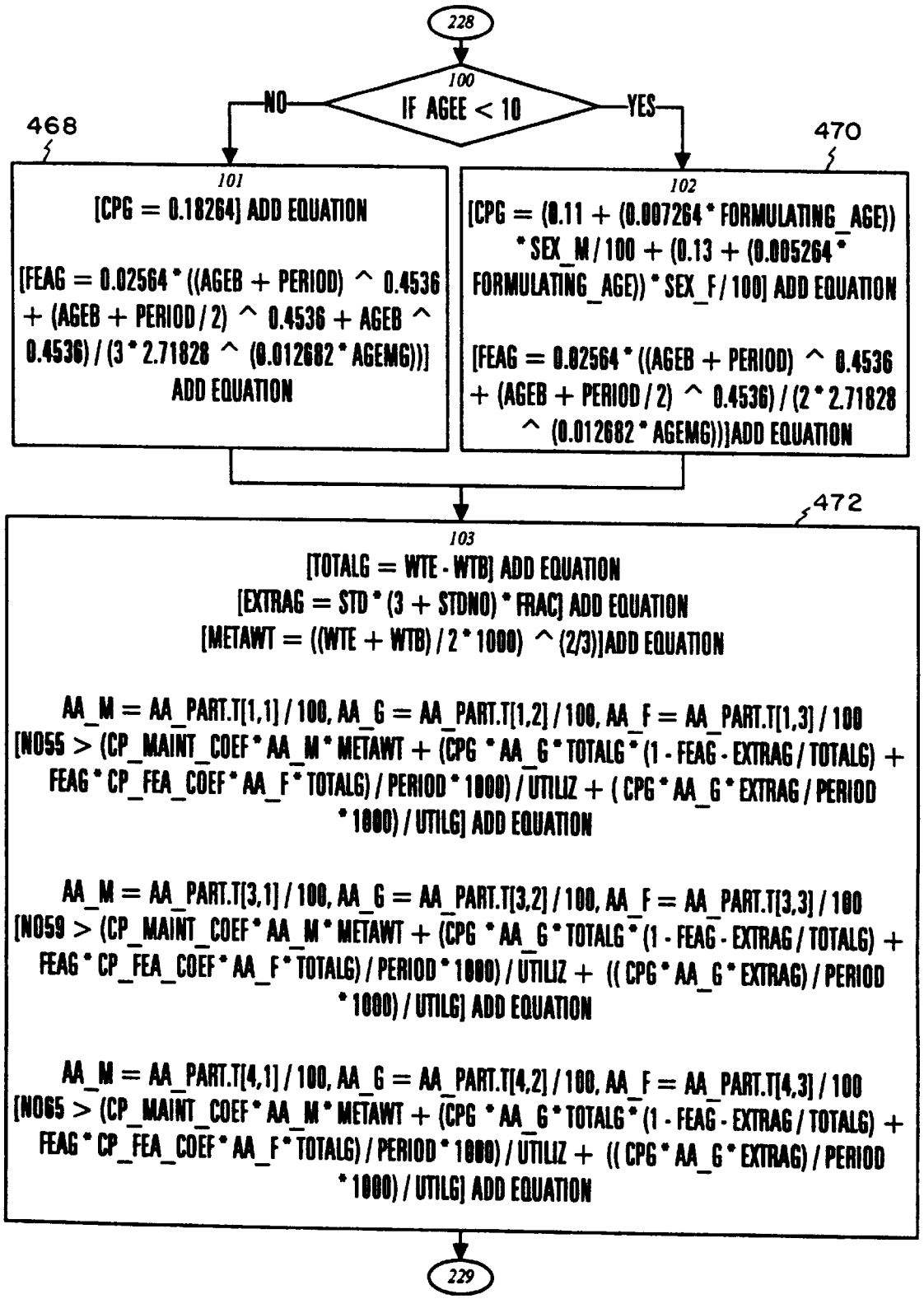
Figure 22R:
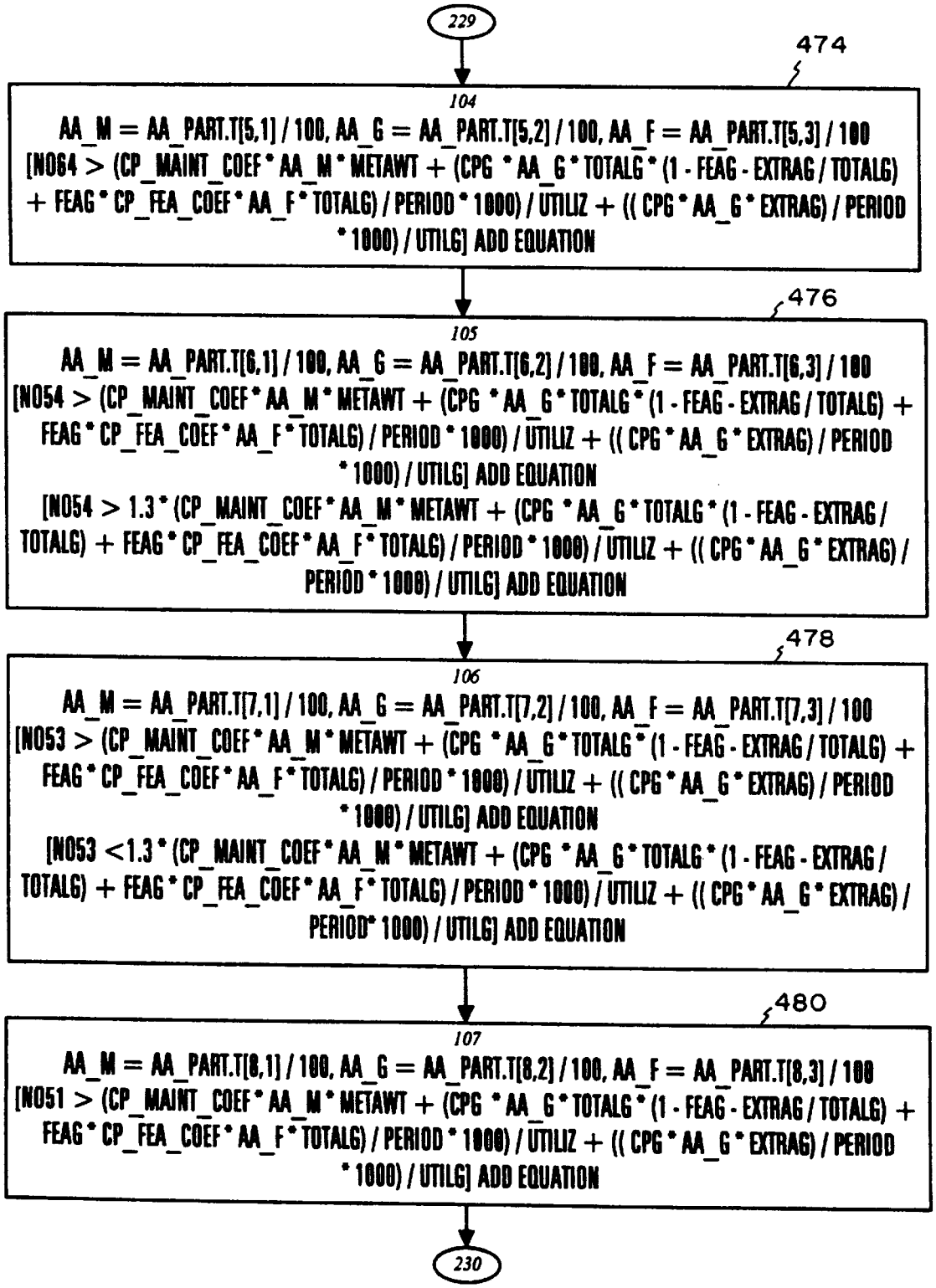
Figure 22:
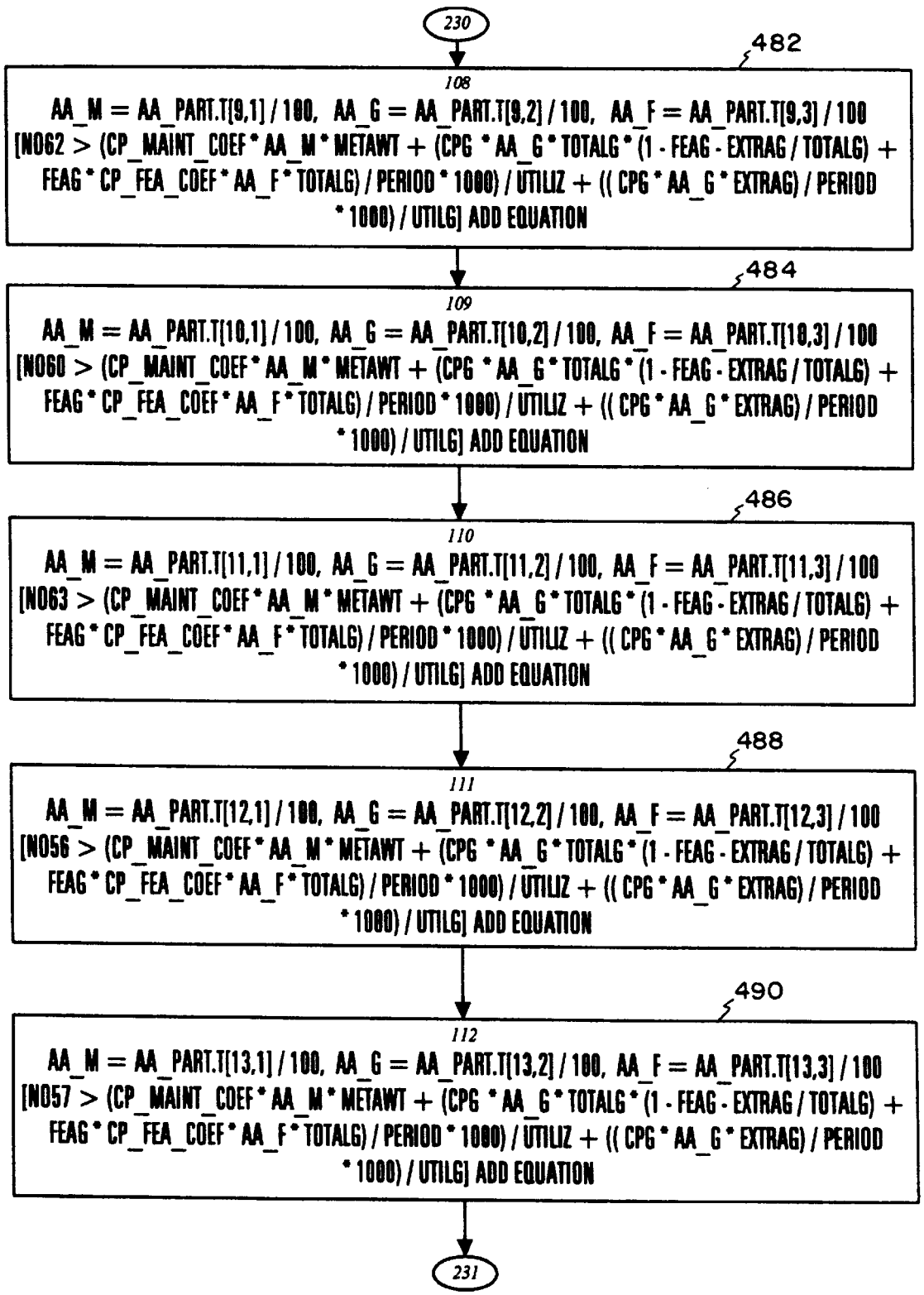
Figure 22:
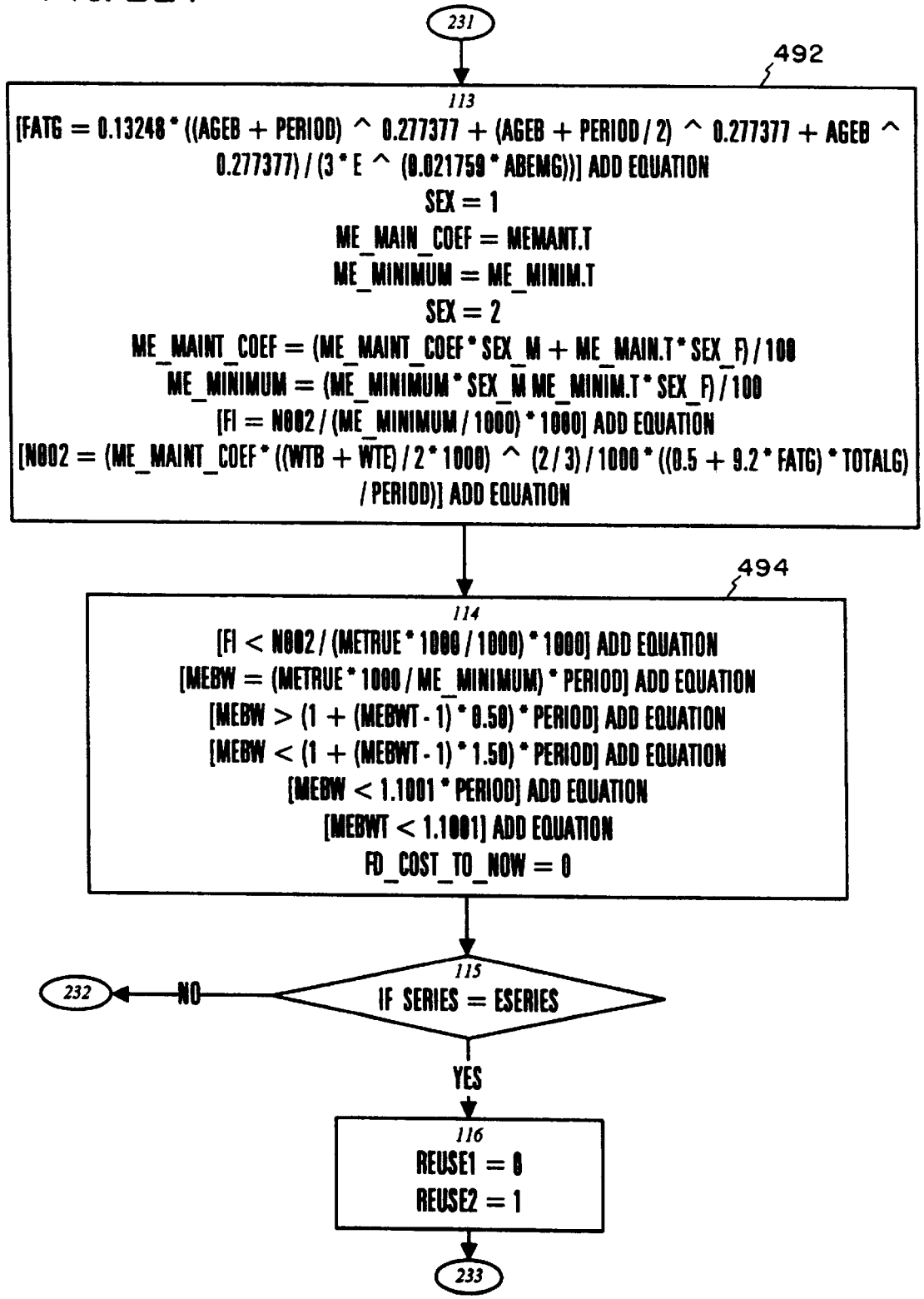
Figure 22:
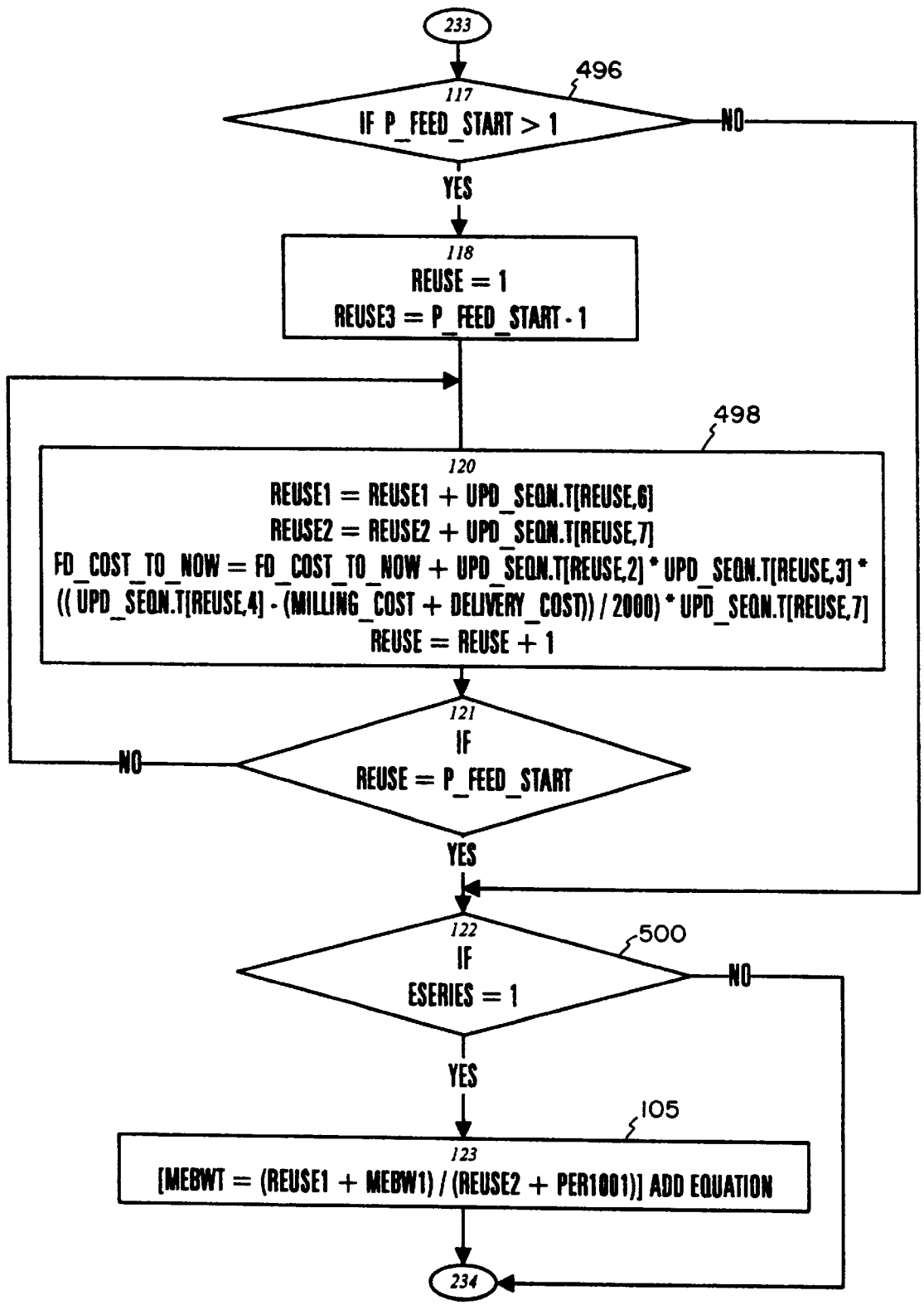
Figure 22:
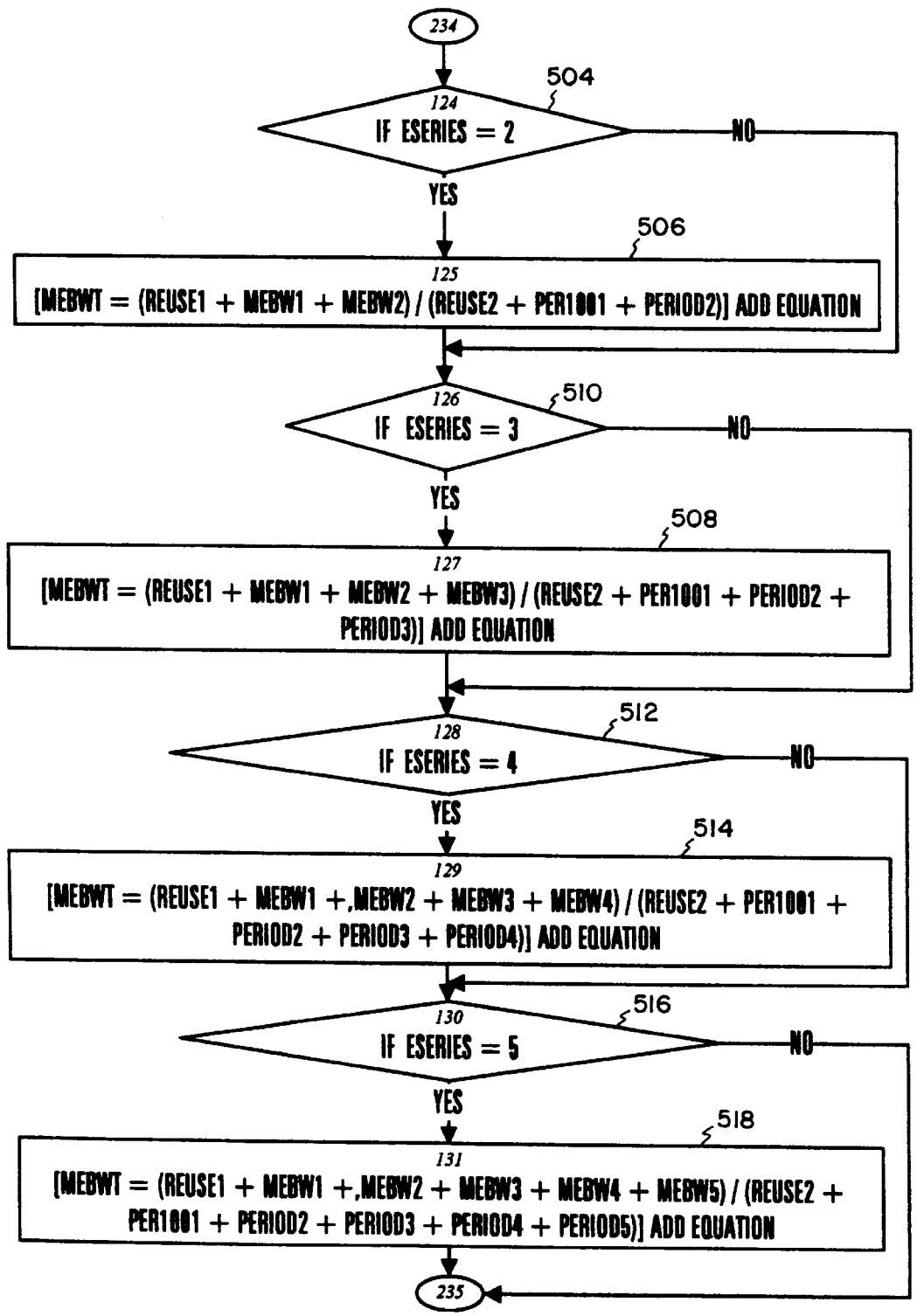
Figure 22X:
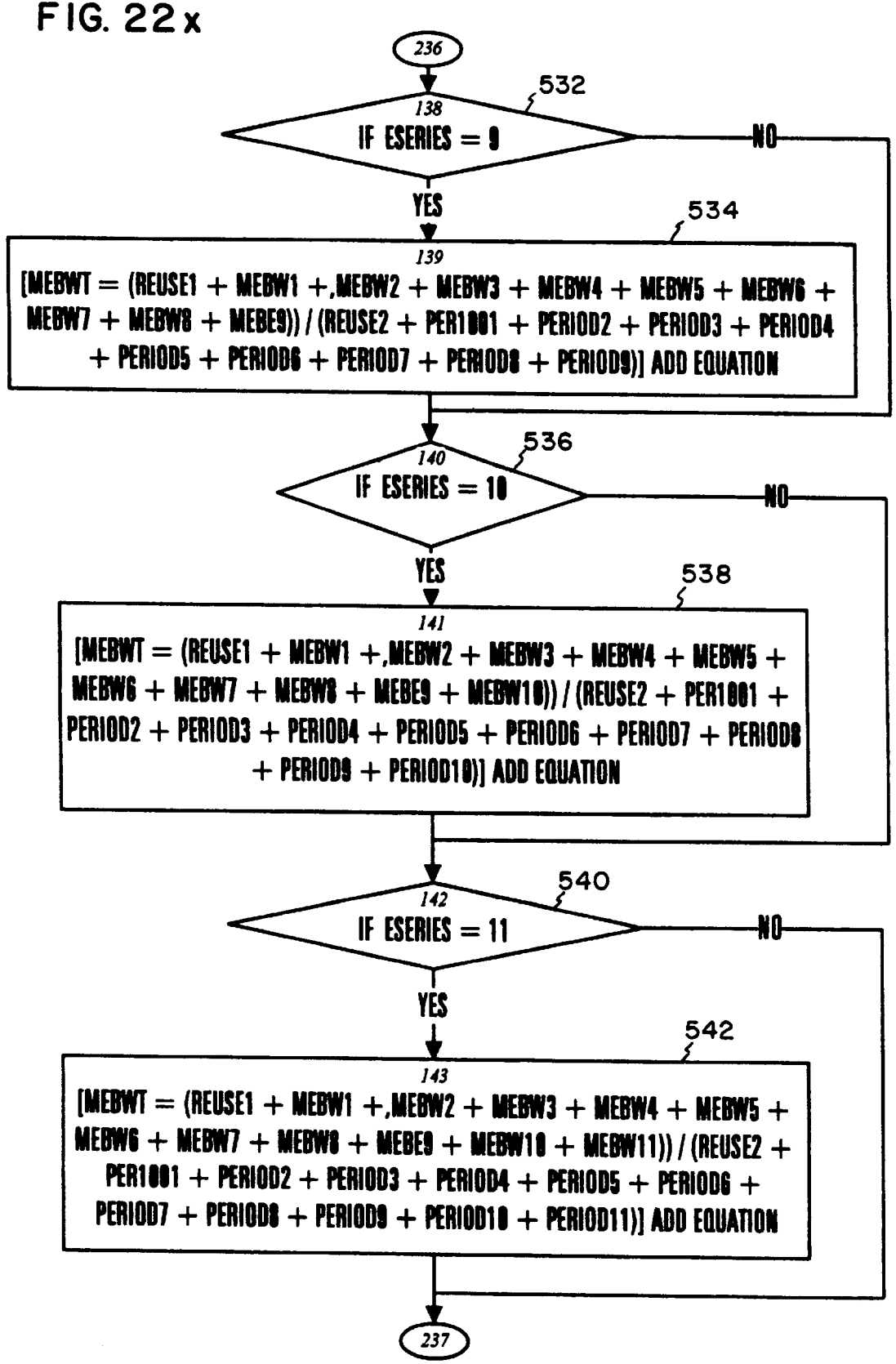
Figure 22Y:
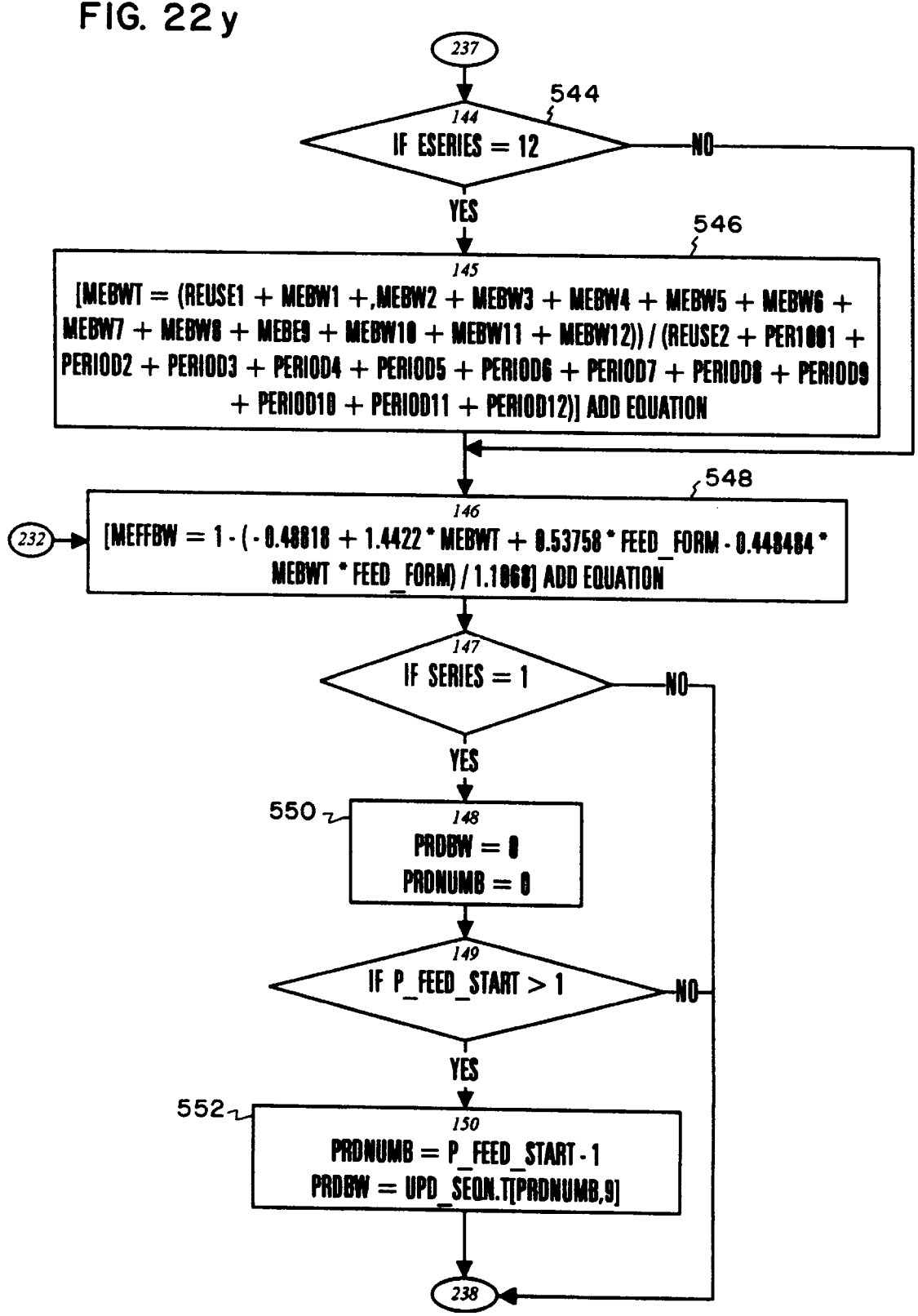
Figure 22Z:
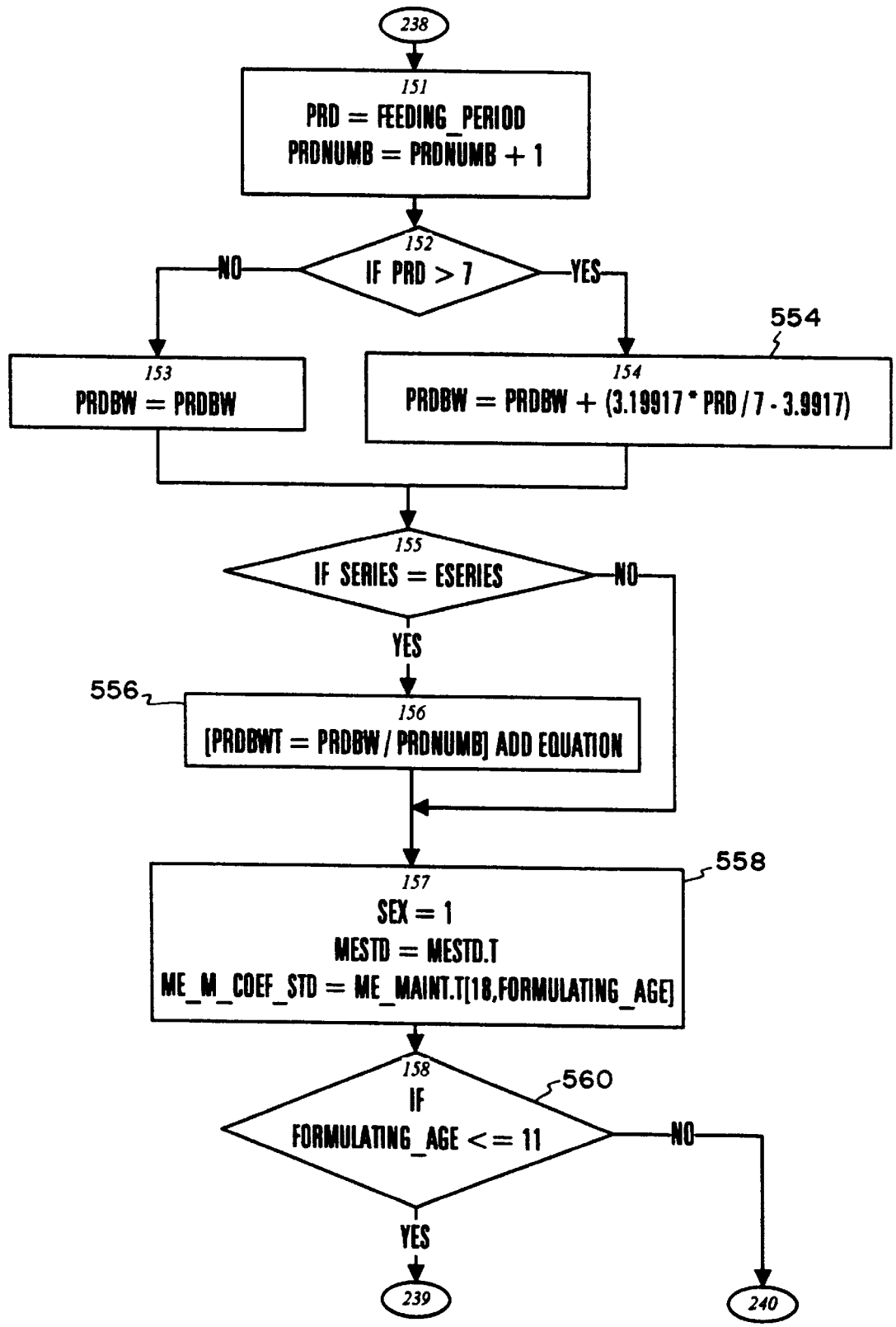
Figure 22:
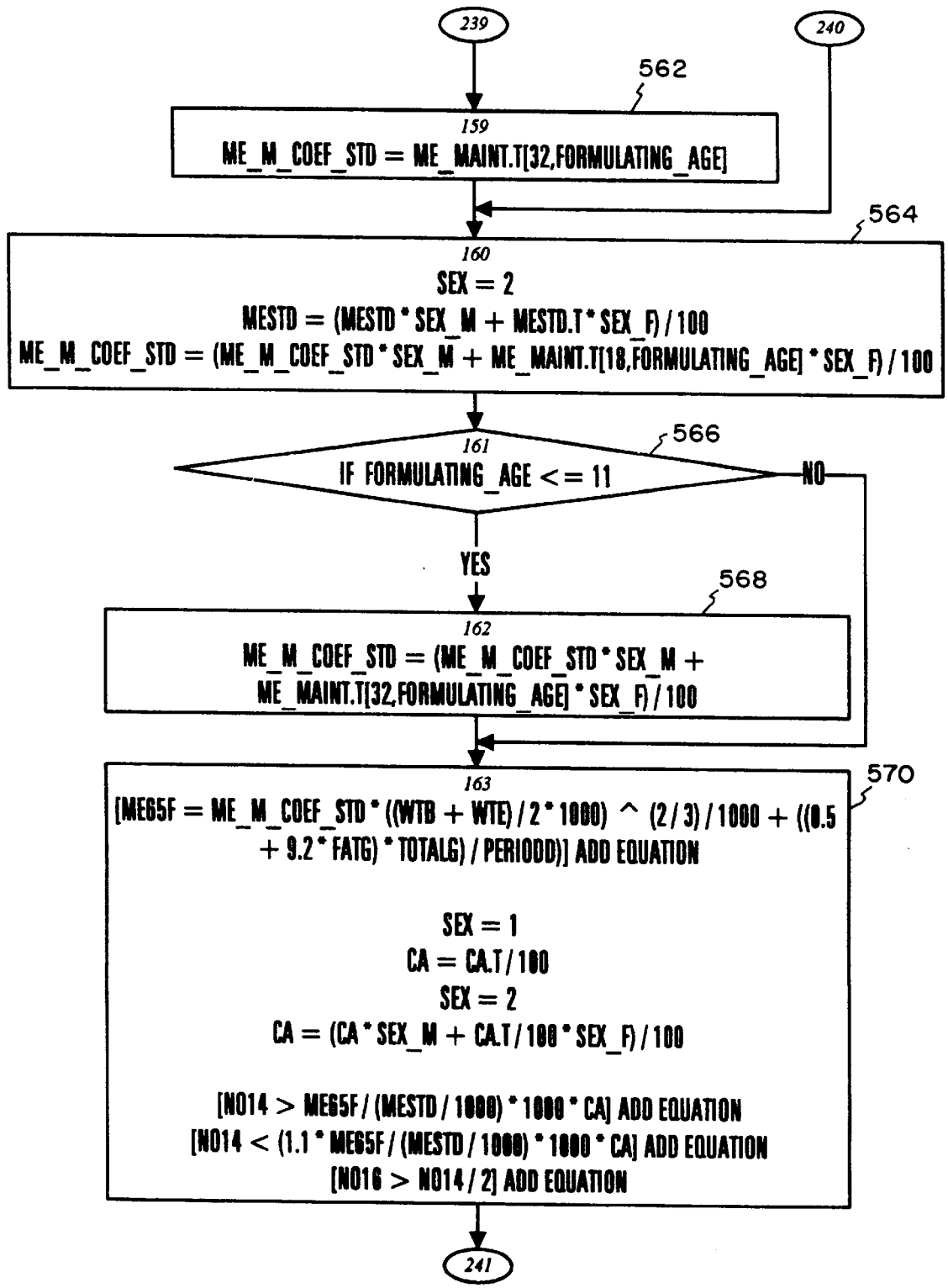
Figure 22:
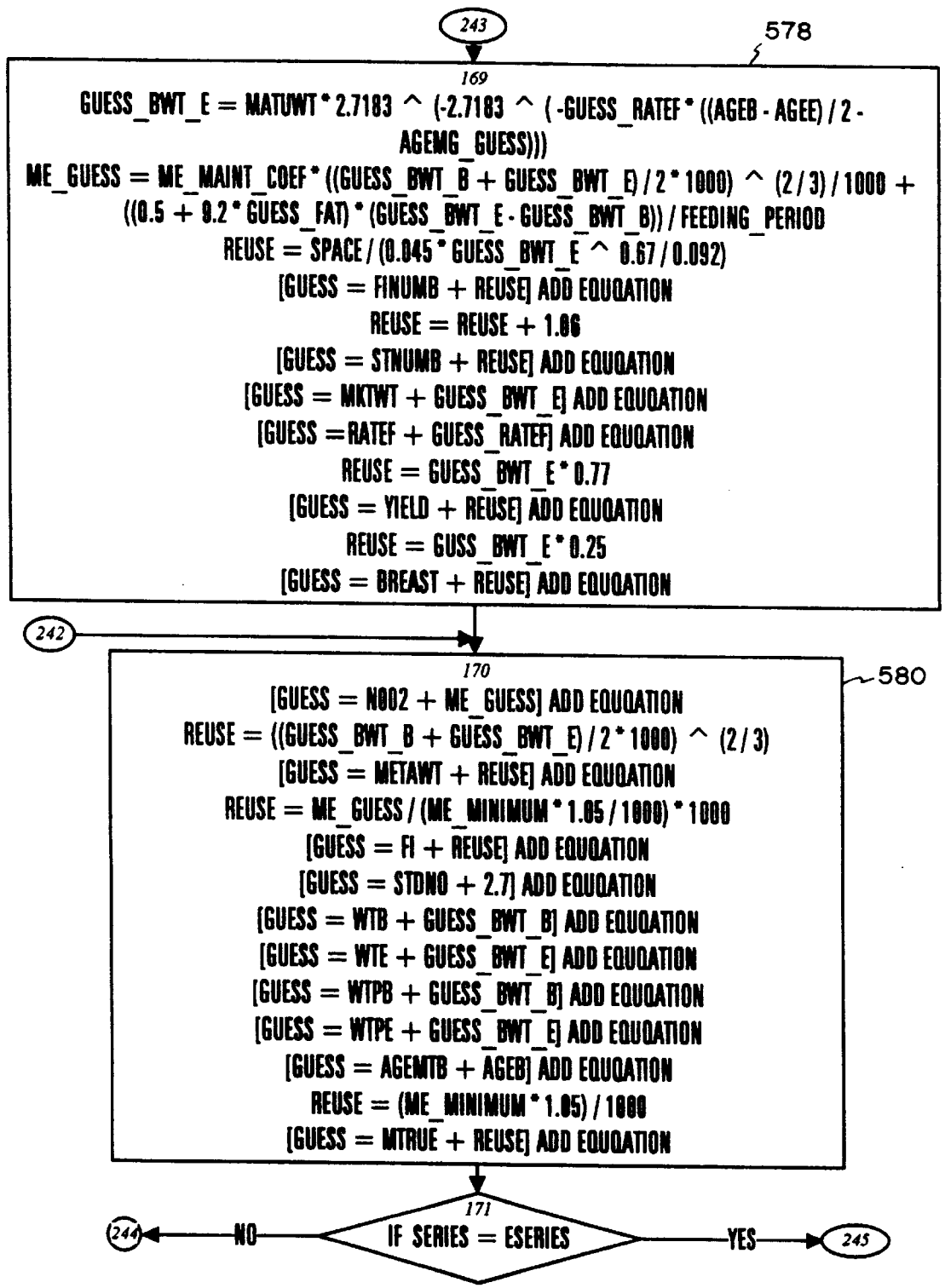
Figure 22:
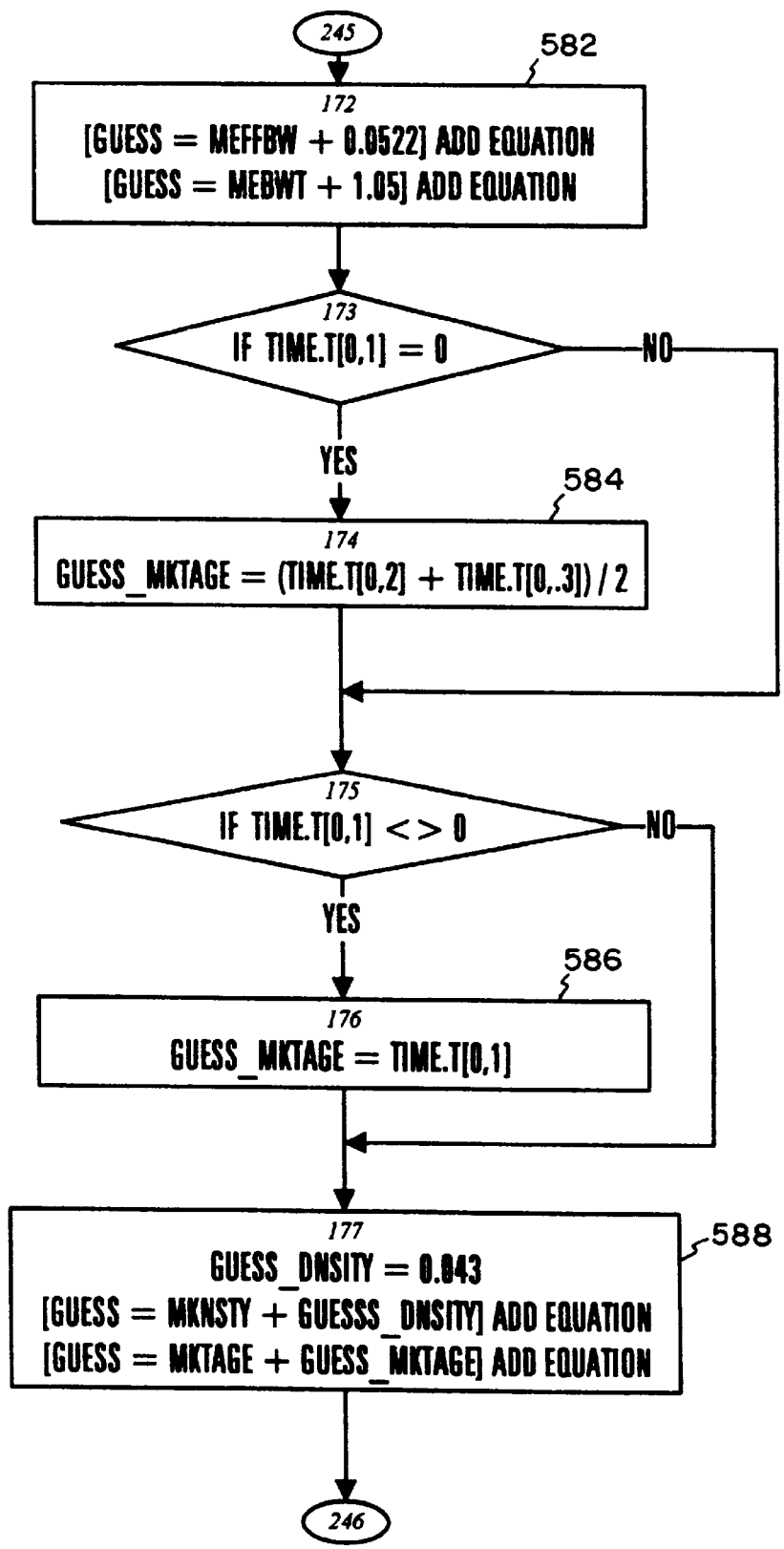
Figure 22:
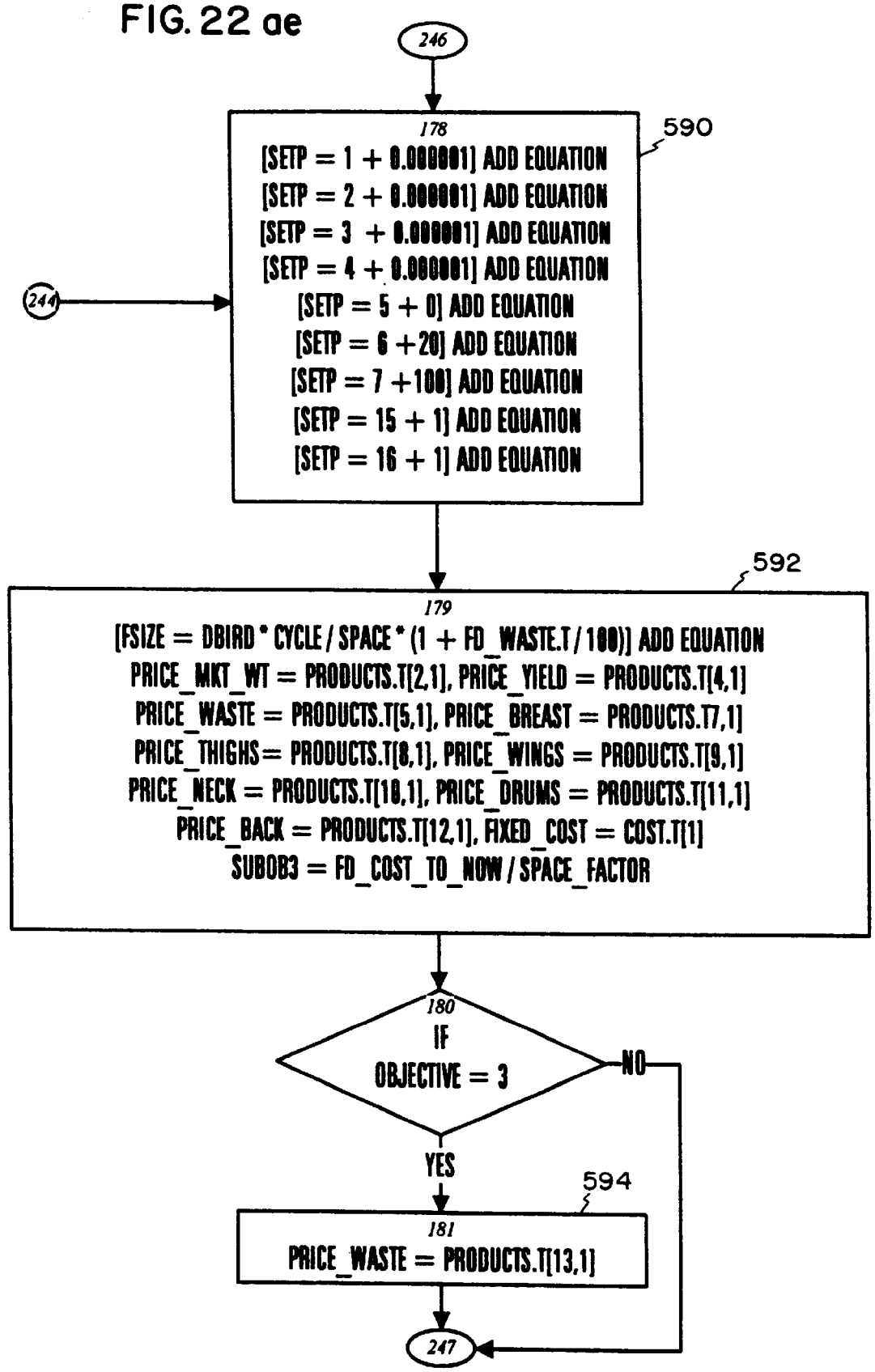
Figure 22:
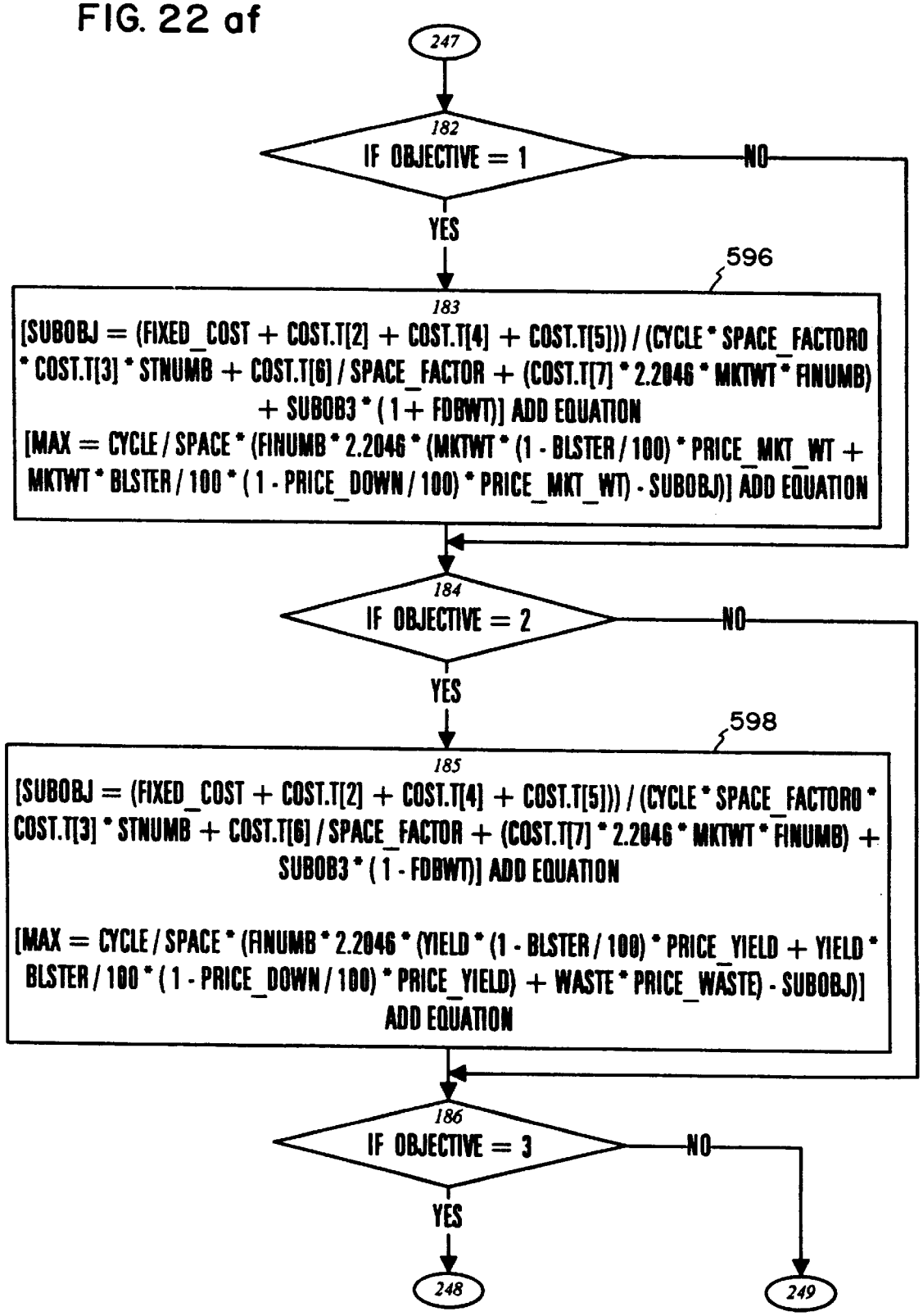
Figure 22:
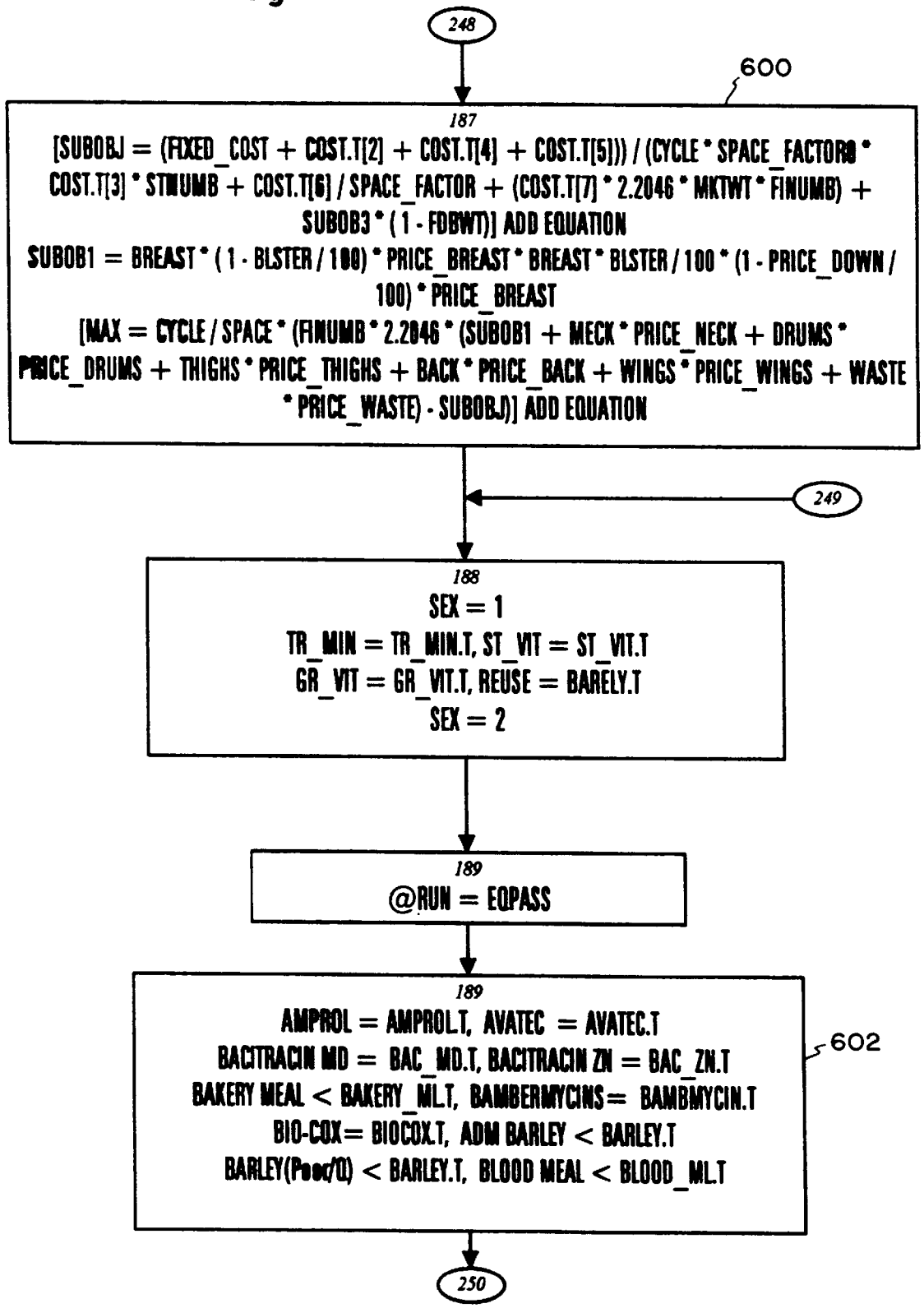
Figure 22:
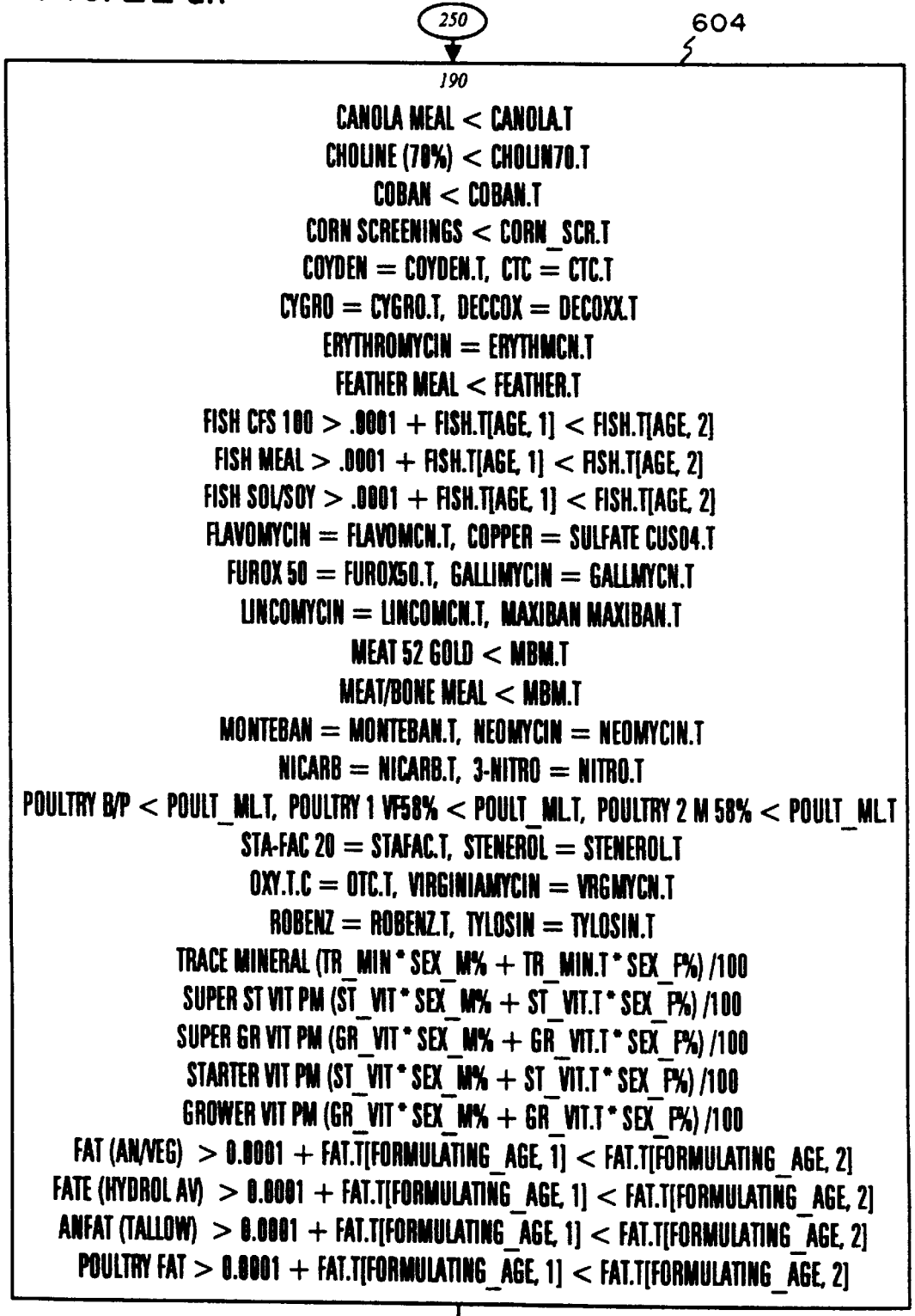
Figure 22:
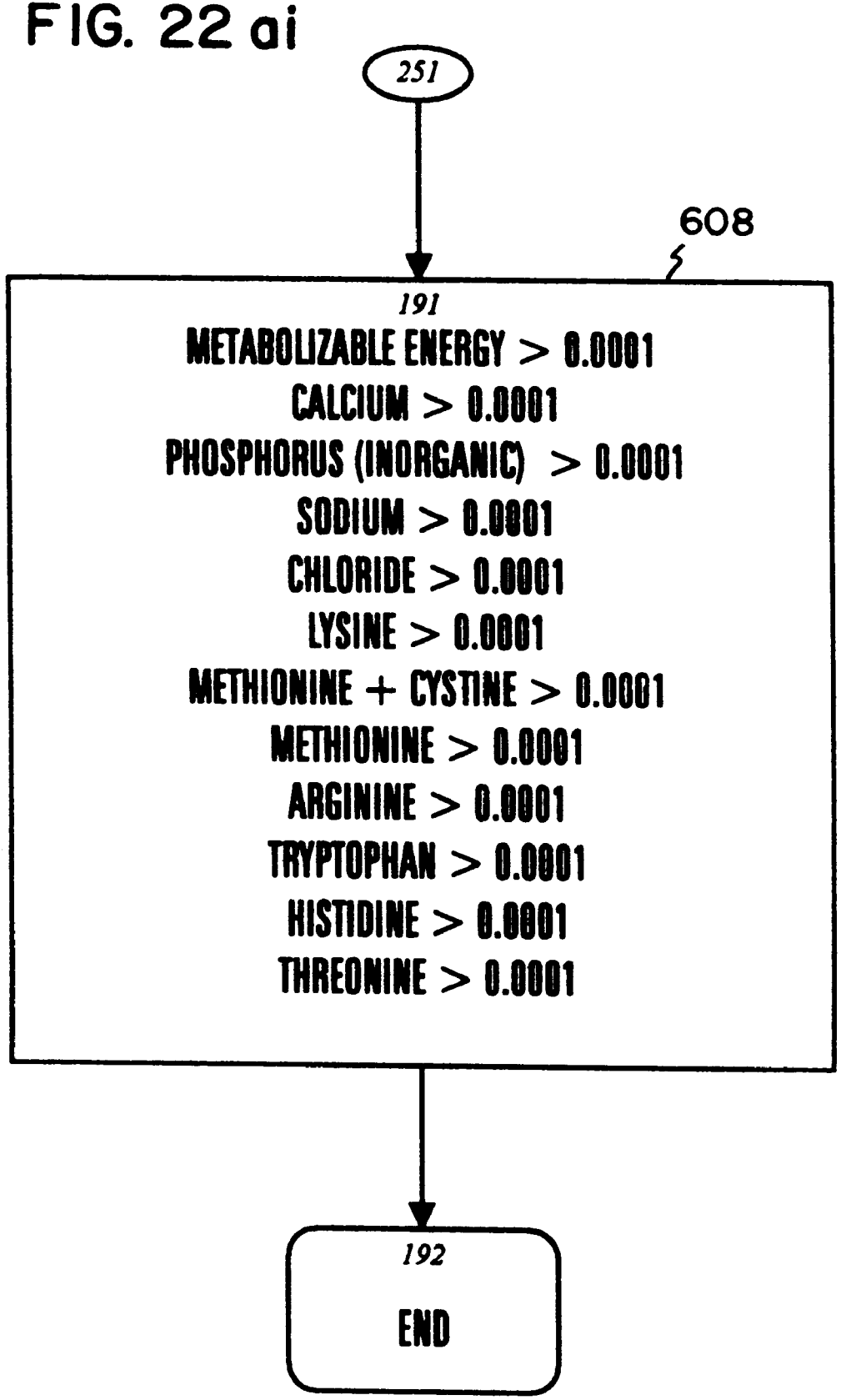

Referring now to FIGS. 22a–22ai, the program begins at block 300. The mathematical constant e (e=2.71828) and a space correction factor (SPACE_FACTOR=1000) are established at block 302. If this is the first time the model is executed, set the age, temperature, humidity values from a table for the current conditions, and set the mortality correction to zero, block 304. The sequence value is then set to the current period, block 306.

If the sum of the percentage of males and females does not total 100% (plus or minus 1%) indicate a failure in the program at block 308. The next step is to give the optimizer an impossible condition at block 310 and indicate that this is the last of the series of passes, thus the user does not see the incorrect values.

If the starting feed period begins when the animal is born or hatched, (P_FEED_START=1), block 312, set feed cost correction by body weight to zero(FDBWT=0), block 314. Then skip to block 342. If the starting feed period begins at some point other than the birth of the animal (P_FEED_START>1), block 316, update the (model) sequence number and feed cost correction by body weight, blocks 318 and 320, respectively. Current condition information such as age, temperature and humidity is then entered, block 322.

If this is not the first pass of the program skip to block 340. Otherwise, compare optimized body weights to the field body weights at blocks 324–334. More specifically, find the current age of the animals, look up the values in the age database and compare it to the real body weights (P_AVE_BWT). Also compute the standard deviation (REUSE1) in the weighed animals and the real age (REUSE3), block 324. Check for errors at block 326 in order to eliminate faulty values for body weights based on variation, and the number of animals weighed. Upon finding an error, set the standard deviation to a very large number, block 328. If the standard deviation is more than two or less than negative two, add the equation for weight at the beginning of the current period (WTB) with the equations in block 332. Otherwise add the equation for weight at the beginning of the current period (WTB) with the equations in block 334.

Compute the field mortality correction (MORT_FLD_CORRCT) at block 336. If it is more than four or less than negative four, set it to zero at block 338. Add equations to the model for the number of birds placed, block 340.

At block 342, set the beginning age (AGEB) to be the current age (AGE) and set the feeding period (FEEDING_PERIOD) to be 0. At block 344, set the ending age (AGEE) of the current sequence to be the beginning age of this sequence as found in the database provided and accumulate it. Do the same step for the feeding period. Retrieve the temperature for the sequence (TEMPFE) from the database, block 346.

Next, set the minimum and maximum market age. If the market lock age is zero, block 348, and the ending age of the sequence is greater than the minimum allowed market age, block 350, indicate that this will be the end of the series of passes through the program (ESERIES=SERIES), block 352. Also at block 352, add equations that set the range for the market age, setup values for the market range (MKTRGE) and the beginning market ages (MKTB, step 32). If the market lock age is not zero. block 354, and the ending age of the sequence is greater than the maximum allowed market age, block 356, indicate that this will be the end of the series of passes through the program (ESERIES=SERIES), block 358. Also at block 358, add equations that set the range for the market age, set the market range to one day period and market beginning day equal to one day less than locked market age.

If SERIES=ESERIES add an equation for the period as shown in block 360. If SERIES does not equal ESERIES, add an equation for the period as shown in block 362.

At block 364, set the age for the diet formulation (FORMULATING_AGE) equal to the age at the middle of the current period. Then compute the beginning mortality (for current conditions) for the males and females depending on the respective percentages and add in the correction factor. At blocks 366–372, compute the mortality for each day from the beginning of the period until the end of the period and add the results to get the cumulative mortality. At block 374, divide the cumulative value by the number of days in order to obtain the incremental mortality (MORTINC).

Also compute the effective temperature at block 374. However, if the age of the current diet formulation is less than 21 days, block 376, retrieve the value of the effective temperature from the reference temperature table for the current conditions, block 378. Next compute the adjustment period for temperature effects on body weight at block 380–384. At block 386, add that correction factor to the total correction factor for body weight affected by temperature (BW_TEMP_TOTAL), and setup the period over which the correction factor is applied (BW_TEMP_PERIOD).

If this is not the end of the series skip to block 400. If the feed starting period is at the beginning, skip to block 398. Otherwise, summarize uptodate temperature effects on body weight (block 392) and the number of days from a table (BW_TEMP_PERIOD) (block 394). At block 398, add an equation to the model for the body weight temperature correction (TEMPBW).

At block 400, compute the weight at maturity (MATUWT), place a constraint for minimum age at maximum gain (AGEMG_LB), and maximum ages at maximum gain (AGEMG_UB). Additionally, add an equation to the model for the animal density (DNSITY). If the feed starting period is not the first, block 402, add an equation to the model that indicates mass density (MDNSTY whose units are sq. meter/kg^0.67) is greater than a very small number, block 404. Otherwise calculate the lower limit of the mass density at block 406. At block 408, set an upper limit on the mass density and then add an equation to the model for the correction factor for body weight as a function of bird density (DNBW). If the ending age for the period is less than 35 days, block 410, set the mortality as a function of body weight (BWMORT) and mortality due to density (DNMORT) to zero, block 412. Otherwise they are calculated in either block 414 or 416. More specifically, if this is the end of the series use the equations for BWMORT and DNMORT in block 414, which are based on the market age (MKTAGE). Otherwise the use the equations in block 416, which are based on the ending age (AGEE) for the current period.

At block 418, add an equation to the model to take into effect the blistering on the breast of the bird.

If this is the end of the series, block 420, add equations to the model for number of birds at processing time (FINUMB) and the average number of birds in the period (DBIRD) based on the market age (MKTAGE), block 422. Otherwise, only add an equation for DBIRD based on the ending age of the current period, block 424.

If this is the last of the series, block 426, and the first time for the feed formulation (P_FEED_START=1), block 428, then add equations for animal density as provided in tables, blocks 430 and 432. If the user has supplied a fixed animal density, use it (block 430) otherwise set the constraints in minimum and maximum as found in a table (block 432).

At step 434, set constraints in the model for the maximum and minimum weight at market time from a table. If the objective is the weight of the carcass without giblets (W.O.G.), add equations for eviscerated carcass yield at block 436. If the objective is cut up parts, set constraints on breast yield at block 438.

If this is not the last of the series skip to block 448. Otherwise, add equations to the model that effect the body weight loss from fasting (FASTLS) during the time that it is being taken to market, block 440. Additionally, find the percentage of skin on breast (BRESKN) and neck (NECKSKIN) from tables for the current conditions. Use these corrections in equations that are added to the model for breast bone (BREBON), market weight (MKTWT), and yield (YIELD).

If the objective is cut up parts, add an equation for waste (WASTE), either block 442 or 444. Next, add the equations for breast, neck, drumsticks, thighs, wings, and back to the model, block 446. Then add the equations to the model for the Gompertz rate factor (RATEF) and the rate factor for potential growth (PRATEF), block 448.

Depending on whether this is the first period in the sequence, add the equations from either block 450 or 452 to the model. These blocks included different variations for the equations for the weight at the beginning (WTB) of the period, weight at beginning of the period (WTPB) for potential growth curve, and age at the beginning for maturity (AGEMTB). Similarly add an equation for the weight at the end (WTE), block 454 or 456. At block 458, add the equations to the model for the weight at ending period for potential growth (WTPE) and set the weight at the beginning period of potential growth equal to the weight at the beginning of optimized growth.

If the feed type is not zero, block 460, use 90% of amino acid availability as a standard parameter, block 462. Otherwise the standard availability of amino acids is 100%, block 458. At block 464, add equations for the standard deviation for body weight (STD), the number of standard deviations for average gain in body weight (STDNO), fraction of normal curve (FRAC), and efficiency of non-linear gain (UTILG).

Depending on whether the animal's age is less than ten days, add equations for protein gain and feather gain set forth in block 468 or 470.

At block 472, add the equations for the total gain (TOTALG), extra gain (EXTRAG) and the average metabolic weight (METAWT). Then obtain the amino acid content for maintenance (AA_M), weight gain (AA_G) and feather gain (AA_F) from the database for Arginine, Lysine, Histidine, Isoleucine, Leucine, Methionine and Cystine combination, Methionine, Phenyalanine and Tyrosine combination, Phenyalanine., Threonine, Tryptophan, and Valine. Add constraints for each of these nutrients to the model at blocks 472–490, respectively.

The next step is to add equations for fat gain (FATG), feed intake (FI) and nutrient Metabolizable Energy (N002) to the model, block 492. Then add constraints for period and accumulating effect of metabolizable energy on body weight taking into account nutritional density and feed form at this point (MEBW and MEBWT), block 494.

If the user is reoptimizing, block 496, compute the feed cost to the present (FD_COST_TO_NOW), block 498. For each sequence from the beginning of the period, look up the effect of metabolizable energy on gains in the sequences, the feed costs in the database, and sum them together. The user is reoptimizing if the feed start period is not the first period.

Depending on the current pass in the series, compute the effect of metabolizable energy on weight gain (MEBWT) by adding up the metabolizable energy weights from the previous passes and one in the current pass and dividing the sum by the lengths of the periods of the previous passes, blocks 500–546.

At block 548, add the equations to the model for body weight correction that is dependent on metabolizable energy and the feed form (MEFFBW).

In the first pass in the series, set the values of the period body weight and the number of the period to zero, block 550. Then look up the effect of period on body weight in the database at block 552. If the feeding period is greater than 7 take into account the effect of the length of the feeding period on growth, block 554. If this is the last of the series of passes, compute the average effect of body weight for the entire cycle (PRDBWT), block 556.

The next step is to obtain the standard metabolizable energy values (MESTD) and calculate the standard metabolizable energy maintenance coefficient for the current conditions (dependent on animal age). This task is accomplished by looking up the value for males and females in the database and multiplying by the respective percentages, blocks 558–568. Then add an equation to the model for the metabolizable energy at 65 degrees Fahrenheit (ME65F), block 570.

Then change the standard intake of calcium, phosphorus, sodium and chlorine by adjusting it to the 65 degree fahrenheit energy levels. Next add the constraints for each nutrient (N014 and N016) blocks 570 and 572. An equation for the number of cycles per year (CYCLE) is then added to the model, block 572.

In order to speed up computations, some initial values are provided at blocks 574 and 576 for AGEMG, RATEF, BWTB, BWTE, FAT, ME, which allow the system to make some initial guesses. If this is the end of the series, add different guesses for BWTE, ME, FINUMB, STNUMB, MKTWT, RATEF, YIELD, and BREAST at block 578. Then add guesses for N002, METAWT, FI, STDNO, WTB, WTE, WTPB, WTPE, AGEMTB, and METRUE at block 580. If this is the last pass in the series add guesses for MEFFBW and MEBWT at block 582.

If market lock age was not set by the user, guess the market age to be half way between the maximum and minimum market age, block 584. Otherwise set it be the lock age, block 586. At block 588, set guess values for DNSITY, MDNSTY and MKTAGE.

Finally, the system sets the parameters for the optimizer. The optimization package has tunable parameters that are set at block 590 to provide better performance. Equations for flock parameter (FSIZE) are then added to the model at block 592.

At block 592, price information is the retrieved from the database market weight of animal, and prices for various parts are set. Also look up the fixed enterprise costs and the sub-objective to be optimized. If the objective is cut up parts, look up the price of wasted product at block 594. If the objective selected by the user is to maximize the live bird weight, add the equations of block 596 to the model in order to constrain the sub-objectives and the maximum return on investment. If the objective selected by the user is to maximize the eviscerated carcass weight, add the equations of block 598 to the model in order to constrain the sub-objectives and the maximum return on investment. If the objective selected by the user is to maximize the price of the body parts, add the equations of block 600 to the model in order to constrain the sub-objectives and the maximum return on investment.

Then obtain the minimum and maximum requirements from the database for the available feed ingredients, blocks 602–608.

While the invention and method has been described in conjunction with a specific embodiment thereof, it is evident that different alternatives, modifications, and variations will be apparent to those skilled in the art in view of the foregoing description. Accordingly, the invention is not limited to these embodiments or the use of elements having specific configurations as presented herein.

The claimed invention is:

1. A method of raising animals to have an optimum growth rate, the method comprising the steps of:

provides a plurality of ingredients for mixing feed;

mixing the ingredients to form the feed, the feed having a nutritional composition configured to stimulate the optimum rate of growth as determined by a plurality of equations having the form:

$$W = A e^{(-e^{(-k(t-t^*))})}$$

where W is the current body weight of an average animal, A is the weight of the average animal at physical maturity, t is the current age of the average animal, t* is the age at which the average animal achieves its maximum rate of growth, and k is a growth rate factor, t* and k being statistically related; and providing the feed to the animals for consumption.

2. The method of claim 1 wherein the step of providing a plurality of ingredients includes the step of determining the ingredients available for use, each ingredient having a predetermined nutritional composition.

3. The method of claim 2 wherein the step of mixing the ingredients includes the steps of:

selecting a plurality of available ingredients for mixing the feed; and determining a ratio of the selected ingredients for mixing the feed.

4. The method of claim 1 comprising the additional step of determining an age at which additional growth of the animals has reached a point of diminishing return.

5. The method of claim 4 comprising the additional step of slaughtering the animals when they have substantially reached the age at which additional growth of the animals has reached a point of diminishing return.

6. The method of claim 1 wherein the growth rate of the animals is affected by a plurality of variables, the method comprising the steps of determining the value for at least two of the plurality of variables; and determining a ratio of nutrients to feed the animals in order to substantially optimize the growth rate of the animals given the value for the at least two of the plurality of variables.

7. The method of claim 6 wherein a predetermined selection of ingredients is available, the step of providing a plurality of ingredients for mixing feed includes the step of providing ingredients from the predetermined selection of ingredients so that the provided ingredients provide the determined ratio of nutrients.

8. The method of claim 1 wherein the step of providing the feed to the animals includes the steps of:

determining an amount of feed to provide to the animals; and providing the determined amount of feed to the animals.

9. The method of claim 1 wherein the animals are poultry and the step of providing the feed includes the step of providing the feed to the poultry.

10. The method of claim 1 wherein the animals are livestock and the step of providing the feed includes the step of providing the feed to the livestock.

11. The method of claim 1 wherein the animals are marine animals and the step of providing the feed includes the step of providing the feed to the marine animals.

12. A method of preparing feed for animals utilizing a table that relates nutrient ratios to values for a set of variables, the set of variables representing factors that affect the growth rate of the animals, the method comprising the steps of:

selecting a set of values that corresponds to the set of variables;

selecting the ratio of nutrients that correspond to the selected set of values for the variables;

determining the type of ingredients available to mix the feed, each ingredient having a predetermined composition of nutrients; and mixing the ingredients to make the feed, the feed having a ratio of nutrients substantially equal to the selected ratio of nutrients.

13. The method of claim 12 wherein the set of values and the corresponding ratio of nutrients are determined by a plurality of equations representing a growth and yield of edible tissue of the living animals, wherein each of the equations identifies the growth and yield given genetic and non-genetic characteristics.

14. The method of claim 13 wherein each equation in the plurality of equations have the form:

$$W = Ae\char`\^(-e\char`\^(-k(t-t^*)))$$

where W is the current body weight of an average animal, A is the weight of the average animal at physical maturity, t is the current age of the average animal, t* is the age at which the average animal achieves its maximum rate of growth, and k is a growth rate factor, t* and k being statistically related.

15. The method of claim 12 wherein at least one of the variables in the set of variables corresponds to an environmental condition.

16. The method of claim 15 wherein the variable that corresponds to an environmental condition is selected from the group consisting of: temperature, humidity, population density, ventilation, disease conditions, and air quality.

17. The method of claim 12 wherein at least one of the variables in the set of variables corresponds to genetic factors.

18. The method of claim 17 wherein the animals are birds and the variable that corresponds to genetic information identifies the strain of the birds.

19. A computer product comprising a computer usable medium having computer readable data structure for controlling a computer configured to determine the mixture of ingredients to use when mixing feed for animals, the computer readable program code means comprising:

values for a first set of variables, each variable representing a nutrient, the value for each variable defining a ratio of the corresponding nutrient to be included within the feed;

values for a second set of variables, each variable in the second set of variables representing a factor that affects the rate of growth for the animals;

wherein each set of values for the first set of variables correspond to a set of values for the second set of variables; and wherein the ratio of nutrients represented by each of the first set of variables are defined to optimize a rate of growth for the animals given the values for the second set of variables, the optimal rate of growth being determined by a plurality of equations having the form:

$$W = Ae\char`\^(-e\char`\^(-k(t-t^*)))$$

where W is the current body weight of an average animal, A is the weight of the average animal at physical maturity, t is the current age of the average animal, t* is the age at which the average animal achieves its maximum rate of growth, and k is a growth rate factor, t* and k being statistically related.

20. A table containing a first set of values for a first set of variables, each variable in the first set of variables representing a nutrient, the value for each variable in the first set of variables defining a ratio of the corresponding nutrient to be included within feed for feeding animals, and a second set of values for a second set of variables, each variable in the second set of variables representing a factor that affects the rate of growth for the animals, wherein each set of values for the first set of variables correspond to a set of values for the second set of variables, the table being manufactured by the process comprising the steps of:

provided a computer having input means for inputting data;

providing a dataprocessor operatively connected to the input means, the dataprocessor including generation means for determining a ration of nutrients to feed the animals in order to substantially achieve an optimal growth rate given a variety of genetic and non-genetic factors, the optimal rate of growth being determined by a plurality of equations having the form:

$$W = Ae\char`\^(-e\char`\^(-k(t-t^*)))$$

where W is the current body weight of an average animal, A is the weight of the average animal at physical maturity, t is the current age of the average animal, t* is the age at which the average animal achieves its maximum rate of growth, and k is a growth rate factor, t* and k being statistically related;

inputting a set of values corresponding to the second set of variables; and generating a set of values for the second set of variables in response to the set of values for the first set of variables, wherein the optimum rate of growth is achieved when the animals are fed the ratio of nutrients corresponding to the set of values corresponding to the first set of data.

* * * * *